US006373859B1

(12) United States Patent
Jedwab et al.

(10) Patent No.: US 6,373,859 B1
(45) Date of Patent: Apr. 16, 2002

(54) METHODS AND APPARATUS FOR ENCODING AND DECODING DATA

(75) Inventors: Jonathan Jedwab, Bristol (GB); James Andrew Davis, Richmond, VA (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/068,383

(22) PCT Filed: Sep. 10, 1997

(86) PCT No.: PCT/GB97/02464

§ 371 Date: May 8, 1998

§ 102(e) Date: May 8, 1998

(87) PCT Pub. No.: WO98/11698

PCT Pub. Date: Mar. 19, 1998

(30) Foreign Application Priority Data

| | | |
|---|---|---|
| Sep. 10, 1996 | (EP) | 96306607 |
| Nov. 15, 1996 | (GB) | 9623940 |
| Dec. 11, 1996 | (GB) | 9625710 |

(51) Int. Cl.[7] .......... H04J 13/00; H04J 1/00

(52) U.S. Cl. .......... 370/479; 370/480

(58) Field of Search .......... 370/203, 204, 370/205, 208, 210, 213, 319, 344, 479, 480, 513

(56) References Cited

U.S. PATENT DOCUMENTS

| | | | | | |
|---|---|---|---|---|---|
| 5,196,933 | A | * | 3/1993 | Henot | 358/136 |
| 5,425,050 | A | * | 6/1995 | Schreiber et al. | 375/200 |
| 5,745,525 | A | * | 4/1998 | Hunsinger et al. | 375/285 |
| 5,949,796 | A | * | 9/1999 | Kuma | 370/529 |

OTHER PUBLICATIONS

Wilkinson T. A. et al.: Minimisation of the Peak to Mean Envelope Power Ratio of Multicarrier Transmission Schemes by Block Coding, Proceedings of the Vhecular Technology Conference, Chicago, Jul. 25–28, 1995, vol. 2, Jul. 25, 1995, Institute of Electrical and Electronic Engineers.

Jones A. E. et al.: Combined Coding for Error Control and Increased Robustness to System Nonlinearities in OFDM, 1996, IEEE 46$^{th}$ . Vehicular Technology Conference, Atlanta, Apr. 28—May 1, 1996, vol. 2, Apr. 28, 1996, Institute of Electrical and Electronic Engineers, pp. 904–908, XP000593105.

Wulich D.: Reduction of Peak to Mean Ratio of Multicarrier Modulation Using Cyclic Coding, Electronic Letters, vol. 32, No. 5, Feb. 29, 1996, pp. 432–433, XP000581511.

* cited by examiner

*Primary Examiner*—Dang Ton
*Assistant Examiner*—Toan Nguyen

(57) ABSTRACT

In a coded orthogonal frequency division multiplex (COFDM) system n-bit data words are encoded as $2^m$-symbol code words (binary, quaternary, octary, etc.). The code words are selected for desired low peak-to-mean envelope power ratio (PMEPR) characteristics of transmissions over a COFDM channel, from a set of cosets of a linear sub-code of a code having a specified generator matrix. The code words thus identified by the procedure described can, even for values of m in excess of 3, simultaneously limit the PMEPR to 3 dB, provide specified error control characteristics, be implemented in a feasible manner using analytical circuit techniques (e.g. with combinatorial logic), and include sufficiently many different code words to enable data to be transferred at useful rates. Other selections of code words can be made, enabling a higher maximum PMEPR or a reduced error detection capability to be accepted in order to obtain a higher code rate.

34 Claims, 10 Drawing Sheets

Fig.7
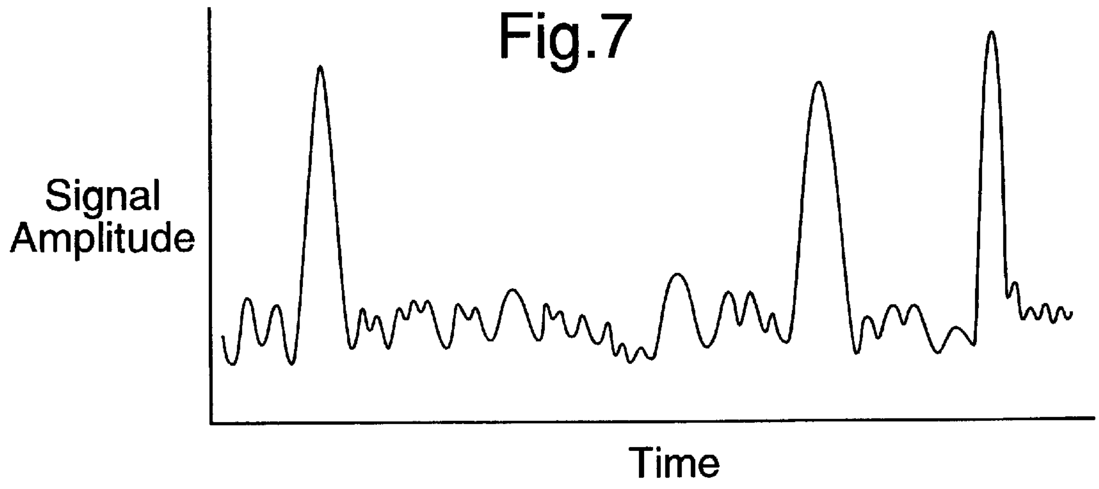
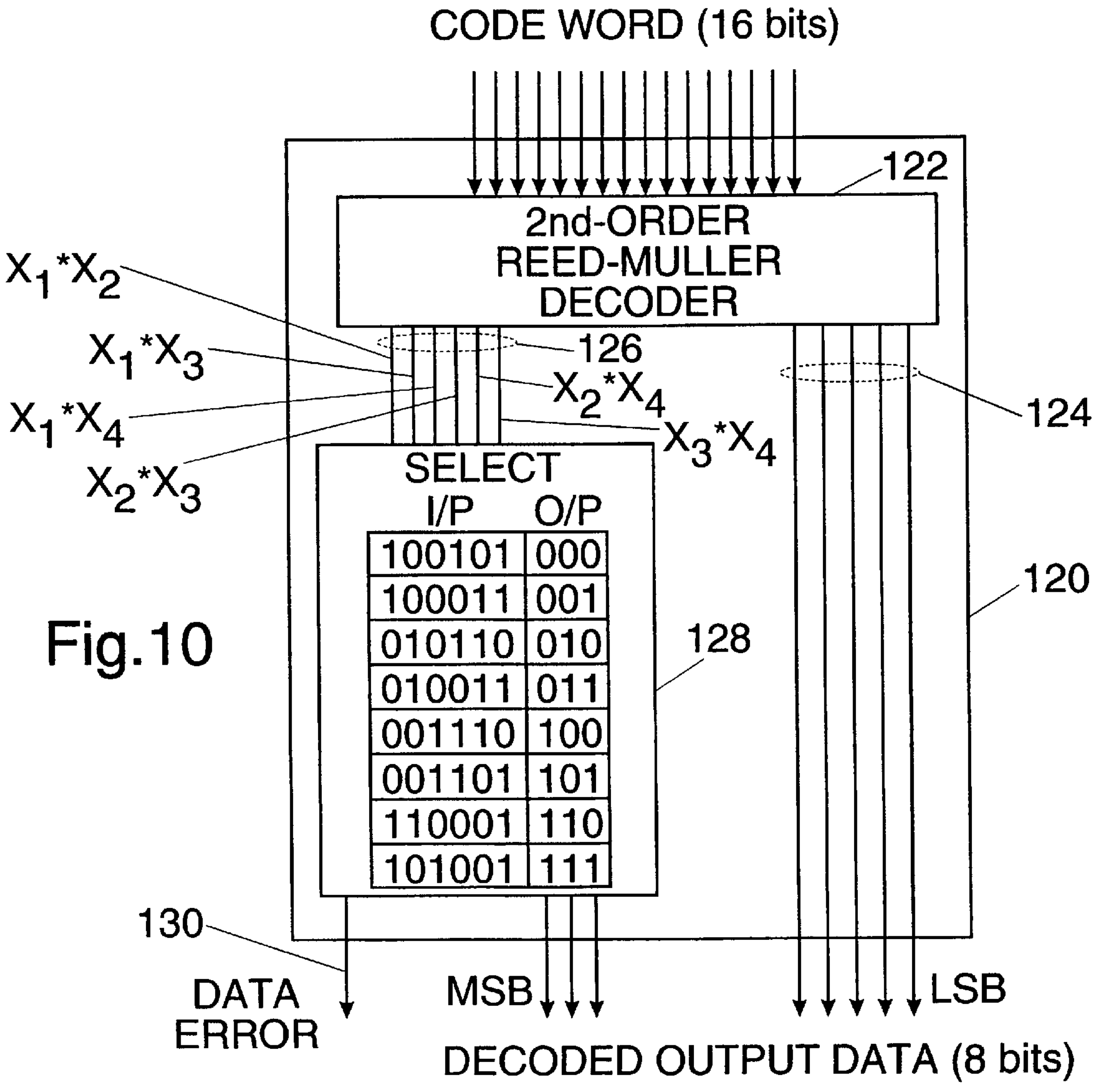
Fig.10

METHODS AND APPARATUS FOR ENCODING AND DECODING DATA

TECHNICAL FIELD

This invention relates to methods and apparatus for encoding and decoding data, and to communications systems incorporating such methods and apparatus; in particular, though not exclusively, the invention relates to such methods, apparatus and systems for transmitting data using multi-carrier frequency division multiplexing, such as coded orthogonal frequency division multiplexing (COFDM).

BACKGROUND ART

The increasingly widespread use of powerful computer-based equipment and appliances is resulting in rapidly increasing requirements for high-speed, high-capacity communications, based on both wireline and wireless techniques. One way of accommodating this increase is to design communications systems for operation at higher and higher symbol rates. However, an increase in symbol rate typically involves a corresponding decrease in inter-symbol spacing, and this in turn can lead to greater inter-symbol interference (ISI) and consequential errors in symbols as received. In the case of wireline links ISI can arise, for example, from signal reflections at imperfectly matched interfaces between different portions of the communications link. For wireless links a significant source of ISI is multi-path propagation involving signal reflections from objects (such as buildings) in the space traversed by the signals; mobile wireless communications can be especially susceptible to ISI from this source, because movement of a mobile unit using the link can cause continuous and complex variation in the multiple propagation paths extending to the mobile unit.

A technique which is being actively studied and developed to increase communications system capacity and counteract ISI is multi-carrier (or multitone) frequency division multiplex operation, such as COFDM operation. In a COFDM system multiple symbols are transmitted simultaneously, each symbol controlling the modulation (e.g. by phase-shift keying) of a respective one of multiple carrier signals having closely-spaced frequencies. By choosing the carrier-frequency spacing to have an appropriate relationship to the rate at which symbols are transmitted on each carrier, it is possible to ensure that each individual carrier can be demodulated without interference from the carriers adjacent to it (in which case the carriers are said to be orthogonal to one another). The set of symbols transmitted simultaneously on respective carriers during a symbol period (a code word) is chosen to encode a group of data symbols (a data word) and includes redundancy (i.e. the code word has more symbols than the data word); this redundancy is used upon reception for detection of errors in the symbols as received, and, if desired, for correction of those errors.

COFDM systems counteract ISI in part because the transmission of multiple symbols in parallel enables a desired data rate to be attained with a lower symbol rate than would be necessary if a serial system were used to transmit individual symbols in succession. A lower symbol rate implies a longer duration for each symbol and thus a longer period between symbol transitions, which reduces the impact of ISI. The error detection and correction capabilities provided by the inclusion of redundancy enhance the resistance to data corruption, by enabling some errors which occur in received symbols owing to signal fading and other causes to be detected and corrected.

However, present COFDM systems encounter difficulties in obtaining the maximum potential benefit for a particular transmitted signal power, owing to limitations arising from the typical peak-to-mean envelope power ratio (PMEPR) of the actual transmitted signal. Because this signal is effectively the sum of several signals at closely spaced frequencies and with respective phases which change at each symbol transition, the overall signal tends to exhibit transient pronounced peaks separated by substantially longer intervals of much lower though still varying amplitude. The transmitting equipment must be adjusted to reproduce the peaks without clipping or other distortion, so for much of the time, in the intervals between peaks, that equipment is operating at a signal level well below its maximum capability. As a result the geographical range of the equipment is significantly lower than would be expected for its nominal power rating, or alternatively a much more powerful equipment must be provided to cover the desired range and then operated inefficiently.

It is known that this problem can in principle be alleviated by careful selection of the code words which encode the possible data words (for example in 'Block coding scheme for reduction of peak to mean envelope power ratio of multicarrier transmission schemes' by A. E. Jones, T. A. Wilkinson and S. K. Barton, *Electronics Letters*, Dec. 8, 1994, vol.30, no.25, pp. 2098–2099). However, in selecting code words to reduce the PMEPR it is important also to ensure the code has good error correction properties. Furthermore, implementation of a high-throughput communications system desirably involves the use of long code words and of rapid encoding and decoding procedures; the use of simple look-up tables, though readily implemented, does not lend itself to rapid operation using compact (and low-power, inexpensive) circuitry, especially during decoding, if the number of valid code words to be checked is large, as is typically the case with long code words (e.g. more than about 16 symbols). It is therefore preferable for encoding and decoding operations to be definable in terms of some analytical procedure which for example performs combinatorial logic on the data word or code word symbols to convert one to the other, or at least restricts the size of any look-up table which is used.

An additional difficulty is presented by the sheer quantity of possible code words from which a selection may be made to define a code for use in a typical system. As the number of symbols in a code word increases the number of possible code words increases much faster, even for binary symbols; for symbols having just three (ternary) or four (quaternary) possible values, the number of possible codes available becomes so huge even for quite short code words that a simple exhaustive search through all possible code words is not feasible in a realistic time even just to minimize the PMEPR. Attempting to satisfy error correction and implementational requirements as well merely adds to the difficulty of such a search, especially as it will not even be known whether there actually exists a code word set which is of the desired size and which simultaneously satisfies preferred criteria relating to PMEPR, error detection or correction and ease of encoding and decoding. This difficulty is further exacerbated by the desirability of having a large number of code words available for use in the chosen code, in order to be able to encode a large number of different data words (i.e. data words containing relatively many symbols) and thus attain an acceptably high data transfer rate.

It is known that certain kinds of codes may have some desirable properties. Thus the paper 'Synthesis of Power Efficient Multitone Signals with Flat Amplitude Spectrum' by B. M. Popović, *IEEE Transactions on Communications*, vol.39, no.7, July 1991, pp. 1031–1033 indicates that any binary or polyphase complementary sequence can be used to construct a multitone signal with a crest factor (analogous to PMEPR) less than or equal to 6 dBV. Examples of these sequences have been described, as in the case of binary Golay complementary sequence pairs ('Complementary series' by M. J. E. Golay, *IRE Transactions on Information Theory*, vol.IT-7, April 1961, pp. 82–87). However, Popović's paper is directed to situations such as multipath fading measurements and multitone jamming, in which a single code word can be used continuously in generating the required signal. Accordingly Popović gives no guidance on how multiple such sequences could be identified just to attain the 6 dBV limit on PMEPR in a practical code for conveying information; and no mention whatsoever is made of the other requirements mentioned above for a code suitable for practical implementation. Indeed Popović states that "the construction of multitone signals having minimum peak-to-peak amplitude is an old problem that still has no analytical solution".

It should be noted that Golay complementary sequence pairs and codes defined using them are different from and should not be confused with so-called Golay codes; Golay complementary sequence pairs and Golay codes were first defined, independently of one another, by the same researcher and for that reason alone both are referred to by his name.

It is an object of this invention to provide methods and apparatus for encoding and decoding in which a substantial number of different code words are identifiable in practice, despite the potentially huge search space of possible code words, and which provide a predictable low limit on PMEPR, have specified error detection and correction properties and are feasible for implementation in high-speed circuitry.

DISCLOSURE OF INVENTION

According to one aspect of this invention there is provided a method of encoding data words as $2^m$-symbol code words for transmission using multi-carrier frequency division multiplexing, such as coded orthogonal frequency division multiplexing (COFDM), wherein data words are encoded in accordance with their value and code words selected in complete cosets, for desired peak-to-mean envelope power ratio characteristics of said transmission, from a set of one or more cosets of a linear sub-code of a code having a generator matrix as follows:

$$\begin{array}{lll}
((2.0+1)\times 2^m)/2^m & ((2.1+1)\times 2^m)/2^m & \cdots \\
((2.0+1)\times 2^{m-1})/2^{m-1} & ((2.1+1)\times 2^{m-1})/2^{m-1} & \cdots \\
 & & \cdots \\
((2.0+1)\times 2^y)/2^y & ((2.1+1)\times 2^y)/2^y & \cdots \\
 & & \cdots \\
((2.0+1)\times 2^1)/2^1 & ((2.1+1)\times 2^1)/2^1 & \cdots \\
((2.0+1)\times 2^0)/2^0 & ((2.1+1)\times 2^0)/2^0 & \cdots
\end{array}$$

-continued $$\begin{array}{lll}
((2.z+1)\times 2^m)/2^m & \cdots & ((2.(2^m-1)+1)\times 2^m)/2^m \\
((2.z+1)\times 2^{m-1})/2^{m-1} & \cdots & ((2.(2^m-1)+1)\times 2^{m-1})/2^{m-1} \\
((2.z+1)\times 2^y)/2^y & \cdots & ((2.(2^m-1)+1)\times 2^y)/2^y \\
((2.z+1)\times 2^1)/2^1 & \cdots & ((2.(2^m-1)+1)\times 2^1)/2^1 \\
((2.z+1)\times 2^0)/2^0 & \cdots & ((2.(2^m-1)+1)\times 2^0)/2^0
\end{array}$$

where z has integer values from 0 to $2^m$−1, y has integer values from m to 0, x indicates bitwise multiplication of factors expressed as (m+1)-bit binary numbers, and the result of division is expressed as a single digit.

According to another aspect of this invention there is provided a method for transmitting data words as $2^m$-symbol code words using multi-carrier frequency division multiplexing, such as coded orthogonal frequency division multiplexing (COFDM), comprising the steps of:

encoding each data word in accordance with its value and code words selected in complete cosets, for desired peak-to-mean envelope power ratio characteristics of transmission, from a set of one or more cosets of a linear sub-code of a code having a generator matrix as follows:

$$\begin{array}{lll}
((2.0+1)\times 2^m)/2^m & ((2.1+1)\times 2^m)/2^m & \cdots \\
((2.0+1)\times 2^{m-1})/2^{m-1} & ((2.1+1)\times 2^{m-1})/2^{m-1} & \cdots \\
 & & \cdots \\
((2.0+1)\times 2^y)/2^y & ((2.1+1)\times 2^y)/2^y & \cdots \\
 & & \cdots \\
((2.0+1)\times 2^1)/2^1 & ((2.1+1)\times 2^1)/2^1 & \cdots \\
((2.0+1)\times 2^0)/2^0 & ((2.1+1)\times 2^0)/2^0 & \cdots
\end{array}$$

$$\begin{array}{lll}
((2.z+1)\times 2^m)/2^m & \cdots & ((2.(2^m-1)+1)\times 2^m)/2^m \\
((2.z+1)\times 2^{m-1})/2^{m-1} & \cdots & ((2.(2^m-1)+1)\times 2^{m-1})/2^{m-1} \\
((2.z+1)\times 2^y)/2^y & \cdots & ((2.(2^m-1)+1)\times 2^y)/2^y \\
((2.z+1)\times 2^1)/2^1 & \cdots & ((2.(2^m-1)+1)\times 2^1)/2^1 \\
((2.z+1)\times 2^0)/2^0 & \cdots & ((2.(2^m-1)+1)\times 2^0)/2^0
\end{array}$$

where z has integer values from 0 to $2^m$−1, y has integer values from m to 0, x indicates bitwise multiplication of factors expressed as (m+1)-bit binary numbers, and the result of division is expressed as a single digit; and decoding each code word using an analytical decoder.

According to a further aspect of this invention there is provided a method of encoding data words as $2^m$-symbol code words for transmission using multi-carrier frequency division multiplexing, such as coded orthogonal frequency division multiplexing (COFDM), wherein m is at least 4 and data words are encoded in accordance with their value and code words comprising a set of one or more complete cosets of a linear sub-code of a code having a generator matrix as follows:

$$\begin{array}{lll} ((2.0+1)\times 2^{m})/2^{m} & ((2.1+1)\times 2^{m})/2^{m} & \cdots \\ ((2.0+1)\times 2^{m-1})/2^{m-1} & ((2.1+1)\times 2^{m-1})/2^{m-1} & \cdots \\ & & \cdots \\ ((2.0+1)\times 2^{y})/2^{y} & ((2.1+1)\times 2^{y})/2^{y} & \cdots \\ & & \cdots \\ ((2.0+1)\times 2^{1})/2^{1} & ((2.1+1)\times 2^{1})/2^{1} & \cdots \\ ((2.0+1)\times 2^{0})/2^{0} & ((2.1+1)\times 2^{0})/2^{0} & \cdots \end{array}$$

$$\begin{array}{lll} ((2.z+1)\times 2^{m})/2^{m} & \cdots & ((2.(2^{m}-1)+1)\times 2^{m})/2^{m} \\ ((2.z+1)\times 2^{m-1})/2^{m-1} & \cdots & ((2.(2^{m}-1)+1)\times 2^{m-1})/2^{m-1} \\ ((2.z+1)\times 2^{y})/2^{y} & \cdots & ((2.(2^{m}-1)+1)\times 2^{y})/2^{y} \\ ((2.z+1)\times 2^{1})/2^{1} & \cdots & ((2.(2^{m}-1)+1)\times 2^{1})/2^{1} \\ ((2.z+1)\times 2^{0})/2^{0} & \cdots & ((2.(2^{m}-1)+1)\times 2^{0})/2^{0} \end{array}$$

where z has integer values from 0 to $2^m-1$, y has integer values from m to 0, x indicates bitwise multiplication of factors expressed as (m+1)-bit binary numbers, and the result of division is expressed as a single digit.

According to a yet further aspect of this invention there is provided a method of encoding data words as $2^m$-symbol code words, each code word symbol having $2^j$ different possible values, wherein m is at least 4 and j is at least 3, and data words are encoded in accordance with their value and code words comprising a set of one or more complete cosets of a code having a generator matrix as follows:

$$\begin{array}{lll} ((2.0+1)\times 2^{m})/2^{m} & ((2.1+1)\times 2^{m})/2^{m} & \cdots \\ ((2.0+1)\times 2^{m-1})/2^{m-1} & ((2.1+1)\times 2^{m-1})/2^{m-1} & \cdots \\ & & \cdots \\ ((2.0+1)\times 2^{y})/2^{y} & ((2.1+1)\times 2^{y})/2^{y} & \cdots \\ & & \cdots \\ ((2.0+1)\times 2^{1})/2^{1} & ((2.1+1)\times 2^{1})/2^{1} & \cdots \\ ((2.0+1)\times 2^{0})/2^{0} & ((2.1+1)\times 2^{0})/2^{0} & \cdots \end{array}$$

$$\begin{array}{lll} ((2.z+1)\times 2^{m})/2^{m} & \cdots & ((2.(2^{m}-1)+1)\times 2^{m})/2^{m} \\ ((2.z+1)\times 2^{m-1})/2^{m-1} & \cdots & ((2.(2^{m}-1)+1)\times 2^{m-1})/2^{m-1} \\ ((2.z+1)\times 2^{y})/2^{y} & \cdots & ((2.(2^{m}-1)+1)\times 2^{y})/2^{y} \\ ((2.z+1)\times 2^{1})/2^{1} & \cdots & ((2.(2^{m}-1)+1)\times 2^{1})/2^{1} \\ ((2.z+1)\times 2^{0})/2^{0} & \cdots & ((2.(2^{m}-1)+1)\times 2^{0})/2^{0} \end{array}$$

where z has integer values from 0 to $2^m-1$, y has integer values from m to 0, x indicates bitwise multiplication of factors expressed as (m+1)-bit binary numbers, and the result of division is expressed as a single digit.

According to another aspect of this invention there is provided a method of encoding data words as $2^m$-symbol code words for transfer over a communication path, each code word symbol having $2^j$ different possible values, wherein j is a variable positive integer, and data words are encoded in accordance with their value and a code having, for any value of j, code words contained within a set of one or more cosets of a linear sub-code of a code having a generator matrix as follows:

$$\begin{array}{lll} ((2.0+1)\times 2^{m})/2^{m} & ((2.1+1)\times 2^{m})/2^{m} & \cdots \\ ((2.0+1)\times 2^{m-1})/2^{m-1} & ((2.1+1)\times 2^{m-1})/2^{m-1} & \cdots \\ & & \cdots \\ ((2.0+1)\times 2^{y})/2^{y} & ((2.1+1)\times 2^{y})/2^{y} & \cdots \\ & & \cdots \\ ((2.0+1)\times 2^{1})/2^{1} & ((2.1+1)\times 2^{1})/2^{1} & \cdots \\ ((2.0+1)\times 2^{0})/2^{0} & ((2.1+1)\times 2^{0})/2^{0} & \cdots \end{array}$$

$$\begin{array}{lll} ((2.z+1)\times 2^{m})/2^{m} & \cdots & ((2.(2^{m}-1)+1)\times 2^{m})/2^{m} \\ ((2.z+1)\times 2^{m-1})/2^{m-1} & \cdots & ((2.(2^{m}-1)+1)\times 2^{m-1})/2^{m-1} \\ ((2.z+1)\times 2^{y})/2^{y} & \cdots & ((2.(2^{m}-1)+1)\times 2^{y})/2^{y} \\ ((2.z+1)\times 2^{1})/2^{1} & \cdots & ((2.(2^{m}-1)+1)\times 2^{1})/2^{1} \\ ((2.z+1)\times 2^{0})/2^{0} & \cdots & ((2.(2^{m}-1)+1)\times 2^{0})/2^{0} \end{array}$$

where z has integer values from 0 to $2^m-1$, y has integer values from m to 0, x indicates bitwise multiplication of factors expressed as (m+1)-bit binary numbers, and the result of division is expressed as a single digit.

According to a farther aspect of this invention there is provided a method of identifying a $2^m$-symbol code word within a set of code words having a generator matrix $$\begin{array}{lll} ((2.0+1)\times 2^{m})/2^{m} & ((2.1+1)\times 2^{m})/2^{m} & \cdots \\ ((2.0+1)\times 2^{m-1})/2^{m-1} & ((2.1+1)\times 2^{m-1})/2^{m-1} & \cdots \\ & & \cdots \\ ((2.0+1)\times 2^{y})/2^{y} & ((2.1+1)\times 2^{y})/2^{y} & \cdots \\ & & \cdots \\ ((2.0+1)\times 2^{1})/2^{1} & ((2.1+1)\times 2^{1})/2^{1} & \cdots \\ ((2.0+1)\times 2^{0})/2^{0} & ((2.1+1)\times 2^{0})/2^{0} & \cdots \end{array}$$

$$\begin{array}{lll} ((2.z+1)\times 2^{m})/2^{m} & \cdots & ((2.(2^{m}-1)+1)\times 2^{m})/2^{m} \\ ((2.z+1)\times 2^{m-1})/2^{m-1} & \cdots & ((2.(2^{m}-1)+1)\times 2^{m-1})/2^{m-1} \\ ((2.z+1)\times 2^{y})/2^{y} & \cdots & ((2.(2^{m}-1)+1)\times 2^{y})/2^{y} \\ ((2.z+1)\times 2^{1})/2^{1} & \cdots & ((2.(2^{m}-1)+1)\times 2^{1})/2^{1} \\ ((2.z+1)\times 2^{0})/2^{0} & \cdots & ((2.(2^{m}-1)+1)\times 2^{0})/2^{0} \end{array}$$

where z has integer values from 0 to $2^m-1$, y has integer values from m to 0, x indicates bitwise multiplication of factors expressed as (m+1)-bit binary numbers, and the result of division is expressed as a single digit, and each code word symbol has $2^j$ different possible values where j>1, wherein coefficients for rows of said matrix are derived by:

applying a plurality of fast Hadamard transforms or equivalents thereof to a $2^m$-symbol input word; and combining results of said transforms or their equivalents to identify said code word.

According to another aspect of this invention there is provided a coder for encoding data words as $2^m$-symbol code words for transmission using multi-carrier frequency division multiplexing, such as coded orthogonal frequency division multiplexing (COFDM), comprising means for receiving data words and for encoding them in accordance with their value and code words selected in complete cosets, for desired peak-to-mean envelope power ratio characteristics of said transmission, from a set of one or more cosets of a linear sub-code of a code having a generator matrix as follows:

$$
\begin{array}{llll}
((2.0+1)\times 2^m)/2^m & ((2.1+1)\times 2^m)/2^m & \cdots \\
((2.0+1)\times 2^{m-1})/2^{m-1} & ((2.1+1)\times 2^{m-1})/2^{m-1} & \cdots \\
 & & \cdots \\
((2.0+1)\times 2^y)/2^y & ((2.1+1)\times 2^y)/2^y & \cdots \\
 & & \cdots \\
((2.0+1)\times 2^1)/2^1 & ((2.1+1)\times 2^1)/2^1 & \cdots \\
((2.0+1)\times 2^0)/2^0 & ((2.1+1)\times 2^0)/2^0 & \cdots
\end{array}
$$

$$
\begin{array}{lll}
((2.z+1)\times 2^m)/2^m & \cdots & ((2.(2^m-1)+1)\times 2^m)/2^m \\
((2.z+1)\times 2^{m-1})/2^{m-1} & \cdots & ((2.(2^m-1)+1)\times 2^{m-1})/2^{m-1} \\
 & & \\
((2.z+1)\times 2^y)/2^y & \cdots & ((2.(2^m-1)+1)\times 2^y)/2^y \\
 & & \\
((2.z+1)\times 2^1)/2^1 & \cdots & ((2.(2^m-1)+1)\times 2^1)/2^1 \\
((2.z+1)\times 2^0)/2^0 & \cdots & ((2.(2^m-1)+1)\times 2^0)/2^0
\end{array}
$$

where z has integer values from 0 to $2^m-1$, y has integer values from m to 0, x indicates bitwise multiplication of factors expressed as (m+1)-bit binary numbers, and the result of division is expressed as a single digit.

Circuitry implementing this invention is relatively simple and compact. Thus, for example, identifying code words for use in encoding does not require exhaustive searches (of possibly impractical duration) through enormous numbers of code words, even for relatively long code words. Likewise, decoding does not need enormous look-up tables containing all valid code words that may occur, which would again be impractical for long code words. The simplicity and compactness of practical implementation of the invention, as compared to what has previously been believed to be necessary (e.g. exhaustive searches and large look-up tables) or at the limits of feasibility, illustrate the significant advance which the invention provides.

BRIEF DESCRIPTION OF DRAWINGS

Methods and apparatus for encoding and decoding data in accordance with this invention in communications systems for transmitting data using coded orthogonal frequency division multiplexing (COFDM) will now be described, by way of example, with reference to the accompanying drawings in which:

FIG. 7 illustrates the general form of a COFDM signal waveform without any limitation of PMEPR;

FIG. 10 shows a decoder incorporating the present invention for decoding code words from the encoder of FIG. 9;

BEST MODE FOR CARRYING OUT THE INVENTION & INDUSTRIAL APPLICABILITY

Figure 1:
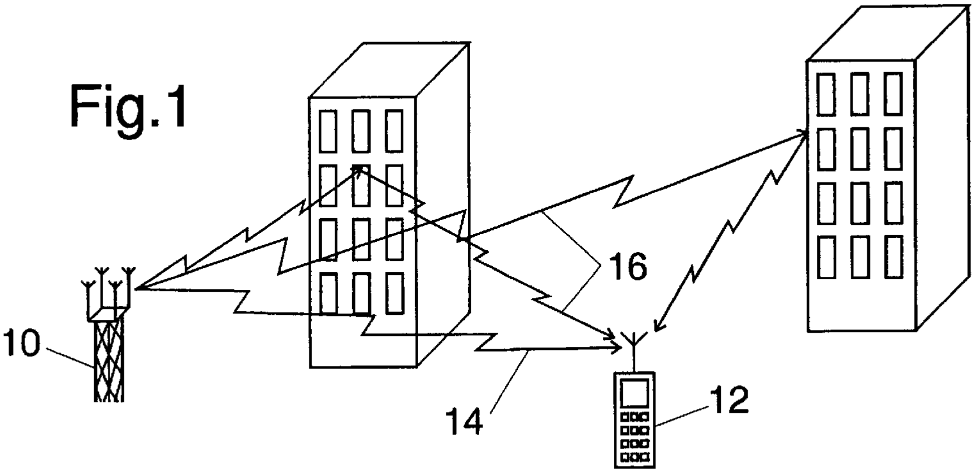
FIG. 1 illustrates multipath propagation between a base station and a mobile communications device.
Figure 2:
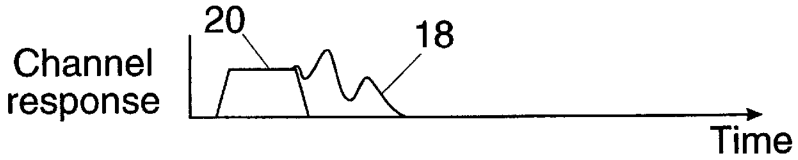
FIG. 2 is a schematic diagram showing the effect of multipath propagation on propagation of a single symbol.
Figure 3:
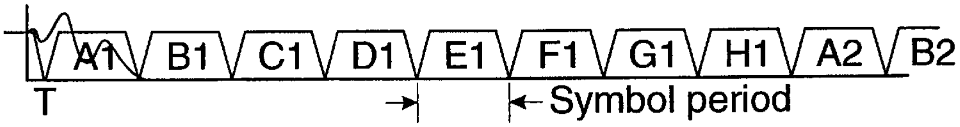
FIG. 3 is a schematic diagram showing intersymbol interference arising from multipath propagation.

FIGS. 1 to 3 illustrate in a schematic manner the problem of multipath propagation in the context of mobile communications in an urban environment. A base he station 10 communicates by wireless, e.g. at microwave wavelengths, with mobile communications devices such as a mobile telephone 12. There is a direct line-of-sight signal path 14 between the base station 10 and the telephone 12, and, owing to the presence of multiple reflectors (for microwave signals) in the form of buildings and other structures, there are also multiple reflected signal paths 16. These paths are typically of differing lengths and thus involve differing propagation delays upon arrival at their destination. The overall signal as received at, for example, the mobile telephone 12 is the sum of the various signals arriving at the telephone via the different paths.

The transmitted signal may be considered as comprising a succession of symbols modulating a carrier wave (e.g. by phase-shift keying). As shown in FIG. 2, a consequence of signals traversing multiple paths with different propagation delays is that the composite signal 18 as received for a symbol is not an accurate replica of the signal as transmitted for that symbol. In particular the received composite signal is typically longer in duration than the transmitted signal, and has a trailing portion with a significant amplitude after the point when an accurate replica of the transmitted signal would have terminated. If this trailing portion extends for a significant fraction of a symbol period, as shown in FIG. 3 for the pulse nominally terminating at time T, the trailing portion will overlap and interfere with reception of the following symbol. As a result that following symbol may be incorrectly received, i.e. the value detected for it in the receiver may not correctly represent the value as transmitted, even in the absence of other noise sources. Signal corruption of this kind is known as intersymbol interference (ISI).

Figure 4A:
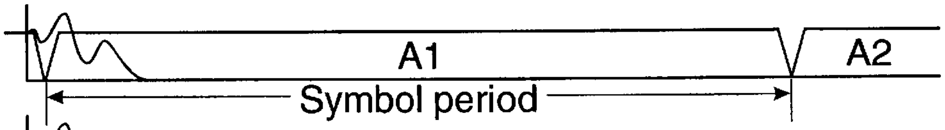
FIGS. 4*a* to 4*h* are schematic diagrams showing reduction in intersymbol interference by the use of multi-carrier frequency division multiplexing.
Figure 4B:
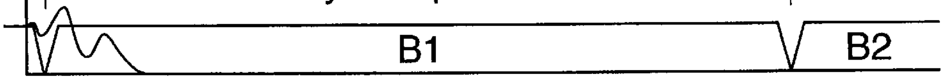
Figure 4C:
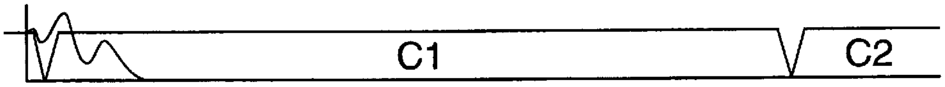
Figure 4D:
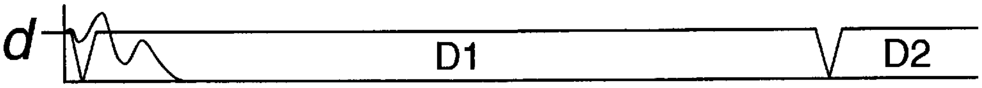
Figure 4E:
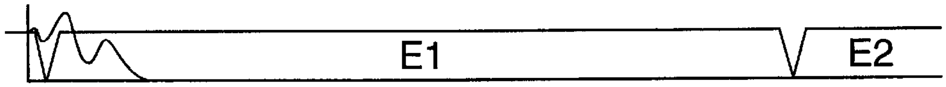
Figure 4F:
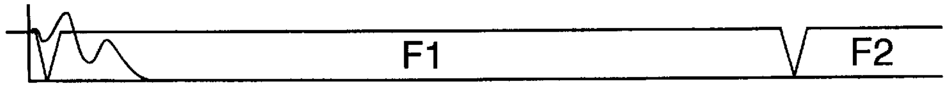
Figure 4G:
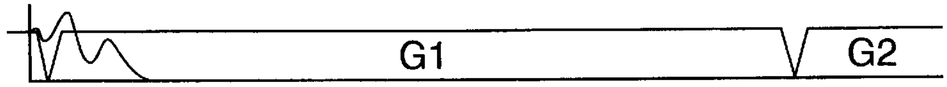
Figure 4H:
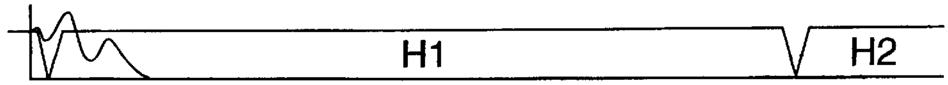

The effects of ISI can be alleviated by extending the duration of the transmitted symbols, as shown in FIG. 4*a*, so that each symbol as received extends beyond the trailing portion arising from multipath propagation delays. To counteract the reduction in symbol rate which would ensue, it has been proposed to transmit multiple symbols simultaneously, each modulating a respective one of multiple carrier waves.

Thus if eight carriers are used, as shown in FIGS. 4$a$ to 4$h$, the symbol period on each carrier can be eight times that which would be necessary with a single carrier (as shown in FIG. 3) while maintaining the same overall symbol rate. If the frequency spacing between the multiple carriers is an integer multiple of the inverse of the symbol period, it is possible to recover the individual symbol stream modulating each of the carriers without interference from the other carriers. This technique is known as orthogonal frequency division multiplexing (OFDM).

Figure 5:
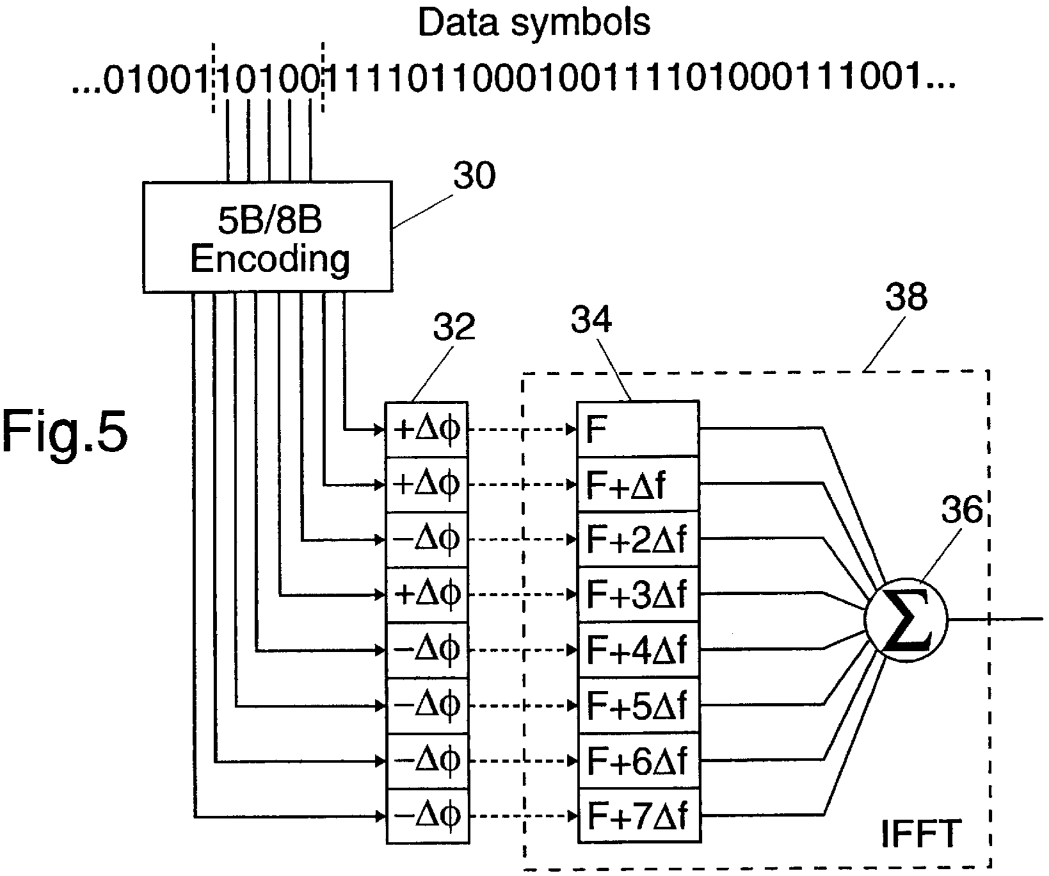
FIG. 5 shows an encoder and modulator for use in a COFDM system.

In addition to the use of multiple carriers, it has also been proposed to provide additional error detection and correction capabilities by the use of block encoding. Thus, as shown in FIG. 5, a serial stream of data symbols (binary symbols in this example) is notionally divided into successive groups or words each containing five symbols. A group of five symbols is input to a five-bit to eight-bit (5B/8B) encoder 30 which outputs a corresponding eight-bit code word. This code word is applied to a bank of eight phase shift controllers 32 which control a bank of eight oscillators 34 producing carrier signals at eight successive frequencies at intervals $\Delta f$ apart. Each individual bit in the code word causes a respective phase shift controller to impose either a positive or negative phase shift $\Delta\phi$ to modulate the carrier signal produced by the respective oscillator, depending on the current value of that bit.

Figure 6:
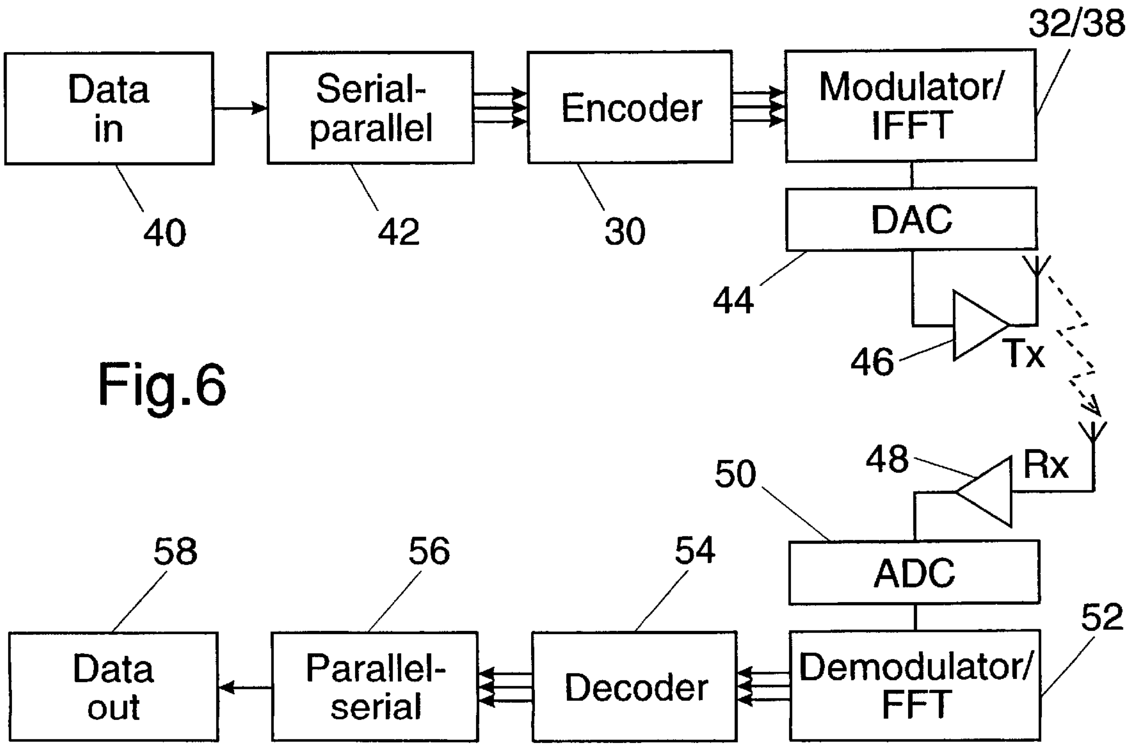
FIG. 6 is a block schematic diagram of a COFDM system incorporating the encoder and modulator of FIG. 5.

The modulated outputs of the oscillators 34 are combined in an adder 36 to produce the transmitted signal. In practice the functions of the oscillators 34 and the adder 36 are conveniently combined in a digital signal processor implementing an inverse fast Fourier transform (IFFT), as indicated by the dashed box 38. Thus, as shown schematically in FIG. 6, data to be transmitted are received in block 40 and converted to parallel form in a serial-to-parallel converter 42. The parallel data are encoded in encoder 30, as described above, and the encoded data control generation of the multi-carrier signal in the modulator/IFFT 32/38. This multi-carrier signal is converted to analogue form in a D-A converter 44, amplified and transmitted by a transmitter 46.

Reception is essentially a reverse of this process: the signal is received and amplified by a receiver 48, and then converted to digital form by an A-D converter 50. The digital signal is supplied to a demodulator 52 which comprises a digital signal processor implementing the fast Fourier transform (FFT) to separate and demodulate the component signals in the composite multi-carrier signal. The demodulated data are passed to a decoder 54 which reverses the encoding applied by the encoder 30, and typically also performs error detection and correction functions. Thereafter a parallel-to-serial converter 56 changes the data into serial form to be output at block 58.

The choice of code which is implemented by the encoder 30 has significant implications for the efficient operation of the transmitter 46. A multi-carrier signal comprises the sum of several sinusoidal waves with equal amplitudes and equally spaced frequencies. As a result, the maximum absolute value of the composite signal is strongly sensitive to the relative phases of the component sinusoids. These relative phases are changed at the end of each symbol period by the phase shift controllers 32, according to the value of the code word to be transmitted during the next symbol period. Depending on the particular set of relative phases, and therefore on the value of the current code word, the amplitude of the transmitted signal will have occasional pronounced peaks together with intervals of much lower though still varying value, as illustrated in FIG. 7. Thus the peak-to-mean envelope power ratio of the transmitted signal is relatively high.

For such a signal to be transmitted without distortion, it is necessary for the transmitter 46 to use a linear amplifier and to operate it in a relatively inefficient manner, so that most of its dynamic range is unused except for the infrequent occasions when the amplitude of the transmitted signal reaches its peak value.

It has been proposed to reduce this problem by appropriate choice of the set of code words which are actually used to encode data for transmission. The use of block coding to avoid the use of code words which produce extreme values of PMEPR has been suggested in 'Minimisation of the peak to mean envelope power ratio of multicarrier transmission schemes by block coding' by T. A. Wilkinson and A. E. Jones, 1995 *IEEE 45th Vehicular Technology Conference*, July 1995, pp. 825–829; although this proposal indicates that reductions in PMEPR are possible, it also identifies the difficulty of selecting a set of code words which both enables efficient implementation of coding and decoding and provides desired capabilities for detecting and correcting errors in the demodulated signal. Possible ways of addressing his problem are discussed, but no actual solution is presented. A modification to this approach is disclosed in 'Combined coding for error control and increased robustness to system nonlinearities in OFDM' by the same authors in 1996 *IEEE 46th Vehicular Technology Conference*, April 1996, pp. 904–908. In this modification a linear block code is chosen to provide desired properties of error correction and detection; it is proposed then to exploit the linearity and redundancy in the code to transform the code values systematically to new values which reduce the PMEPR but have equivalent error detection and correction properties. Examples are given for 4B/7B, 4B/8B and 11B/15B codes, in which the required transformation is identified by a procedure involving listing all possible code word values in order of the PMEPR for a multi-carrier signal modulated in accordance with each code word. Although such an exhaustive-search approach is feasible for relatively short code words (e.g. of the order of 15 bits), the number of possible code words to be checked increases very rapidly with code word length. Thus, even for a 32-bit code word, in excess of 4,000,000,000 code words would potentially need to be listed, and this would be at best extremely time-consuming and in practice possibly prohibitive. The obstacle presented by this requirement is potentially increased by the absence of any guarantee that an appropriate subset of code words actually exists within the set being examined.

Popović, in the paper cited earlier, proposes the use of a single binary or polyphase complementary sequence. However, the 1996 paper mentioned above suggests that such sequences are not readily amenable in relation to their error correction/detection capability.

Thus the problem remains of identifying a set containing many different code words all of which satisfy desired criteria regarding error correction and detection properties, the maximum PMEPR of multi-carrier signals modulated in accordance with those code words, and ease and efficiency of implementation of a practical encoder and decoder (for example including use of combinatorial logic). The non-trivial scale of this problem may be seen by considering the example of 5-bit data words to be encoded using 8-bit code words, as required in FIG. 5. In the general case there are 256 possible code words, of which 32 are to be selected to encode the 32 possible data words. In the absence of knowledge of how particular combinations of code words might affect compliance with the criteria noted above, all possible subsets of 32 code words out of 256 would need to be considered. There are 256!/(224!.32!) possible subsets, i.e. of the order of $10^{41}$. If 8-bit data words are to be encoded using 16-bit code words, there are 65536!/(65280!.256!) possible subsets to be considered, which is of the order of $10^{726}$.

Figure 8:
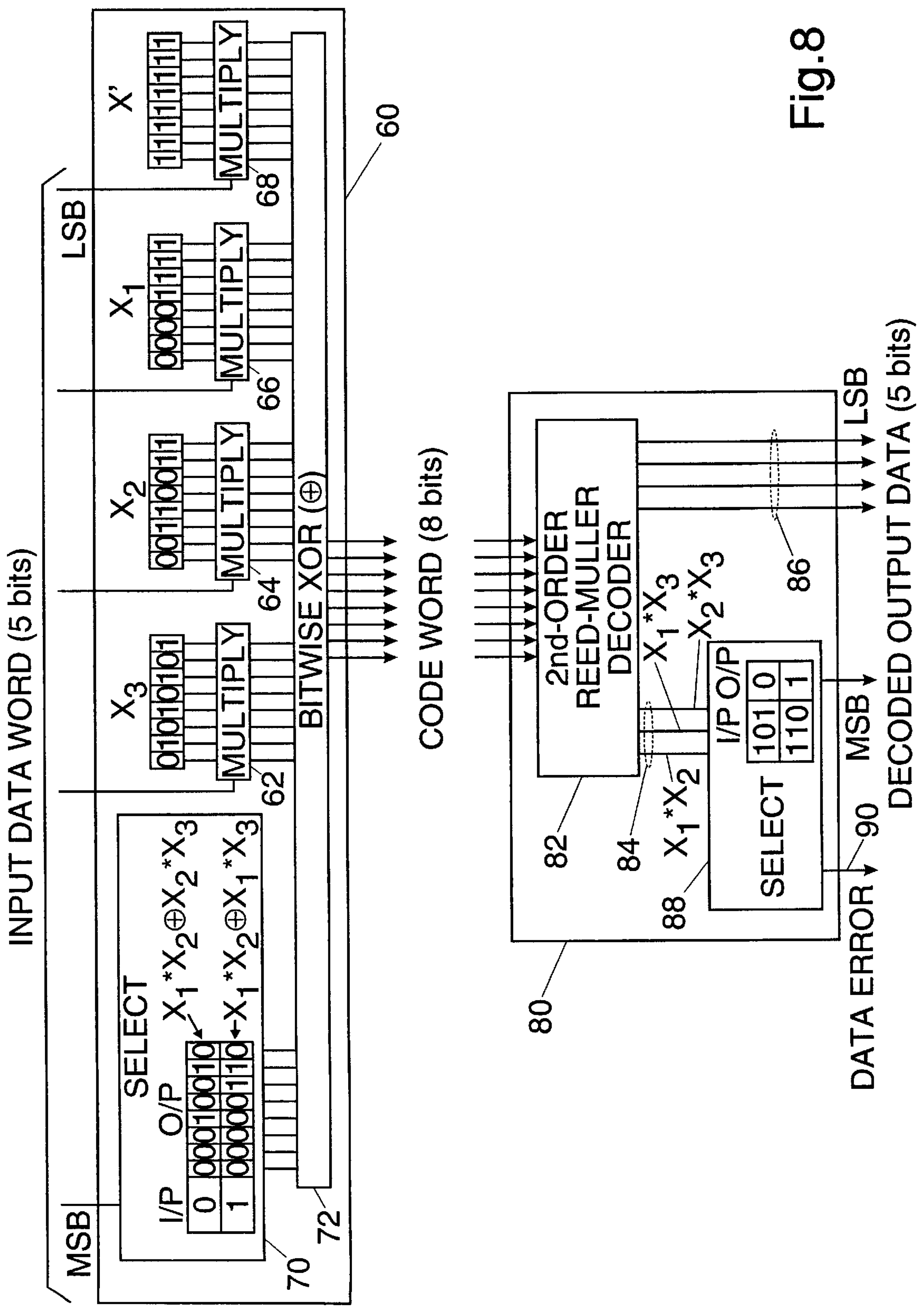
FIG. 8 shows an encoder and decoder incorporating the present invention, for encoding 5-bit data words as 8-bit code words.

FIG. 8 shows a 5B/8B encoder 60 and a decoder 80, which have the following properties:

- error detection: the minimum Hamming distance (i.e. the minimum number of symbols whose value must be altered, for example by interference, to transform a valid code word into some other valid code word) is 2 (more generally, for binary code words described below containing $2^m$ symbols, this distance is $2^{m-2}$);
- the maximum PMEPR of multi-carrier signals modulated in accordance with the 8-bit code words is 3 dB in terms of power level, i.e. 6 dBV;
- the block code with which data are encoded contains a sufficiently large number of different code words to enable a usefully high data transfer rate to be attained;
- the encoder 60 and more particularly the decoder 80 can be readily implemented using combinatorial logic.

Referring to FIG. 8, the encoder 60 receives five data bits at its inputs. Four of these inputs (for the four least significant bits) are connected to respective binary multipliers 62 to 68, and the fifth (for the most significant bit) is coupled to a selector 70. Each multiplier 62 to 68 is arranged to multiply the input bit it receives by a respective fixed 8-bit value as follows:- multiplier 62: 0101 0101; multiplier 64: 0011 0011; multiplier 66: 0000 1111; and multiplier 68: 1111 1111. In practice each multiplier may be implemented using eight logical-AND gates to combine the input bit separately with each bit of the respective fixed 8-bit value. The outputs of these four multipliers are connected to a bitwise exclusive-OR circuit 72, which effectively performs bitwise binary addition (i.e. addition modulo 2 of bits of corresponding significance) of the 8-bit values it receives.

Depending on whether the most significant input bit is 0 or 1 in value, the selector 70 selects one of two possible eight-bit values: 0001 0010 or 0000 0110 respectively. The choice of these particular values as the ones from which selection may be made will be explained below. The selected value is supplied to a fifth input of the exclusive-OR circuit 72, the output of which constitutes the 8-bit code word. The encoder 60 as shown in FIG. 8 encodes the thirty-two possible 5-bit data words as the following 8-bit code words:

TABLE 1

| 5-bit data | 8-bit code | 5-bit data | 8-bit code |
|---|---|---|---|
| 00000 | 0001 0010 | 10000 | 0000 0110 |
| 00001 | 1110 1101 | 10001 | 1111 1001 |
| 00010 | 0001 1101 | 10010 | 0000 1001 |
| 00011 | 1110 0010 | 10011 | 1111 0110 |
| 00100 | 0010 0001 | 10100 | 0011 0101 |
| 00101 | 1101 1110 | 10101 | 1100 1010 |
| 00110 | 0010 1110 | 10110 | 0011 1010 |
| 00111 | 1101 0001 | 10111 | 1100 0101 |
| 01000 | 0100 0111 | 11000 | 0101 0011 |
| 01001 | 1011 1000 | 11001 | 1010 1100 |
| 01010 | 0100 1000 | 11010 | 0101 1100 |
| 01011 | 1011 0111 | 11011 | 1010 0011 |
| 01100 | 0111 0100 | 11100 | 0110 0000 |
| 01101 | 1000 1011 | 11101 | 1001 1111 |
| 01110 | 0111 1011 | 11110 | 0110 1111 |
| 01111 | 1000 0100 | 11111 | 1001 0000 |

The decoder 80 receives the 8-bit code words at its inputs, which couple the bit values to an 8-bit 2nd-order Reed-Muller (RM) decoder 82. Such decoders are in themselves known, such as the Reed decoding algorithm using majority logic decoding as described, for example, in 'The Theory of Error-Correcting Codes' by F. J. MacWilliams and N. J. A. Sloane, North-Holland, Amsterdam, 1986, pp.385–388. They implement simultaneous decoding, and detection and correction of errors affecting some number of bits of the input code word up to at least a limit related to the length of the code word. The RM decoder 82 produces two sets of output signals which together comprise the output value of the RM decoder. A 'second-order' set of signals 84, in this case three in number, identifies a 'family' or coset of output values, and a 'first-order' set of four signals 86 identifies a particular output value within that coset. These four first-order signals 86 directly provide the decoded values for the four least significant bits of the data word output by the overall decoder 80. The three second-order signals 84 are connected to a selector 88 which generates the value of the fifth, most significant, bit of the decoder's output data word. To this end the selector 88 compares the values of the three second-order signals 84, taken together in sequence as described below, with two stored 3-bit values. If the second-order signals 84 have the value 101 the selector provides a binary 0 as the value of the most significant output bit; if they have a value of 110, it provides a binary 1. If the signals 84 have any other value than 101 or 110, then the received 8-bit code word has been treated by the RM decoder 82 as being other than one appearing in Table 1 above, and this is indicated by a signal at a data error output 90 of the selector 88.

An alternative decoding technique, described below with reference to FIG. 11 in the context of 16-bit code words, only outputs valid code words (i.e. code words which can be output by the encoder).

The error detection and correction capabilities of the 2nd-order RM decoder 82 itself, which are well established, are inherited by the overall decoder 80 by virtue of the incorporation of the RM decoder 82 within it. Thus, as noted above, the code's minimum Hamming distance is 2 ($=2^{m-2}$ with m=3). The decoder 80 can detect up to $2^{m-2}-1$ errors affecting the bits constituting a code word; for m=3 the number of detectable errors is one. In the limiting case of an 8-bit code word, chosen initially here for simplicity of explanation, the decoder 80 cannot actually be guaranteed to correct such an error, as the number of correctable errors in the general case is $2^{m-3}-1$, which for m=3 equals zero. For a single-bit error in the received code word, either of two valid 8-bit code words could in some cases be affected by a change in a single bit position to produce the same received code word. In practice the above decoding technique would arbitrarily select one of the valid possibilities, so the error may be (but cannot be guaranteed to be) corrected. For longer code words, discussed below, error correction is possible.

It can be shown that a multi-carrier signal modulated in accordance with the 8-bit code words in Table 1 has a PMEPR of no more than 3 dB. The decoder 80 operates using analytical techniques (i.e. taking advantage of systematic patterns within the set of code words), and can be implemented, for example, using combinatorial logic at least in part; although the selector 88 as described is effectively a look-up table, this table does not hold the entire set of code words and this manner of implementation is not essential. In the code shown in Table 1 there are thirty-two code words available, which provides an acceptable data transfer rate (i.e. five data bits per code word).

It should be noted that although the decoder 80 contains a 2nd-order RM decoder 82 which is in itself known, the code in Table 1 does not comprise the 2nd-order Reed-Muller code (of length eight) RM(2,3) in itself. It is instead a particular, non-linear sub-code of the 2nd-order Reed-Muller code of length eight, and has the novel and highly advantageous combination of properties set out above. Such a code has not been previously recognized. Likewise the decoder 80 does not constitute a conventional use of the 8-bit 2nd-order RM decoder 82, i.e. use to provide decoding of data encoded according to a 7B/8B 2nd-order Reed-Muller code.

The 5B/8B code implemented by the encoder 60 and decoder 80 of FIG. 8 and having this desired combination of properties is derived in the following manner, which, as will be described, may readily be extended to produce codes with longer-length code words. The starting point for the 5B/8B code is the following generator matrix of 8-bit values which defines a 'base' code:

| | |
|---|---|
| (0000 1111) | $(X_1)$ |
| (0011 0011) | $(X_2)$ |
| (0101 0101) | $(X_3)$ |
| (1111 1111) | $(X')$ |

Each row of this matrix is identified with labels $X_1$, $X_2$, $X_3$, X' respectively for convenience of reference in the following description.

The base code comprises all sixteen linear combinations of rows of this generator matrix, that is combinations of the form $$a_1X_1 \oplus a_2X_2 \oplus a_3X_3 \oplus a'X'$$

where $\oplus$ indicates bitwise modulo-two addition and $a_1$, $a_2$, $a_3$ and a' are coefficients which each take values of 0 or 1. This base code is linear, i.e. the result of a bitwise exclusive-OR operation on any two of its code words is another code word in the code. A sub-code of this code is any subset of the code words in the base code (and in particular could be the entire code), and a linear sub-code is such a sub-code which is itself linear. In practice, a sub-code must contain a sufficient proportion of the code words in the base code to constitute a usable system. The actual proportion depends on a variety of parameters, in particular the length of the code word and the number of possible values for each symbol in a code word (two values in the case of binary). In the current case of binary code words of length eight, a linear sub-code comprising eight of the sixteen code words in the base code might suffice. For longer code words and/or more possible symbol values a smaller proportion than half (e.g. a quarter, eighth, sixteenth, etc.) could well suffice.

An eight-bit generator array is created by combining the generator matrix with additional rows (in this case three) derived by bitwise multiplication of all possible pairs of the rows $X_1$, $X_2$ and $X_3$, that is $X_1{*}X_2$, $X_1{*}X_3$ and $X_2{*}X_3$:

| | |
|---|---|
| (0000 0011) | $(X_1 * X_2)$ |
| (0000 0101) | $(X_1 * X_3)$ |
| (0001 0001) | $(X_2 * X_3)$ |

Bitwise multiplication, indicated by the symbol *, involves multiplying the bits at corresponding positions in the two values being multiplied, or equivalently performing a bit-wise logical AND operation on those two values.

These additional rows are combined by a bitwise exclusive-OR operation (bitwise addition modulo 2) to produce (in the case of code words of length eight) three second-order values, or second-order 'coset representatives'. A first coset representative is produced by combining rows $(X_1{*}X_2)$ and $(X_2{*}X_3)$:

| | |
|---|---|
| (0001 0010) | $(X_1 * X_2) \oplus (X_2 * X_3)$ |

The remaining coset representatives are produced by identifying all possible permutations of the subscripts of the row identifiers $X_1$, $X_2$ and $X_3$ in the expression $(X_1{*}X_2) \oplus (X_2{*}X_3)$ which yield distinct results:

| | |
|---|---|
| (0001 0100) | $(X_1 * X_3) \oplus (X_2 * X_3)$ |
| (0000 0110) | $(X_1 * X_2) \oplus (X_1 * X_3)$ |

Since $(X_1{*}X_2)$ has the same value as $(X_2{*}X_1)$, and $(X_2{*}X_3)$ has the same value as $(X_3{*}X_2)$, it follows that $(X_1{*}X_2) \oplus (X_2{*}X_3)$ and $(X_3{*}X_2) \oplus (X_2{*}X_1)$ have the same value, and therefore are not distinct. On the same basis the permutation $(X_1{*}X_3) \oplus (X_3{*}X_2)$ has been replaced above by the equivalent expression $(X_1{*}X_3) \oplus (X_2{*}X_3)$ for the sake of clarity in indicating which additional rows are involved in each coset representative.

Finally these coset representatives are each combined by bitwise exclusive-OR operations with all code words in the base code to produce a total of 48 code words, constituting a set of three cosets of the base code:

TABLE 2

| $(X_1{*}X_2) \oplus (X_2{*}X_3)$ | $(X_1{*}X_3) \oplus (X_2{*}X_3)$ | $(X_1{*}X_2) \oplus (X_1{*}X_3)$ |
|---|---|---|
| 0001 0010 | 0001 0100 | 0000 0110 |
| 1110 1101 | 1110 1011 | 1111 1001 |
| 0001 1101 | 0001 1011 | 0000 1001 |
| 1110 0010 | 1110 0100 | 1111 0110 |
| 0010 0001 | 0010 0111 | 0011 0101 |
| 1101 1110 | 1101 1000 | 1100 1010 |
| 0010 1110 | 0010 1000 | 0011 1010 |
| 1101 0001 | 1101 0111 | 1100 0101 |
| 0100 0111 | 0100 0001 | 0101 0011 |
| 1011 1000 | 1011 1110 | 1010 1100 |
| 0100 1000 | 0100 1110 | 0101 1100 |
| 1011 0111 | 1011 0001 | 1010 0011 |
| 0111 0100 | 0111 0010 | 0110 0000 |
| 1000 1011 | 1000 1101 | 1001 1111 |
| 0111 1011 | 0111 1101 | 0110 1111 |
| 1000 0100 | 1000 0010 | 1001 0000 |

All of these 48 code words provide the combination of properties described earlier and in the most general case any selection from among these 48 code words can be made. In practice it is preferable to use a number of code words which is an integer power of two, thereby simplifying division of the incoming data stream into blocks for encoding, and furthermore to select code words in groups of sixteen having the same coset representative, to facilitate implementation. To this end the number of coset representatives chosen is the highest power of two that is no greater than the number of coset representatives available; in this case there are three available, and the corresponding highest power of two is $2^1$, that is 2. Choosing two coset representatives provides 32 code words; the maximum corresponding binary data word length for which all data words can be encoded is therefore five bits, as shown in Table 1.

In the case of the encoder 60 and decoder 80 shown in FIG. 8., the code words having the coset representatives $(X_1{*}X_2) \oplus (X_2{*}X_3)$ (i.e. 0001 0010) and $(X_1{*}X_2) \oplus (X_1{*}X_3)$ (i.e. 0000 0110) have been arbitrarily selected, as indicated within the selector 70. It can also be seen that the values selected by the selector 70 in accordance with the value of the most significant bit of the input data word are themselves these two coset representatives. The assignment of a particular coset representative to a particular input bit value, or indeed to a particular input bit position (e.g. the most significant bit), is arbitrary, but must be consistent as between the selector 70 in the encoder 60 and the selector 88 in the decoder 80. The three second-order signals 84 provided by the RM decoder 82 correspond to each of the additional rows $(X_1{*}X_2)$, $(X_1{*}X_3)$ and $(X_2{*}X_3)$ in the 8-bit generator array described above. The individual bits of the 3-bit values stored in the selector 88 correspond to each of these rows respectively. Each 3-bit value is associated with a specific value for the most significant data bit, and indicates which pair of the three additional rows is present in the coset representative assigned (in the encoder 60) to that data bit value. Thus the data bit value 0 has assigned to it the coset representative $(X_1,{*}X_2)\oplus(X_2{*}X_3)$; correspondingly the presence in this coset representative of the additional rows $(X_1{*}X_2)$ and $(X_2{*}X_3)$ is indicated by the positions of the 1 bits in the 3-bit value 101 stored in the selector 88 for that data bit value.

It can also be seen in FIG. 8 that the four least significant data bits are multiplied in the encoder 60 by respective ones of the rows $X_3$, $X_2$, $X_1$ and X' of the generator matrix. The first-order signals 86 provided by the RM decoder 82 correspond to the coefficients $a_3$, $a_2$, $a_1$, a' for each of these rows. The assignment of particular input data bits to each of these rows is arbitrary, provided the same assignment is used in both the encoder 60 and the decoder 80. In effect this means that there are many possible assignments of particular 8-bit code words to particular 5-bit data words, governed by the assignment of individual input data bits to each of these rows, by the choice of which data bit controls selection of a coset representative in the selector 70, and by the choice of coset representatives from which that selection may be made.

As noted above, the code words in Table 2 constitute a set of cosets of a linear sub-code (in this case the whole code) having a generator matrix comprising the rows $X_1$, $X_2$, $X_3$ and X'. Using a base code of this kind provides desired error detection and correction properties. Selection of a linear sub-code ensures that encoding and decoding within each coset can be implemented compactly, for example using combinatorial logic. A coset can in general be considered to be a systematic shift or translation of the base code to a different part of the overall space of possible code words. Use of cosets of the linear sub-code enables avoidance of certain undesired code words (such as all zeroes and all ones) which would result in particularly high values of PMEPR, but can also enable the error control properties of the base code to be retained to some extent. Choosing the code words from a set of such cosets allows good control of PMEPR because, as has not previously been recognized, each coset of the base code tends to contain code words having broadly similar associated PMEPRs. In the particular case where the coset representatives have the form identified above, it can be shown that the PMEPR does not exceed 3 dB.

The encoding and decoding capabilities of this invention can be applied to longer code words as follows. To retain the benefits of error control and ease of implementation, it is preferable for the code word length to be an integer power of two. Thus the next appropriate code word length above 8 is 16. For 16-bit code words the generator matrix is:

| | |
|---|---|
| (0000 0000 1111 1111) | $(X_1)$ |
| (0000 1111 0000 1111) | $(X_2)$ |
| (0011 0011 0011 0011) | $(X_3)$ |
| (0101 0101 0101 0101) | $(X_4)$ |
| (1111 1111 1111 1111) | $(X')$ |

The 16-bit base code comprises all thirty-two linear combinations of rows of this generator matrix, that is combinations of the form $$a_1X_1\oplus a_2X_2\oplus a_3X_3\oplus a_4X_4\oplus a'X'$$

where $a_1$, $a_2$, $a_3$, $a_4$ and a' each take values of 0 or 1.

The corresponding generator array is created by combining the 16-bit generator matrix with additional rows (in this case six) derived by bitwise multiplication of all possible pairs of the rows $X_1$, $X_2$, $X_3$ and $X_4$:

| | |
|---|---|
| (0000 0000 0000 1111) | $(X_1*X_2)$ |
| (0000 0000 0011 0011) | $(X_1*X_3)$ |
| (0000 0000 0101 0101) | $(X_1*X_4)$ |
| (0000 0011 0000 0011) | $(X_2*X_3)$ |
| (0000 0101 0000 0101) | $(X_2*X_4)$ |
| (0001 0001 0001 0001) | $(X_3*X_4)$ |

These additional rows are combined by bitwise exclusive-OR operations, to produce (in the case of code words of length sixteen) twelve second-order coset representatives. A first coset representative is produced by combining rows $(X_1{*}X_2)$, $(X_2{*}X_3)$ and $(X_3{*}X_4)$:

(0001 0010 0001 1101) $(X_1*X_2)\oplus(X_2*X_3)\oplus(X_3*X_4)$

The other coset representatives are produced by identifying all possible permutations of the subscripts of the row identifiers $X_1$, $X_2$, $X_3$ and $X_4$ in the expression $(X_1{*}X_2)\oplus(X_2{*}X_3)\oplus(X_3{*}X_4)$ which yield distinct results:

| | |
|---|---|
| (0001 0100 0001 1011) | $(X_1*X_2)\oplus(X_2*X_4)\oplus(X_3*X_4)$ |
| (0000 0110 0011 0101) | $(X_1*X_3)\oplus(X_2*X_3)\oplus(X_2*X_4)$ |
| (0001 0100 0010 0111) | $(X_1*X_3)\oplus(X_3*X_4)\oplus(X_2*X_4)$ |
| (0000 0110 0101 0011) | $(X_1*X_4)\oplus(X_2*X_4)\oplus(X_2*X_3)$ |
| (0001 0010 0100 0111) | $(X_1*X_4)\oplus(X_3*X_4)\oplus(X_2*X_3)$ |
| (0001 0001 0010 1101) | $(X_1*X_2)\oplus(X_1*X_3)\oplus(X_3*X_4)$ |
| (0001 0001 0100 1011) | $(X_1*X_2)\oplus(X_1*X_4)\oplus(X_3*X_4)$ |
| (0000 0011 0110 0101) | $(X_2*X_3)\oplus(X_1*X_3)\oplus(X_1*X_4)$ |
| (0000 0101 0110 0011) | $(X_2*X_4)\oplus(X_1*X_4)\oplus(X_1*X_3)$ |
| (0000 0101 0011 1001) | $(X_1*X_3)\oplus(X_1*X_2)\oplus(X_2*X_4)$ |
| (0000 0011 0101 1001) | $(X_2*X_3)\oplus(X_1*X_2)\oplus(X_1*X_4)$ |

As before, some permutations have been replaced above by equivalent expressions for the sake of clarity in indicating which additional rows are involved in each coset representative.

Finally these coset representatives are each combined by bitwise exclusive-OR operations with all code words in the 16-bit base code to produce a total of 384 code words, constituting a set of twelve cosets of the base code:

TABLE 3

| $(X_1*X_2)\oplus(X_2*X_3)\oplus(X_3*X_4)$ | $(X_1*X_2)\oplus(X_2*X_4)\oplus(X_3*X_4)$ | $(X_1*X_3)\oplus(X_2*X_3)\oplus(X_2*X_4)$ |
|---|---|---|
| 0001 0010 0001 1101 | 0001 0100 0001 1011 | 0000 0110 0011 0101 |
| 1110 1101 1110 0010 | 1110 1011 1110 0100 | 1111 1001 1100 1010 |
| 0001 0010 1110 0010 | 0001 0100 1110 0100 | 0000 0110 1100 1010 |
| 1110 1101 0001 1101 | 1110 1011 0001 1011 | 1111 1001 0011 0101 |
| 0001 1101 0001 0010 | 0001 1011 0001 0100 | 0000 1001 0011 1010 |
| 1110 0010 1110 1101 | 1110 0100 1110 1011 | 1111 0110 1100 0101 |
| 0001 1101 1110 1101 | 0001 1011 1110 1011 | 0000 1001 1100 0101 |
| 1110 0010 0001 0010 | 1110 0100 0001 0100 | 1111 0110 0011 1010 |
| 0010 0001 0010 1110 | 0010 0111 0010 1000 | 0011 0101 0000 0110 |
| 1101 1110 1101 0001 | 1101 1000 1101 0111 | 1100 1010 1111 1001 |
| 0010 0001 1101 0001 | 0010 0111 1101 0111 | 0011 0101 1111 1001 |
| 1101 1110 0010 1110 | 1101 1000 0010 1000 | 1100 1010 0000 0110 |
| 0010 1110 0010 0001 | 0010 1000 0010 0111 | 0011 1010 0000 1001 |
| 1101 0001 1101 1110 | 1101 0111 1101 1000 | 1100 0101 1111 0110 |
| 0010 1110 1101 1110 | 0010 1000 1101 1000 | 0011 1010 1111 0110 |
| 1101 0001 0010 0001 | 1101 0111 0010 0111 | 1100 0101 0000 1001 |
| 0100 0111 0100 1000 | 0100 0001 0100 1110 | 0101 0011 0110 0000 |
| 1011 1000 1011 0111 | 1011 1110 1011 0001 | 1010 1100 1001 1111 |
| 0100 0111 1011 0111 | 0100 0001 1011 0001 | 0101 0011 1001 1111 |
| 1011 1000 0100 1000 | 1011 1110 0100 1110 | 1010 1100 0110 0000 |
| 0100 1000 0100 0111 | 0100 1110 0100 0001 | 0101 1100 0110 1111 |
| 1011 0111 1011 1000 | 1011 0001 1011 1110 | 1010 0011 1001 0000 |
| 0100 1000 1011 1000 | 0100 1110 1011 1110 | 0101 1100 1001 0000 |
| 1011 0111 0100 0111 | 1011 0001 0100 0001 | 1010 0011 0110 1111 |
| 0111 0100 0111 1011 | 0111 0010 0111 1101 | 0110 0000 0101 0011 |
| 1000 1011 1000 0100 | 1000 1101 1000 0010 | 1001 1111 1010 1100 |
| 0111 0100 1000 0100 | 0111 0010 1000 0010 | 0110 0000 1010 1100 |
| 1000 1011 0111 1011 | 1000 1101 0111 1101 | 1001 1111 0101 0011 |
| 0111 1011 0111 0100 | 0111 1101 0111 0010 | 0110 1111 0101 1100 |
| 1000 0100 1000 1011 | 1000 0010 1000 1101 | 1001 0000 1010 0011 |
| 0111 1011 1000 1011 | 0111 1101 1000 1101 | 0110 1111 1010 0011 |
| 1000 0100 0111 0100 | 1000 0010 0111 0010 | 1001 0000 0101 1100 |

| $(X_1*X_3)\oplus(X_3*X_4)\oplus(X_2*X_4)$ | $(X_1*X_4)\oplus(X_2*X_4)\oplus(X_2*X_3)$ | $(X_1*X_4)\oplus(X_3*X_4)\oplus(X_2*X_3)$ |
|---|---|---|
| 0001 0100 0010 0111 | 0000 0110 0101 0011 | 0001 0010 0100 0111 |
| 1110 1011 1101 1000 | 1111 1001 1010 1100 | 1110 1101 1011 1000 |
| 0001 0100 1101 1000 | 0000 0110 1010 1100 | 0001 0010 1011 1000 |
| 1110 1011 0010 0111 | 1111 1001 0101 0011 | 1110 1101 0100 0111 |
| 0001 1011 0010 1000 | 0000 1001 0101 1100 | 0001 1101 0100 1000 |
| 1110 0100 1101 0111 | 1111 0110 1010 0011 | 1110 0010 1011 0111 |
| 0001 1011 1101 0111 | 0000 1001 1010 0011 | 0001 1101 1011 0111 |
| 1110 0100 0010 1000 | 1111 0110 0101 1100 | 1110 0010 0100 1000 |
| 0010 0111 0001 0100 | 0011 0101 0110 0000 | 0010 0001 0111 0100 |
| 1101 1000 1110 1011 | 1100 1010 1001 1111 | 1101 1110 1000 1011 |
| 0010 0111 1110 1011 | 0011 0101 1001 1111 | 0010 0001 1000 1011 |
| 1101 1000 0001 0100 | 1100 1010 0110 0000 | 1101 1110 0111 0100 |
| 0010 1000 0001 1011 | 0011 1010 0110 1111 | 0010 1110 0111 1011 |
| 1101 0111 1110 0100 | 1100 0101 1001 0000 | 1101 0001 1000 0100 |
| 0010 1000 1110 0100 | 0011 1010 1001 0000 | 0010 1110 1000 0100 |
| 1101 0111 0001 1011 | 1100 0101 0110 1111 | 1101 0001 0111 1011 |
| 0100 0001 0111 0010 | 0101 0011 0000 0110 | 0100 0111 0001 0010 |
| 1011 1110 1000 1101 | 1010 1100 1111 1001 | 1011 1000 1110 1101 |
| 0100 0001 1000 1101 | 0101 0011 1111 1001 | 0100 0111 1110 1101 |
| 1011 1110 0111 0010 | 1010 1100 0000 0110 | 1011 1000 0001 0010 |
| 0100 1110 0111 1101 | 0101 1100 0000 1001 | 0100 1000 0001 1101 |
| 1011 0001 1000 0010 | 1010 0011 1111 0110 | 1011 0111 1110 0010 |
| 0100 1110 1000 0010 | 0101 1100 1111 0110 | 0100 1000 1110 0010 |
| 1011 0001 0111 1101 | 1010 0011 0000 1001 | 1011 0111 0001 1101 |
| 0111 0010 0100 0001 | 0110 0000 0011 0101 | 0111 0100 0010 0001 |
| 1000 1101 1011 1110 | 1001 1111 1100 1010 | 1000 1011 1101 1110 |
| 0111 0010 1011 1110 | 0110 0000 1100 1010 | 0111 0100 1101 1110 |
| 1000 1101 0100 0001 | 1001 1111 0011 0101 | 1000 1011 0010 0001 |
| 0111 1101 0100 1110 | 0110 1111 0011 1010 | 0111 1011 0010 1110 |
| 1000 0010 1011 0001 | 1001 0000 1100 0101 | 1000 0100 1101 0001 |
| 0111 1101 1011 0001 | 0110 1111 1100 0101 | 0111 1011 1101 0001 |
| 1000 0010 0100 1110 | 1001 0000 0011 1010 | 1000 0100 0010 1110 |

| $(X_1*X_2)\oplus(X_1*X_3)\oplus(X_3*X_4)$ | $(X_1*X_2)\oplus(X_1*X_4)\oplus(X_3*X_4)$ | $(X_2*X_3)\oplus(X_1*X_3)\oplus(X_1*X_4)$ |
|---|---|---|
| 0001 0001 0010 1101 | 0001 0001 0100 1011 | 0000 0011 0110 0101 |
| 1110 1110 1101 0010 | 1110 1110 1011 0100 | 1111 1100 1001 1010 |
| 0001 0001 1101 0010 | 0001 0001 1011 0100 | 0000 0011 1001 1010 |
| 1110 1110 0010 1101 | 1110 1110 0100 1011 | 1111 1100 0110 0101 |
| 0001 1110 0010 0010 | 0001 1110 0100 0100 | 0000 1100 0110 1010 |
| 1110 0001 1101 1101 | 1110 0001 1011 1011 | 1111 0011 1001 0101 |
| 0001 1110 1101 1101 | 0001 1110 1011 1011 | 0000 1100 1001 0101 |

TABLE 3-continued

| | | |
|---|---|---|
| 1110 0001 0010 0010 | 1110 0001 0100 0100 | 1111 0011 0110 1010 |
| 0010 0010 0001 1110 | 0010 0010 0111 1000 | 0011 0000 0101 0110 |
| 1101 1101 1110 0001 | 1101 1101 1000 0111 | 1100 1111 1010 1001 |
| 0010 0010 1110 0001 | 0010 0010 1000 0111 | 0011 0000 1010 1001 |
| 1101 1101 0001 1110 | 1101 1101 0111 1000 | 1100 1111 0101 0110 |
| 0010 1101 0001 0001 | 0010 1101 0111 0111 | 0011 1111 0101 1001 |
| 1101 0010 1110 1110 | 1101 0010 1000 1000 | 1100 0000 1010 0110 |
| 0010 1101 1110 1110 | 0010 1101 1000 1000 | 0011 1111 1010 0110 |
| 1101 0010 0001 0001 | 1101 0010 0111 0111 | 1100 0000 0101 1001 |
| 0100 0100 0111 1000 | 0100 0100 0001 1110 | 0101 0110 0011 0000 |
| 1011 1011 1000 0111 | 1011 1011 1110 0001 | 1010 1001 1100 1111 |
| 0100 0100 1000 0111 | 0100 0100 1110 0001 | 0101 0110 1100 1111 |
| 1011 1011 0111 1000 | 1011 1011 0001 1110 | 1010 1001 0011 0000 |
| 0100 1011 0111 0111 | 0100 1011 0001 0001 | 0101 1001 0011 1111 |
| 1011 0100 1000 1000 | 1011 0100 1110 1110 | 1010 0110 1100 0000 |
| 0100 1011 1000 1000 | 0100 1011 1110 1110 | 0101 1001 1100 0000 |
| 1011 0100 0111 0111 | 1011 0100 0001 0001 | 1010 0110 0011 1111 |
| 0111 0111 0100 1011 | 0111 0111 0010 1101 | 0110 0101 0000 0011 |
| 1000 1000 1011 0100 | 1000 1000 1101 0010 | 1001 1010 1111 1100 |
| 0111 0111 1011 0100 | 0111 0111 1101 0010 | 0110 0101 1111 1100 |
| 1000 1000 0100 1011 | 1000 1000 0010 1101 | 1001 1010 0000 0011 |
| 0111 1000 0100 0100 | 0111 1000 0010 0010 | 0110 1010 0000 1100 |
| 1000 0111 1011 1011 | 1000 0111 1101 1101 | 1001 0101 1111 0011 |
| 0111 1000 1011 1011 | 0111 1000 1101 1101 | 0110 1010 1111 0011 |
| 1000 0111 0100 0100 | 1000 0111 0010 0010 | 1001 0101 0000 1100 |

| $(X_2{*}X_4)\oplus(X_1{*}X_4)\oplus(X_1{*}X_3)$ | $(X_1{*}X_3)\oplus(X_1{*}X_2)\oplus(X_2{*}X_4)$ | $(X_2{*}X_3)\oplus(X_1{*}X_2)\oplus(X_1{*}X_4)$ |
|---|---|---|
| 0000 0101 0110 0011 | 0000 0101 0011 1001 | 0000 0011 0101 1001 |
| 1111 1010 1001 1100 | 1111 1010 1100 0110 | 1111 1100 1010 0110 |
| 0000 0101 1001 1100 | 0000 0101 1100 0110 | 0000 0011 1010 0110 |
| 1111 1010 0110 0011 | 1111 1010 0011 1001 | 1111 1100 0101 1001 |
| 0000 1010 0110 1100 | 0000 1010 0011 0110 | 0000 1100 0101 0110 |
| 1111 0101 1001 0011 | 1111 0101 1100 1001 | 1111 0011 1010 1001 |
| 0000 1010 1001 0011 | 0000 1010 1100 1001 | 0000 1100 1010 1001 |
| 1111 0101 0110 1100 | 1111 0101 0011 0110 | 1111 0011 0101 0110 |
| 0011 0110 0101 0000 | 0011 0110 0000 1010 | 0011 0000 0110 1010 |
| 1100 1001 1010 1111 | 1100 1001 1111 0101 | 1100 1111 1001 0101 |
| 0011 0110 1010 1111 | 0011 0110 1111 0101 | 0011 0000 1001 0101 |
| 1100 1001 0101 0000 | 1100 1001 0000 1010 | 1100 1111 0110 1010 |
| 0011 1001 0101 1111 | 0011 1001 0000 0101 | 0011 1111 0110 0101 |
| 1100 0110 1010 0000 | 1100 0110 1111 1010 | 1100 0000 1001 1010 |
| 0011 1001 1010 0000 | 0011 1001 1111 1010 | 0011 1111 1001 1010 |
| 1100 0110 0101 1111 | 1100 0110 0000 0101 | 1100 0000 0110 0101 |
| 0101 0000 0011 0110 | 0101 0000 0110 1100 | 0101 0110 0000 1100 |
| 1010 1111 1100 1001 | 1010 1111 1001 0011 | 1010 1001 1111 0011 |
| 0101 0000 1100 1001 | 0101 0000 1001 0011 | 0101 0110 1111 0011 |
| 1010 1111 0011 0110 | 1010 1111 0110 1100 | 1010 1001 0000 1100 |
| 0101 1111 0011 1001 | 0101 1111 0110 0011 | 0101 1001 0000 0011 |
| 1010 0000 1100 0110 | 1010 0000 1001 1100 | 1010 0110 1111 1100 |
| 0101 1111 1100 0110 | 0101 1111 1001 1100 | 0101 1001 1111 1100 |
| 1010 0000 0011 1001 | 1010 0000 0110 0011 | 1010 0110 0000 0011 |
| 0110 0011 0000 0101 | 0110 0011 0101 1111 | 0110 0101 0011 1111 |
| 1001 1100 1111 1010 | 1001 1100 1010 0000 | 1001 1010 1100 0000 |
| 0110 0011 1111 1010 | 0110 0011 1010 0000 | 0110 0101 1100 0000 |
| 1001 1100 0000 0101 | 1001 1100 0101 1111 | 1001 1010 0011 1111 |
| 0110 1100 0000 1010 | 0110 1100 0101 0000 | 0110 1010 0011 0000 |
| 1001 0011 1111 0101 | 1001 0011 1010 1111 | 1001 0101 1100 1111 |
| 0110 1100 1111 0101 | 0110 1100 1010 1111 | 0110 1010 1100 1111 |
| 1001 0011 0000 1010 | 1001 0011 0101 0000 | 1001 0101 0011 0000 |

All of these code words provide a combination of properties corresponding to that described earlier, i.e.:

the code's minimum Hamming distance is 4 ($=2^{m-2}$ with m=4); an error-correcting decoder can detect up to three ($2^{m-2}-1$) errors affecting the bits constituting a code word, and also correct one ($2^{m-3}-1=1$ with m=4) such error;

a multi-carrier signal modulated in accordance with the 16-bit code words in Table 3 has a PMEPR of no more than 3 dB;

a decoder for use with this code can operate using analytical techniques and can be implemented, for example, using combinatorial logic at least in part;

there are sufficient code words available to enable an acceptable data transfer rate to be attained.

For the preferred case (using a number of code words which is an integer power of two, and selecting code words in groups of thirty-two having the same coset representative) the highest power of two no greater than twelve (the number of coset representatives) is $2^3$, that is eight. Thus in the preferred case eight of the cosets of 32 code words each would be chosen, providing 256 code words, corresponding to a binary data word length of 8 bits.

Figure 9:
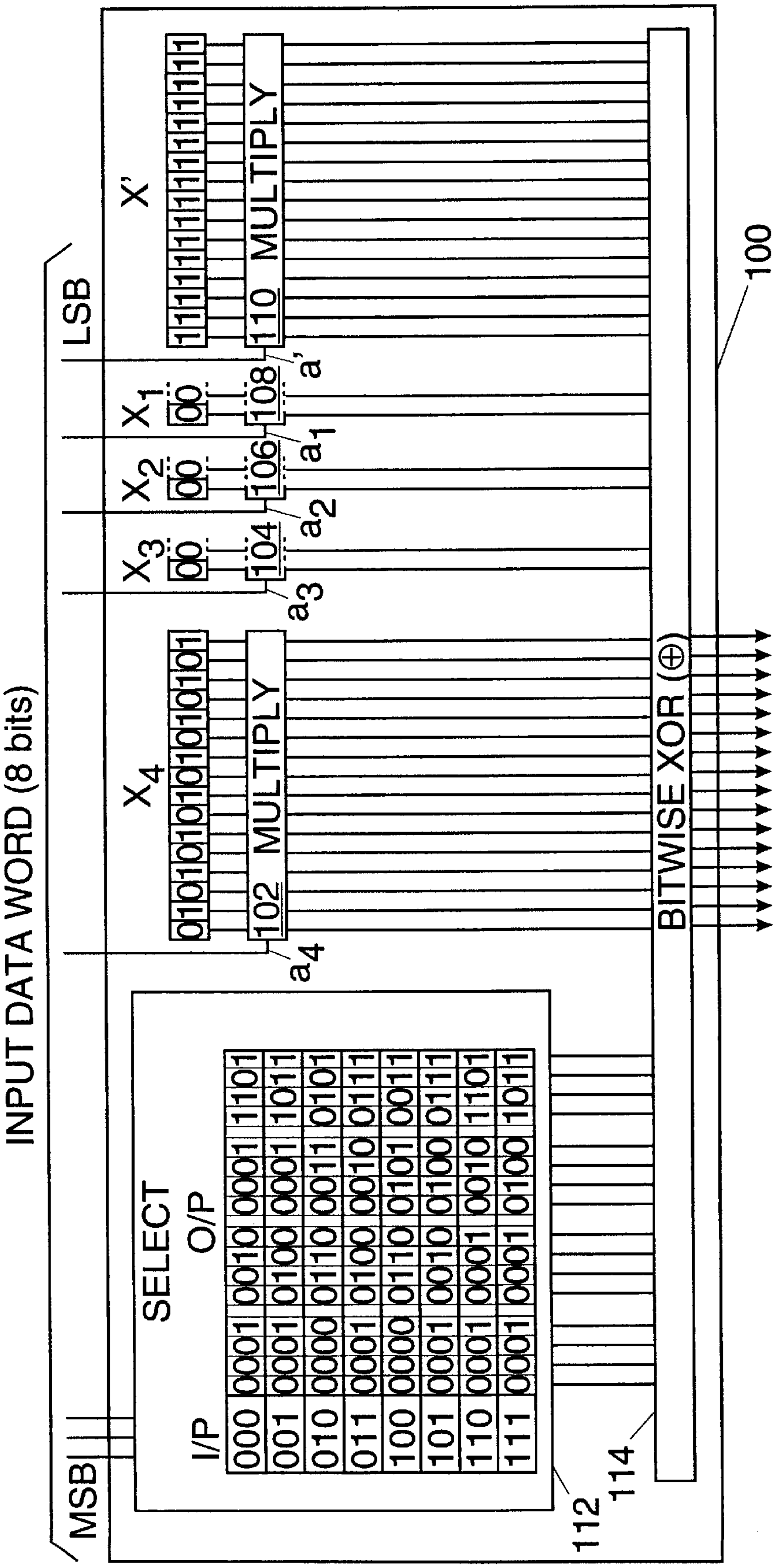
FIG. 9 shows an encoder, for encoding 8 bit data words as 16-bit code words.

FIG. 9 shows an 8B/16B encoder 100 for encoding 8-bit data words as 16-bit code words in accordance with this invention, using code words from Table 3. This encoder includes five binary multipliers 102 to 110 for multiplying the five least significant bits of the input data word by respective ones of the 16-bit generator matrix rows $X_4$, $X_3$, $X_2$, $X_1$ and X'. The three most significant bits of the input data word are supplied to a selector 112 which selects one of eight possible coset representative values in accordance with the combined value of those three bits. In the example shown in FIG. 9 the first eight of the twelve possible coset representatives listed in Table 3 have been chosen for use in the selector 112. The outputs of the five binary multipliers 102 to 110 and of the selector 112 are combined by a bitwise exclusive-OR circuit 114 to produce the 16-bit code word.

FIG. 10 shows a first example corresponding decoder 120 for converting the 16-bit code words back to the corresponding data words. The code words are supplied to a 16-bit 2nd-order RM decoder 122, corresponding to the 8-bit RM decoder 82 in FIG. 8 but for a larger value of m. Five first-order signals 124 produced by the RM decoder 122 directly provide the decoded values for the five least significant bits of the data word output by the overall decoder 120; these signals 124 correspond to the coefficients $a_4$, $a_3$, $a_2$, $a_1$ and a' for the rows $X_4$, $X_3$, $X_2$, $X_1$ and X' of the 16-bit generator matrix. Six second-order signals 126 from the RM decoder 122, corresponding to the six additional rows $(X_1*X_2)$, $(X_1*X_3)$, $(X_1*X_4)$, $(X_2*X_3)$, $(X_2*X_4)$ and $(X_3*X_4)$ of the generator array, are connected to a selector 128 which generates the values of the three most significant bits of the overall output data word. To this end the selector 128 compares the values of the six second-order signals 126, taken together, with the eight 6-bit values shown in FIG. 10; these 6-bit values could be stored, or derived by an appropriate procedure implemented in software or firmware as required. Each 6-bit value is associated with a specific combination of values for the three most significant data bits, and indicates which triplet of the six additional rows is present in the coset representative assigned (in the encoder 100) to that combination of three data bit values. If the second-order signals 126 have one of the eight stored values, the selector 128 provides the corresponding three data bit values for the most significant output bits. If the signals 126 have any other value, then the received 16-bit code word has been treated by the RM decoder 122 as being other than one in the first eight cosets in Table 3, and this is indicated by a signal at a data error output 130 of the selector 128.

Any decoder for an error-correcting code of which the minimum Hamming distance is d, such as the decoder 120 (for which $d=2^{m-2}$), correctly decodes a received code word whose distance from the transmitted code word is less than d/2. However, the decoder 120 is not a 'minimum distance' decoder; a minimum distance decoder has the additional property that it decodes to whichever of the possible transmitted code words has the least distance from the received code word, even if this distance is d/2 or more. Furthermore, occurrence of a signal at the data error output 130 indicates that the second-order Reed-Muller code word output by the RM decoder 122 is not one that can actually be output by the encoder 100, which is an indeterminate result.

Figure 11:
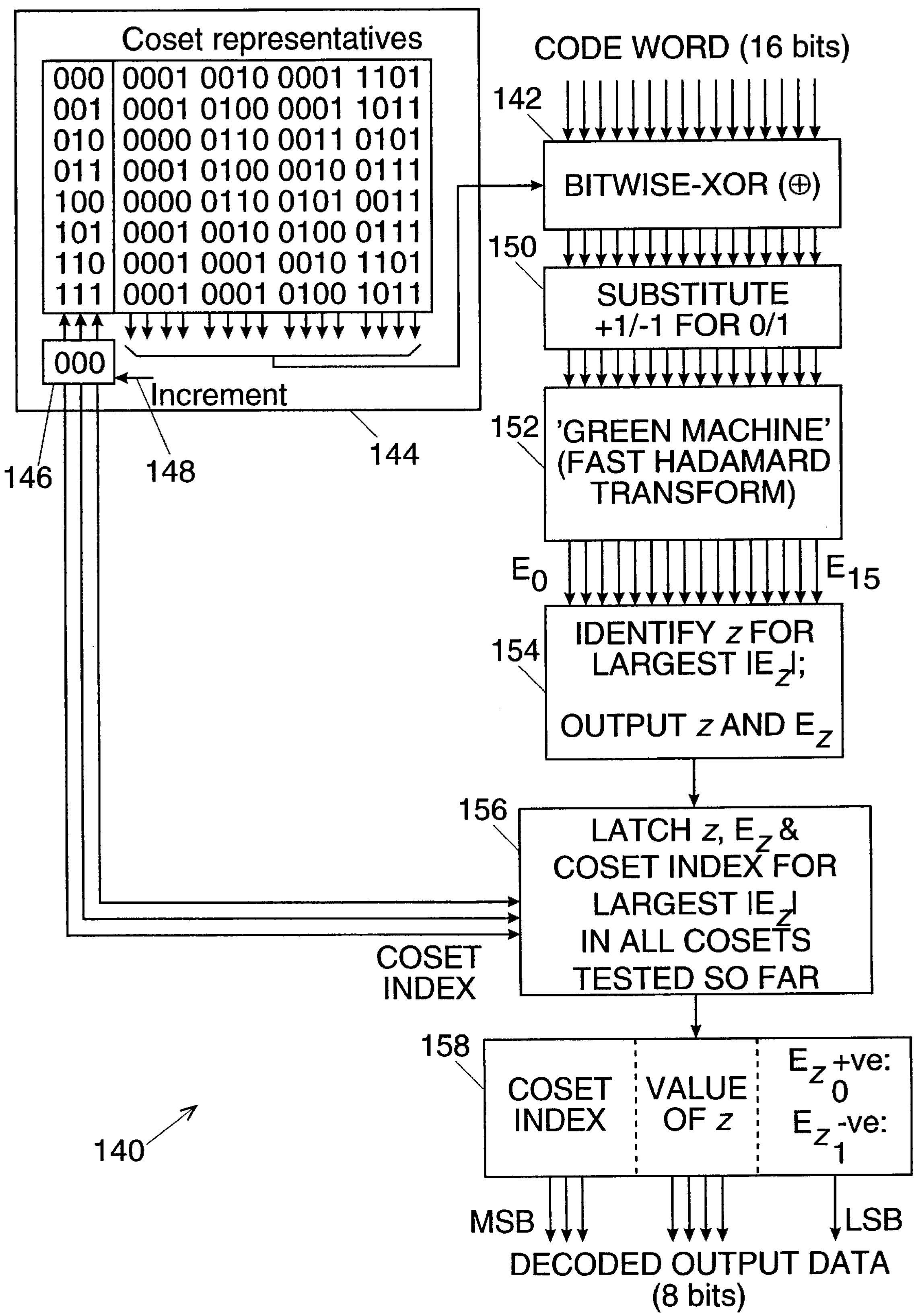
FIG. 11 shows an alternative decoder which may be used for decoding code words from the encoder of FIG. 9.

FIG. 11 shows an alternative 16-bit decoder 140 which only outputs valid code words (i.e. code words which can be output by the encoder 100) and furthermore is a minimum distance decoder with respect to this set of code words.

The method used in the decoder 140 is an example of the "Supercode" decoding method described in 'Soft decoding techniques for codes and lattices, including the Golay code and the Leech lattice' by J. H. Conway and N. J. A. Sloane, *IEEE Trans. Inform. Theory,* 1986, vol.IT-32, no. 1, pp. 41–50. For each coset representative in turn the received code word is exclusive-ORed with that coset representative, and the result is decoded as an element of the first-order Reed-Muller code of length sixteen, RM(1,4), at the same time assigning a "score" to that decoding. The decision as to which code word to decode to is made by selecting a coset whose representative attains the highest score (arbitrarily if more than one attains that score), and within that coset selecting the element of RM(1,4) previously identified for that coset.

The decoding of an element of RM(1,4) uses the fast Hadamard transform, as described in 'The Theory of Error-Correcting Codes' by F. J. MacWilliams and N. J. A. Sloane, North-Holland, Amsterdam, 1986. The fast Hadamard transform on a binary sequence of length $2^m$ produces $2^m$ transform components, each associated with a pair of elements of the first-order Reed-Muller code of length $2^m$, RM(1,m). The largest magnitude of all the components is the "score" for the decoding, and the decoding algorithm chooses the element of RM(1,m) corresponding to a component of largest magnitude (with the sign of that component determining which of the associated pair of code words is used).

Referring to FIG. 11 the decoder 140 receives each 16-bit code word in an exclusive-OR gate 142 which performs bitwise subtraction modulo two of a value in a coset store 144 from the code word. (In the case of modulo-two arithmetic, bitwise subtraction and addition are equivalent, and a bitwise exclusive-OR gate may be used for either operation; the function of the gate 142 is defined as subtraction for consistency with subsequent description.) The coset store 144 contains the values of the same eight coset representatives from which selection is made by the selector 112 in the encoder 100. The store 144 also has a three-bit counter 146 which cycles through all eight possible three-bit values successively in response to an increment signal at an input 148. The current three-bit value in this counter controls which of the eight coset representative values is supplied to the exclusive-OR gate 142, the correspondence between three-bit values and coset representatives being the same as in the encoder 100. Thus as the counter 146 cycles through its eight possible values, each of the eight coset representatives in turn is provided to the exclusive-OR gate 142.

The 16-digit binary word output by the gate 142 for the current coset representative is provided to a substitution circuit 150 which substitutes the values +1 and −1 for the binary values 0 and 1 respectively in that word, to match the element values in terms of which the fast Hadamard transform is customarily applied.

The 16-symbol word from the circuit 150 is supplied to a so-called 'Green machine' 152 for performing the fast Hadamard transform (see the book by MacWilliams and Sloane referenced above, pp. 423–5), or a modification thereof (see, for example, 'Fast decoding algorithms for first order Reed-Muller and related codes'by A. E. Ashikhmin and S. N. Litsyn, *Designs, Codes and Cryptography*, vol.7, 1996, pp. 187–214). The output of the Green machine 152 comprises sixteen transform components labelled $E_0$ to $E_{15}$ (in the general case of a length $2^m$ code word the subscript 15 is replaced by $2^m-1$); the component $E_0$ corresponds to the left-most symbol of a row of the code's generator matrix, and the component $E_{15}$ corresponds to the right-most symbol. These components are supplied to a comparator 154 which compares the absolute values of the transform components, and identifies the largest absolute value $|E_z|$ and the corresponding value of z (from 0 to 15); if more than one component has the same largest absolute value, one of them is chosen arbitrarily. The comparator then outputs the values $E_z$ and z to a latch 156, which also receives the corresponding three-bit index value supplied by the counter 146 in the store 144.

For the first coset representative the latch 156 simply stores the values for $E_z$, z and the coset index which it receives. As the counter 146 is incremented (for the same 16-bit input code word), each successive coset representative is supplied to the exclusive-OR gate 142, and respective values of $E_z$ and z are provided to the latch 156. If such a transform component $E_z$ has a larger absolute value than the component currently latched, the latch selects the newly received component, together with its associated values of z and the coset index.

When the counter 146 has cycled through all eight possible values, the contents of the latch 156 are used to assemble the decoded output data at 158. The value of z directly determines the values of four decoded row coefficients $a_4$, $a_3$, $a_2$ and $a_1$ when z is expressed as a four-bit binary number $a_1a_2a_3a_4$; a fifth decoded row coefficient a' is zero if the final latched value $E_z$ is positive and is one if this value is negative; and the coset index comprises the three most significant output bits.

Although the implementation of the fast Hadamard transform has been described above as taking place for each coset representative in succession, if desired, particularly in the case where decoding is carried out in hardware, the required fast Hadamard transforms for all the coset representatives can be calculated in parallel, by providing a separate Green machine for each one.

The decoder 120 described previously has an advantage in general, relative to the decoder 140, of faster operation. Accordingly it may be desired to use the decoder 120 as a primary decoder, to benefit from its speed; if the signals 126 from the RM decoder 122 are found to correspond to a code word which cannot be output by the encoder 100, as indicated at the data error output 130, the received code word can then be supplied to the decoder 140 whose output is used instead. Such choice between the decoders 120 and 140 can be adaptive, based on current noise levels as indicated by the frequency of occurrence of signals at the data error output 130. If such signals occur relatively often, indicating a currently noisy communications path, the decoder 140 can be selected for immediate use for each code word, while continuing to use the decoder 120 in parallel to monitor the communications quality. When the signals at the data error output 130 decline, the decoder 120 can be selected again as the primary decoder.

It has not been previously recognized that the particular 384 16-bit code words listed in Table 3, out of the 65536 possible 16-bit code words, have simultaneously all of the different properties set out above (i.e. large minimum Hamming distance, low value of PMEPR, convenience of practical implementation, and useful number of possible code words) and thus provide significant and highly advantageous utility. Indeed, it has been considered that finding a set of code words, especially for longer word lengths, which combined no more than desired error control properties with low PMEPR, constituted a problem which was at best intractable and for which there was not even any certainty that a solution existed. The present invention provides not only this combination, but also convenience of implementation and a code word population of adequate size to enable a satisfactory rate of data transfer to be achieved.

Code sets with the corresponding properties for longer code word lengths can be readily identified by extension of the procedure described above to produce Table 3. Thus, for 32-bit code words the generator matrix is:

| | |
|---|---|
| (0000 0000 0000 0000 1111 1111 1111 1111) | $(X_1)$ |
| (0000 0000 1111 1111 0000 0000 1111 1111) | $(X_2)$ |
| (0000 1111 0000 1111 0000 1111 0000 1111) | $(X_3)$ |
| (0011 0011 0011 0011 0011 0011 0011 0011) | $(X_4)$ |
| (0101 0101 0101 0101 0101 0101 0101 0101) | $(X_5)$ |
| (1111 1111 1111 1111 1111 1111 1111 1111) | $(X')$ |

The 32-bit base code comprises all sixty-four linear combinations of rows of this generator matrix, that is combinations of the form $$a_1X_1 \oplus a_2X_2 \oplus a_3X_3 \oplus a_4X_4 \oplus a_5X_5 \oplus a'X'$$

where $a_1$, $a_2$, $a_3$, $a_4$, $a_5$ and a' each take values of 0 or 1.

The corresponding generator array is created by combining the 32-bit generator matrix with additional rows (in this case ten) derived by bitwise multiplication of all possible pairs of the rows $X_1$, $X_2$, $X_3$, $X_4$ and $X_5$:

| | |
|---|---|
| (0000 0000 0000 0000 0000 0000 1111 1111) | $(X_1 * X_2)$ |
| (0000 0000 0000 0000 0000 1111 0000 1111) | $(X_1 * X_3)$ |
| (0000 0000 0000 0000 0011 0011 0011 0011) | $(X_1 * X_4)$ |
| (0000 0000 0000 0000 0101 0101 0101 0101) | $(X_1 * X_5)$ |
| (0000 0000 0000 1111 0000 0000 0000 1111) | $(X_2 * X_3)$ |
| (0000 0000 0011 0011 0000 0000 0011 0011) | $(X_2 * X_4)$ |
| (0000 0000 0101 0101 0000 0000 0101 0101) | $(X_2 * X_5)$ |
| (0000 0011 0000 0011 0000 0011 0000 0011) | $(X_3 * X_4)$ |
| (0000 0101 0000 0101 0000 0101 0000 0101) | $(X_3 * X_5)$ |
| (0001 0001 0001 0001 0001 0001 0001 0001) | $(X_4 * X_5)$ |

and these additional rows are combined by bitwise exclusive-OR operations to produce (in the case of code words of length thirty-two) sixty second-order coset representatives. Thus a first coset representative is produced by combining rows $(X_1*X_2)$, $(X_2*X_3)$, $(X_3*X_4)$ and $(X_4*X_5)$; the remaining coset representatives are produced by identifying all possible permutations of the subscripts of the row identifiers $X_1$, $X_2$, $X_3$, $X_4$ and $X_5$ in the expression $(X_1*X_2) \oplus (X_2*X_3) \oplus (X_3*X_4) \oplus (X_4*X_5)$ which yield distinct results.

These coset representatives are each combined by bitwise exclusive-OR operations with all code words in the 32-bit base code to produce a total of 3840 possible code words, constituting a set of sixty cosets of the base code. These particular code words provide the following combination of properties:

- the code's minimum Hamming distance is 8 ($=2^{m-2}$ with m=5); an error-correcting decoder can detect up to seven ($2^{m-2}-1$) errors affecting the bits constituting a code word, and also correct up to three ($2^{m-3}-1=3$ with m=5) such errors;
- a multi-carrier signal modulated in accordance with these particular 32-bit code words has a PMEPR of no more than 3 dB;
- a decoder for use with this code can operate using analytical techniques and can be implemented, for example, using combinatorial logic at least in part;
- there are sufficient code words available to enable an acceptable data transfer rate to be attained.

It has not previously been recognized that these particular 3840 32-bit code words (out of the more than 4,000,000,000 possible code words of this length), have this wide range of differing properties simultaneously, with their associated highly advantageous practical benefits.

For the preferred case (using a number of code words which is an integer power of two, and selecting groups of sixty-four code words each having the same cosete representative) the highest power of two no greater than sixty (the number of coset representatives) is $2^5$, that is thirty-two. Thus in the preferred case thirty-two of the cosets of sixty-four code words each would be chosen, providing 2048 code words, corresponding to a binary data word length of 11 bits. In this case, six input data bits $a_5$, $a_4$, $a_3$, $a_2$, $a_1$ and a' are multiplied in an encoder by respective ones of the 32-bit generator matrix rows $X_5$, $X_4$, $X_3$, $X_2$, $X_1$ and X'; and the remaining five bits of the input data word are supplied to a selector for selection of one of the thirty-two chosen coset representative values, in accordance with the combined value of those five bits. For decoding, a 32-bit 2nd-order RM decoder produces six first-order signals (comprising six bits of the decoded data word), and ten second-order signals coupled to a selector which stores thirty-two possible 10-bit values for those ten signals taken together and which generates the remaining five bits of the decoded 11-bit data word. Alternatively, a decoder analogous to the decoder 140 of FIG. 11, using the fast Hadamard transform, may be used.

In general terms the generator matrix for a particular code word length $2^m$ is:

$$
\begin{array}{llll}
((2.0+1)\times 2^m)/2^m & ((2.1+1)\times 2^m)/2^m & \cdots \\
((2.0+1)\times 2^{m-1})/2^{m-1} & ((2.1+1)\times 2^{m-1})/2^{m-1} & \cdots \\
 & & \cdots \\
((2.0+1)\times 2^y)/2^y & ((2.1+1)\times 2^y)/2^y & \cdots \\
 & & \cdots \\
((2.0+1)\times 2^1)/2^1 & ((2.1+1)\times 2^1)/2^1 & \cdots \\
((2.0+1)\times 2^0)/2^0 & ((2.1+1)\times 2^0)/2^0 & \cdots
\end{array}
$$

$$
\begin{array}{lll}
((2.z+1)\times 2^m)/2^m & \cdots & ((2.(2^m-1)+1)\times 2^m)/2^m \\
((2.z+1)\times 2^{m-1})/2^{m-1} & \cdots & ((2.(2^m-1)+1)\times 2^{m-1})/2^{m-1} \\
 & & \\
((2.z+1)\times 2^y)/2^y & \cdots & ((2.(2^m-1)+1)\times 2^y)/2^y \\
 & & \\
((2.z+1)\times 2^1)/2^1 & \cdots & ((2.(2^m-1)+1)\times 2^1)/2^1 \\
((2.z+1)\times 2^0)/2^0 & \cdots & ((2.(2^m-1)+1)\times 2^0)/2^0
\end{array}
$$

where z has integer values from 0 to $2^m-1$, y has integer values from m to 0, and x indicates bitwise multiplication (bitwise logical AND) of two factors (such as (2.z+1) and $2^y$) both expressed as (m+1)-bit binary numbers, and the result of division is expressed as a single digit. The first line of this matrix (y=m) gives the row $X_1$, the second line (y=m−1) gives the row $X_2$, the penultimate line (y=1) gives the row $X_m$ and the final line (y=0) gives the row X'.

Thus, for example, for a code word length of sixty-four bits (m=6), the first symbol (z=0) on the second row $X_2$ (y=m−1=5) is $$((2.0+1)\times 2^{m-1})/2^{m-1}$$

that is $$(1\times 32)/32$$

Expressing the factors involved in the bitwise multiplication as (m+1)-bit binary numbers results in $$(0000001\times 0100000)/32$$

which is (0000000)/32 or (expressed as a single digit) 0. The second symbol (z=1) on the second row is $((2.1+1)\times 2^{m-1})/2^{m-1}$ which is (3×32)/32, which yields (0000011×0100000)/32, or 0 again. The sixteenth symbol (z=15) on this row is $((2.15+1)\times 2^{m-1})/2^{m-1}$ which is (31×32)/32, which also yields (0011111×0100000)/32, or 0.

The seventeenth symbol (z=16) is $((2.16+1)\times 2^{m-1})/2^{m-1}$ which is (33×32)/32. This yields (0100001×0100000)/32, which is (0100000)/32 or 1. The same result is obtained for the eighteenth through to the thirty-second symbols.

For the thirty-third symbol (z=32) the matrix gives $((2.32+1)\times 2^{m-1})/2^{m-1}$ which is (65×32)/32 and this yields (1000001×0100000)/32, that is 0. A result of 0 is likewise obtained for the following fifteen symbols.

The forty-ninth symbol (z=48) is given by the expression $((2.48+1)\times 2^{m-1})/2^{m-1}$ which is (97×32)/32 giving (1100001×0100000)/32, or 1, which is the result for the final fifteen symbols as well. Thus the second row in its entirety is (0000 0000 0000 0000 1111 1111 111 1111 0000 0000 0000 0000 1111 1111 11111111)

For the third row $X_3$ (y=m−2=4) the first symbol is $((2.0+1)\times 2^{m-2})/2^{m-2}$ that is (1×16)/16 which is (0000001×0010000)/16, or 0; the same result is produced for the next seven symbols. For the ninth symbol the expression is $((2.8+1)\times 2^{m-2})/2^{m-2}$ that is (17×16)/16 and this yields (0010001×0010000)/16, or 1, and similarly for the tenth to sixteenth symbols. Thereafter the symbols continue in alternating blocks of eight zeroes and eight ones for the rest of the row:

(0000 0000 1111 1111 0000 0000 1111 1111 0000 0000 1111 1111 0000 0000 1111 1111)

The other rows of the generator matrix for 64-bit code words would be derived in similar manner.

The $2^m$-bit base code comprises all linear combinations of rows of the generator matrix, that is combinations of the form $$a_1X_1 \oplus a_2X_2 \oplus a_3X_3 \oplus \ldots \oplus a_mX_m \oplus a'X'$$

where $a_1$, $a_2$, $a_3$, . . . $a_m$ and a' each take values of 0 or 1.

The corresponding generator array is created by combining the $2^m$-bit generator matrix with additional rows derived by bitwise multiplication of all possible pairs of the rows $X_1$, $X_2$, $X_3$, . . . $X_m$. These additional rows are combined by bitwise exclusive-OR operations to produce m!/2 second-order coset representatives. Thus a first coset representative is produced by combining rows $(X_1{*}X_2)$, $(X_2{*}X_3)$, . . and $(X_{m-1}{*}X_m)$; the remaining coset representatives are produced by identifying all possible permutations of the subscripts of the row identifiers $X_1$, $X_2$, $X_3$, . . . $X_m$ in the expression $(X_1{*}X_2)\oplus(X_2{*}X_3)\oplus \ldots \oplus(X_{m-1}{*}X_m)$ which yield distinct results.

These coset representatives are each combined by bitwise exclusive-OR operations with all code words in the $2^m$-bit base code to produce a total of $m!(2^{m+1})/2$ possible code words, constituting a set of m!/2 cosets of the base code. These code words have the following combination of properties:

- the code's minimum Hamming distance is $2^{m-2}$; an error-correcting decoder can detect up to $2^{m-2}-1$ errors affecting the bits constituting a code word, and also correct up to $2^{m-3}-1$ such errors;
- a multi-carrier signal modulated in accordance with these code words has a PMEPR of no more than 3 dB;

- a decoder for use with this code can operate using analytical techniques and can be implemented, for example, using combinatorial logic at least in part;
- there are sufficient code words available to enable an acceptable data transfer rate to be attained.

The total number of binary code words available for each of a range of code word lengths is shown below, together with the following other parameters: the number of coset representatives; the maximum number of data words which is an integer power of two and which can be encoded using the available number of code words; the data word length in that case; the number of 1st-order signals and 2nd-order signals provided by an RM decoder for the relevant code word length; and the number of selector values stored in an encoder and decoder such as those shown in FIGS. 8, 9 and 10:

| m | Code word length ($2^m$) | Coset reps. | Code words | Max. data words | Data word length | 1st-order signals | 2nd-order signals | Selector values |
|---|---|---|---|---|---|---|---|---|
| 3 | 8 | 3 | 48 | 32 | 5 | 4 | 3 | 2 |
| 4 | 16 | 12 | 384 | 256 | 8 | 5 | 6 | 8 |
| 5 | 32 | 60 | 3840 | 2048 | 11 | 6 | 10 | 32 |
| 6 | 64 | 360 | 46080 | 32768 | 15 | 7 | 15 | 256 |
| 7 | 128 | 2520 | 645120 | 524288 | 19 | 8 | 21 | 2048 |
| 8 | 256 | 20160 | 10321920 | 8388608 | 23 | 9 | 28 | 16384 |

For the sake of simplicity and clarity the above description has been directed to coding using just two symbol values, i.e. binary encoding. However, the present invention is also applicable to coding with any higher number of symbol values which is an integer power j of two, such as quaternary (j=2; $2^j$=4), octary (j=3; $2^j$=8) and higher orders. In such cases the same generator matrix is used as described above, e.g. for a code word containing 8 symbols ($2^m$=8 with m=3):

(0000 1111) $(X_1)$ (0011 0011) $(X_2)$ (0101 0101) $(X_3)$ (1111 1111) $(X')$

An 8-symbol quaternary base code (four possible symbol values) comprises all 256 linear combinations of the rows of this generator matrix, that is combinations of the form $$a_1X_1 \oplus a_2X_2 \oplus a_3X_3 \oplus a'X'$$

where $\oplus$ now indicates symbol-wise addition modulo $2^j$ (i.e. modulo 4 for quaternary) and $a_1$, $a_2$, $a_3$ and a' are coefficients which each take all integer values from 0 to $2^j-1$ (i.e. 0 to 3 for quaternary). This base code is linear, i.e. the result of symbol-wise addition modulo 4 on any two of its code words is another code word in the code.

The corresponding generator array is created by combining the generator matrix with additional rows. These additional rows are derived by symbol-wise multiplication of all possible pairs of the rows $X_1$, $X_2$ and $X_3$, that is $X_1*X_2$, $X_1*X_3$ and $X_2*X_3$, and then further multiplication by $2^{j-1}$, e.g. by 2 for quaternary coding or by 4 for octary coding. Thus for 8-symbol quaternary coding the additional rows are:

(0000 0022) $2(X_1*X_2)$ (0000 0202) $2(X_1*X_3)$ (0002 0002) $2(X_2*X_3)$

The additional rows are combined by symbol-wise addition modulo $2^j$ to produce m!/2 second-order coset representatives. In the case of quaternary code words of length eight, a first coset representative is produced by combining rows $2(X_1*X_2)$ and $2(X_2*X_3)$:

(0002 0020) $2(X_1*X_2) \oplus 2(X_2*X_3)$

The remaining coset representatives are produced by identifying all possible permutations of the subscripts of the row identifiers $X_1$, $X_2$ and $X_3$ in the expression $2(X_1*X_2) \oplus 2(X_2*X_3)$ which yield distinct results:

(0002 0200) $2(X_1*X_3) \oplus 2(X_2*X_3)$ (0000 0220) $2(X_1*X_2) \oplus 2(X_1*X_3)$ Finally these coset representatives are each combined by symbol-wise addition modulo $2^j$ with all code words in the base code to produce $m!(2^{j(m+1)})/2$ code words, constituting a set of m!/2 cosets of the base code. Examples of the 768 code values thus produced in the 8-symbol quaternary case, and of the corresponding values of the coefficients $a_1$, $a_2$, $a_3$ and a', are given below, where $CR_1=2(X_1*X_2) \oplus 2(X_2*X_3)$, $CR_2=2(X_1*X_3) \oplus 2(X_2*X_3)$ and $CR_3=2(X_1*X_2) \oplus 2(X_1*X_3)$:

TABLE 4

| | |
|---|---|
| 0002 0020 | $CR_1 \oplus (0.X_1) \oplus (0.X_2) \oplus (0.X_3) \oplus (0.X')$ |
| 1113 1131 | $CR_1 \oplus (0.X_1) \oplus (0.X_2) \oplus (0.X_3) \oplus (1.X')$ |
| 2220 2202 | $CR_1 \oplus (0.X_1) \oplus (0.X_2) \oplus (0.X_3) \oplus (2.X')$ |
| 3331 3313 | $CR_1 \oplus (0.X_1) \oplus (0.X_2) \oplus (0.X_3) \oplus (3.X')$ |
| 0103 0121 | $CR_1 \oplus (0.X_1) \oplus (0.X_2) \oplus (1.X_3) \oplus (0.X')$ |
| 1210 1232 | $CR_1 \oplus (0.X_1) \oplus (0.X_2) \oplus (1.X_3) \oplus (1.X')$ |
| 2321 2303 | $CR_1 \oplus (0.X_1) \oplus (0.X_2) \oplus (1.X_3) \oplus (2.X')$ |
| . . . | |
| 2303 2321 | $CR_1 \oplus (0.X_1) \oplus (2.X_2) \oplus (1.X_3) \oplus (2.X')$ |
| . . . | |
| 1203 2332 | $CR_1 \oplus (1.X_1) \oplus (3.X_2) \oplus (1.X_3) \oplus (1.X')$ |
| . . . | |
| 1232 3032 | $CR_1 \oplus (2.X_1) \oplus (2.X_2) \oplus (1.X_3) \oplus (1.X')$ |
| . . . | |
| 2112 1023 | $CR_1 \oplus (3.X_1) \oplus (3.X_2) \oplus (3.X_3) \oplus (2.X')$ |
| 3223 2130 | $CR_1 \oplus (3.X_1) \oplus (3.X_2) \oplus (3.X_3) \oplus (3.X')$ |
| 0002 0200 | $CR_2 \oplus (0.X_1) \oplus (0.X_2) \oplus (0.X_3) \oplus (0.X')$ |
| 1113 1311 | $CR_2 \oplus (0.X_1) \oplus (0.X_2) \oplus (0.X_3) \oplus (1.X')$ |
| . . . | |
| 2112 1203 | $CR_2 \oplus (3.X_1) \oplus (3.X_2) \oplus (3.X_3) \oplus (2.X')$ |
| 3223 2310 | $CR_2 \oplus (3.X_1) \oplus (3.X_2) \oplus (3.X_3) \oplus (3.X')$ |
| . . . | |
| 0000 0220 | $CR_3 \oplus (0.X_1) \oplus (0.X_2) \oplus (0.X_3) \oplus (0.X')$ |

TABLE 4-continued

| | |
|---|---|
| 1111 1331 | $CR_3 \oplus (0.X_1) \oplus (0.X_2) \oplus (0.X_3) \oplus (1.X')$ |
| . . . | |
| 3221 2330 | $CR_3 \oplus (3.X_1) \oplus (3.X_2) \oplus (3.X_3) \oplus (3.X')$ |

The $2^m$-symbol quaternary base code comprises all linear combinations of rows of the generator matrix, that is combinations of the form $$a_1X_1 \oplus a_2X_2 \oplus a_3X_3 \oplus \ldots \oplus a_mX_m \oplus a'X'$$

where $a_1, a_2, a_3, \ldots a_m$ and a' each take values of 0, 1, 2 or 3. The corresponding generator array is created by combining the $2^m$-symbol generator matrix with additional rows derived by symbol-wise multiplication of all possible pairs of the rows $X_1, X_2, X_3, \ldots X_m$. These additional rows are combined by symbol-wise addition modulo 4 to produce m!/2 second-order coset representatives. Thus a first coset representative is produced by combining rows $2(X_1{*}X_2)$, $2(X_2{*}X_3)$, . . . and $2(X_{m-1}{*}X_m)$; the remaining coset representatives are produced by identifying all possible permutations of the subscripts of the row identifiers $X_1, X_2, X_3, \ldots X_m$ in the expression $2(X_1{*}X_2) \oplus 2(X_2{*}X_3) \oplus \ldots \oplus 2(X_{m-1}{*}X_m)$ which yield distinct results.

These coset representatives are each combined by symbol-wise addition modulo 4 with all code words in the $2^m$-symbol base code to produce a total of $m!(4^{m+1})/2$ possible code words, constituting a set of m!/2 cosets of the base code.

Similar codes for other code word lengths and/or for coding with different numbers of symbols (e.g. octary) can be defined in like manner. Thus, where the number of symbol values is $2^j$, the base code comprises all linear combinations of rows of the generator matrix, that is combinations of the form $$a_1X_1 \oplus a_2X_2 \oplus a_3X_3 \oplus \ldots \oplus a_mX_m \oplus a'X'$$

where $a_1, a_2, a_3, \ldots a_m$ and a' each take values of 0, 1, . . . , $2^j-1$ and $\oplus$ indicates symbol-wise addition modulo $2^j$. This base code is linear, i.e. the result of a symbol-wise addition modulo $2^j$ on any two of its code words is another code word in the code. The corresponding generator array is created by combining the $2^m$-symbol generator matrix with additional rows, which are derived by symbol-wise multiplication of all possible pairs of the rows $X_1, X_2, X_3, \ldots X_m$ and then further multiplication by $2^{j-1}$. These additional rows are combined by symbol-wise addition modulo $2^j$ to produce m!/2 second-order coset representatives. Thus a first coset representative is produced by combining rows $2^{j-1}(X_1{*}X_2)$, $2^{j-1}(X_2{*}X_3)$, . . . and $2^{j-1}(X_{m-1}{*}X_m)$; the remaining coset representatives are produced by identifying all possible permutations of the subscripts of the row identifiers $X_1, X_2, X_3, \ldots X_m$ in the expression $2^{j-1}(X_1{*}X_2) \oplus 2^{j-1}(X_2{*}X_3) \oplus \ldots \oplus 2^{j-1}(X_{m-1}{*}X_m)$ which yield distinct results.

These coset representatives are each combined by symbol-wise addition modulo $2^j$ with all code words in the $2^m$-symbol base code to produce a total of $m!(2^{j(m+1)})/2$ possible code words, constituting a set of m!/2 cosets of the base code.

In discussing the error detecting and error correcting properties of quaternary, octary and higher-order codes, the minimum Hamming distance alone does not fully describe the extent of possible errors affecting a code word. This is because an error in a single symbol can involve a transition through up to $2^{j-1}$ adjacent symbol values (where the values $2^j-1$ and 0 are considered to be adjacent). The practical effect may be as serious as, or more serious than, two or more errors in different symbols each involving only a single transition to an adjacent symbol value. For example, a change of a single octary symbol from value 6 to value 1 (a transition through 3 adjacent values) may be more serious than a change of two octary symbols, one from 6 to 7 and another from 7 to 0 (both being transitions to an adjacent value). Therefore an additional useful measure is the minimum Lee distance, defined as the minimum number of symbol value transitions required to transform a valid code word into some other valid code word. (The minimum Lee distance is not discussed above for binary codes, because in the binary case the Hamming and Lee distances are identical.)

The code words defined above for the quaternary, octary and higher-order cases have the following advantageous combination of properties:

- the code's minimum Hamming distance is $2^{m-2}$; an error-correcting decoder based on Hamming distance can detect up to $2^{m-2}-1$ errors arbitrarily affecting the symbols constituting a code word, and also correct up to $2^{m-3}-1$ such errors;
- the code's minimum Lee distance is $2^{m-1}$; an error-correcting decoder based on Lee distance can detect errors involving up to $2^{m-1}-1$ symbol-value transitions (affecting up to the same number of code word symbols), and correct errors involving up to $2^{m-2}-1$ such transitions; in fact a minimum distance decoder based on Lee distance also corrects certain additional patterns of errors arbitrarily affecting the symbols constituting a code word (i.e. it possesses some of the properties of a decoder based on Hamming distance);
- a multi-carrier signal modulated in accordance with these code words has a PMEPR of no more than 3 dB;
- a decoder based on either Hamming distance or Lee distance for use with such a code can operate using analytical techniques and can be implemented, for example, using combinatorial logic at least in part;
- there are sufficient code words available to enable an acceptable data transfer rate to be attained.

In practice these codes are used to transfer information represented by data bits over a path including the encoder and decoder. Although for binary codes the assignment of data bits to row coefficients of the generator matrix can be, as noted above, arbitrary, in all other cases (quaternary, octary, etc.) this transfer can be assisted by judicious assignment of data bits to row coefficients.

In the case of a quaternary code, pairs of data bits (selected as described below) are each mapped to row coefficients $a_1, a_2, a_3, \ldots a_m$ and a' as follows:

TABLE 5

| Data bits | Coefficient |
|---|---|
| 00 | 0 |
| 01 | 1 |
| 11 | 2 |
| 10 | 3 |

It can be seen that this mapping is an example of a Gray code, which has the advantageous property that an error involving a change between two adjacent coefficient values (3 and 0 being considered as adjacent) causes only a single data bit to be in error. Thus a relatively minor error in a code word is less likely to produce a large error in the data word at the end of the transfer.

As in the binary case, it is preferable to use a number of code words which is an integer power of two, thereby simplifying division of the incoming data stream into blocks for encoding, and furthermore to select code words in groups having the same coset representative, to facilitate implementation. To this end the number of coset representatives chosen is the highest power of two ($2^r$) that is no greater than the number of coset representatives available. Then r of the data bits are used to select a coset representative, and successive pairs of the remaining data bits are converted to quaternary symbols $a_1$, $a_2$, $a_3$, . . . $a_m$ and a' according to the Gray code in Table 5 above.

Figure 12:
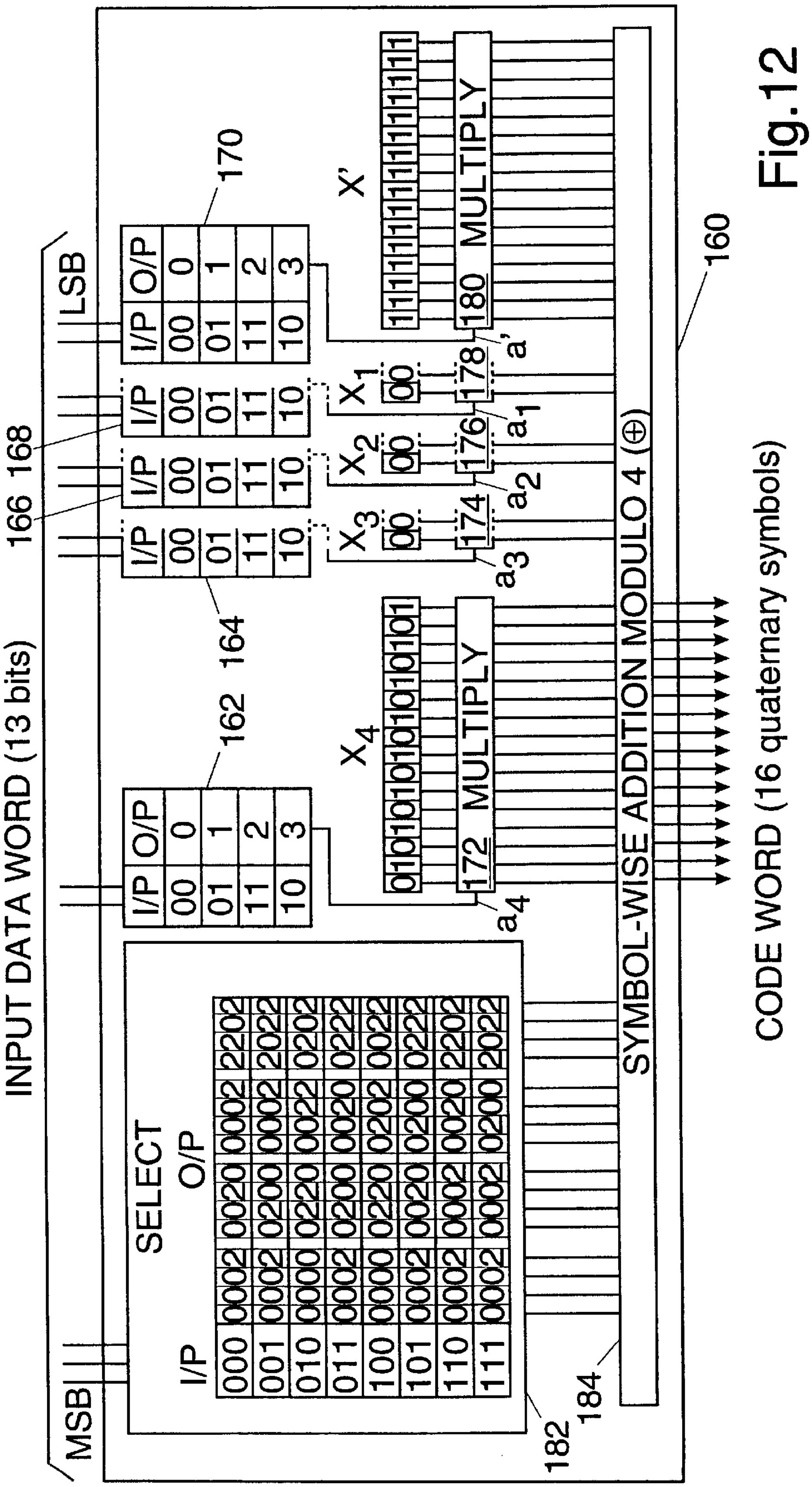
FIG. 12 shows an encoder incorporating the present invention, for encoding 13-bit data words as 16-symbol quaternary code words.

FIG. 12 shows a 13B/16Q encoder 160 analogous to the encoder 100 of FIG. 9, but for encoding 13-bit data words as 16-quaternary symbol code words in accordance with this invention, using code words derived as described above from the generator array

| | |
|---|---|
| (0000 0000 1111 1111) | $(X_1)$ |
| (0000 1111 0000 1111) | $(X_2)$ |
| (0011 0011 0011 0011) | $(X_3)$ |
| (0101 0101 0101 0101) | $(X_4)$ |
| (1111 1111 1111 1111) | $(X')$ |
| (0000 0000 0000 2222) | $2(X_1*X_2)$ |
| (0000 0000 0022 0022) | $2(X_1*X_3)$ |
| (0000 0000 0202 0202) | $2(X_1*X_4)$ |
| (0000 0022 0000 0022) | $2(X_2*X_3)$ |
| (0000 0202 0000 0202) | $2(X_2*X_4)$ |
| (0002 0002 0002 0002) | $2(X_3*X_4)$ |

In particular the encoder uses the eight cosets having the coset representatives

| | |
|---|---|
| (0002 0020 0002 2202) | $2(X_1*X_2)\oplus 2(X_2*X_3)\oplus 2(X_3*X_4)$ |
| (0002 0200 0002 2022) | $2(X_1*X_2)\oplus 2(X_2*X_4)\oplus 2(X_3*X_4)$ |
| (0000 0220 0022 0202) | $2(X_1*X_3)\oplus 2(X_2*X_3)\oplus 2(X_2*X_4)$ |
| (0002 0200 0020 0222) | $2(X_1*X_3)\oplus 2(X_3*X_4)\oplus 2(X_2*X_4)$ |
| (0000 0220 0202 0022) | $2(X_1*X_4)\oplus 2(X_2*X_4)\oplus 2(X_2*X_3)$ |
| (0002 0020 0200 0222) | $2(X_1*X_4)\oplus 2(X_3*X_4)\oplus 2(X_2*X_3)$ |
| (0002 0002 0020 2202) | $2(X_1*X_2)\oplus 2(X_1*X_3)\oplus 2(X_3*X_4)$ |
| (0002 0002 0200 2022) | $2(X_1*X_2)\oplus 2(X_1*X_4)\oplus 2(X_3*X_4)$ |

Thus $2^r$ has the value eight, so r is equal to 3.

Referring to FIG. 12, the 13B/16Q encoder 160 includes five Gray coders 162 to 170 for encoding successive pairs of the ten least significant bits of the input data word into corresponding quaternary symbols, in accordance with Table 5 above. Each coder 162 to 170 supplies its output quaternary symbol to a respective one of five multipliers 172 to 180, for multiplying that symbol by respective ones of the 16-symbol generator matrix rows $X_4$, $X_3$, $X_2$, $X_1$ and X'. The three most significant bits of the input data word are supplied to a selector 182 which selects one of the eight possible coset representative values in accordance with the combined value of those three bits. The outputs of the five multipliers 172 to 180 and of the selector 182 are combined by a symbol-wise modulo-4 adder 184 to produce the 16-symbol quaternary code word output by the encoder 160.

Figure 13:
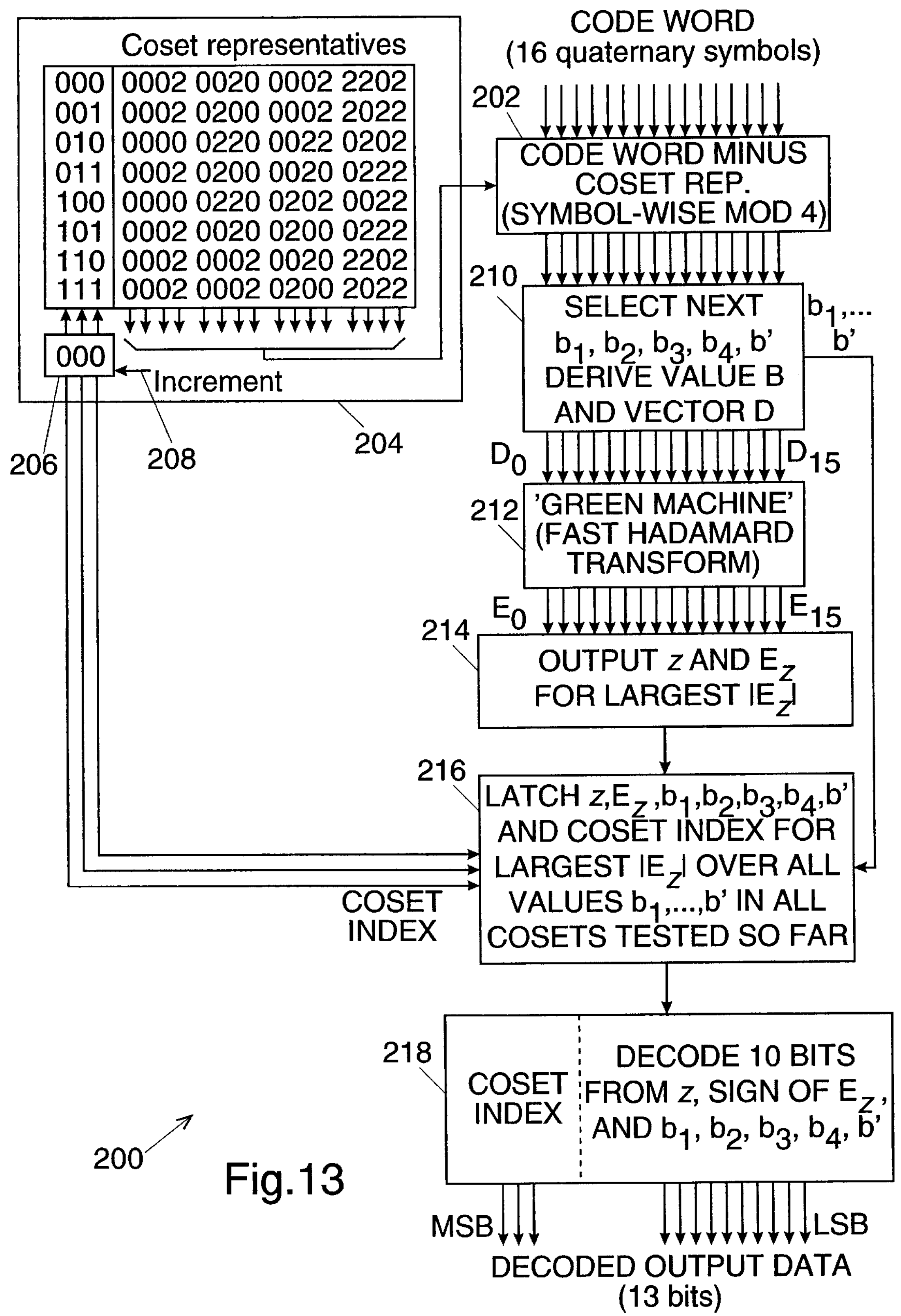
FIG. 13 shows a decoder incorporating the present invention for decoding quaternary code words from the encoder of FIG. 12.

FIG. 13 shows a 16Q/13B minimum distance decoder 200 based on Lee distance for decoding 16-symbol quaternary code words from the encoder 160 to 13-bit data words. The method used in the decoder 200 is based on the "Supercode" decoding method referred to above in connection with the decoder 140 of FIG. 11, but with a significant modification to enable its use with quaternary (and higher-order) codes. For each coset representative in turn that coset representative is subtracted symbol-wise (modulo 4, for quaternary) from the received code word, and the result is decoded as an element of the quaternary base code of length sixteen, at the same time assigning a "score" to that coset representative as described below. The decision as to which code word to decode to is made by selecting a coset whose representative attains the highest score (arbitrarily if more than one attains that score), and within that coset selecting the element of the base code previously identified for that coset.

The decoding of an element of the base code uses the fast Hadamard transform. In contrast to the decoder 140, however, the decoder 200 applies the fast Hadamard transform to multiple input vectors whose symbols are not constrained to have the value +1 or −1 (as was the case in the decoder 140), in order collectively to decode the result of the above subtraction as if it were a received code word of the base code. For each input vector a transform coefficient of maximum magnitude is selected. According to the sign of that transform coefficient, one or other of an associated pair of elements of the first-order Reed-Muller code RM(1,m) could then be output. Although this is analogous to the procedure for decoding a received code word of RM(1, m), the output for each input vector would not represent a decoding of that vector as an element of RM(1,m).

Referring to FIG. 13 the decoder 200 receives the 16-symbol quaternary code words at a modulo-4 subtractor 202, which subtracts from the code word, symbol-wise modulo four, a value in a coset store 204. This coset store contains the values of the same eight coset representatives from which selection is made by the selector 182 in the encoder 160. The store 204 also has a three-bit counter 206 which cycles through all eight possible three-bit values successively in response to an increment signal at an input 208, so that each of the eight coset representatives in turn is provided to the subtractor 202.

The 16-symbol quaternary word S output by the subtractor 202 for the current coset representative is provided to a vector generator 210, which for that word S supplies a sequence of thirty-two 16-symbol input vectors D to a Green machine 212 for performing the fast Hadamard transform on each of those vectors. To this end, the generator 210 assigns values of 0 or 1 to each of five coefficients $b_1$, $b_2$, $b_3$, $b_4$ and b', so that the coefficients taken together range through all thirty-two possible combinations of values. For each such combination, a value B is derived according to the relation $$B=b_1X_1\oplus b_2X_2\oplus b_3X_3\oplus b_4X_4\oplus b'X'$$

and then a vector D is derived from $$D=|2X'-((S-B)\bmod 4)|-X'$$

In this expression the subtractions involving values such as X', S and B are performed symbol-wise, as is the modulus operation indicated by | . . . |.

The output of the Green machine 212 comprises, for each vector D, sixteen transform components labelled $E_0$ to $E_{15}$. These components are supplied to a comparator 214 which compares the absolute values of the transform components, and identifies the largest absolute value $|E_z|$ and the corresponding value of z (from 0 to 15); if more than one component has the same largest absolute value, one of them is chosen arbitrarily. The comparator 214 then outputs the values z and $E_z$ to a latch 216, which also receives the values of the coefficients $b_1$, $b_2$, $b_3$, $b_4$ and b' from the generator 210 and the corresponding three-bit index value supplied by the counter 206 in the store 204.

For the first coset representative and the first combination of values of the coefficients $b_1$, $b_2$, $b_3$, $b_4$ and b', the latch 216 simply stores the values for z, $E_z$, the five coefficients and the coset index which it receives. As thirty-one additional vectors D are derived by the generator 210 for the first coset representative, and as the counter 206 is incremented and thirty-two more vectors D are derived for each successive coset representative, respective values of z and $E_z$ are provided to the latch 216, together with the respective values of the coefficients and the coset index. If such a transform component $E_z$ has a larger absolute value than the component currently latched, the latch 216 selects the newly received component, together with its associated values of z, the five coefficients $b_1$, $b_2$, $b_3$, $b_4$ and b', and the coset index.

When the counter 206 has cycled through all eight possible values, the contents of the latch 216 are used to assemble the decoded output data at 218. The value of z, the sign of $E_z$ and the coefficients $b_1$, $b_2$, $b_3$, $b_4$ and b' together determine the values of the ten least significant bits of the decoded data, as described below, while the coset index comprises the three most significant output bits.

To determine the values of the ten least significant output bits, a coefficient c' is set to 1 if $E_z$ is negative and to 0 if it is positive, and the value of z is expressed as a four-bit binary number $c_1c_2c_3c_4$. Five decoded row coefficients $a_4$, $a_3$, $a_2$, $a_1$ and a' are determined from the expressions $$a_1=b_1+2c_1$$

$$a_2=b_2+2c_2$$

$$a_3=b_3+2c_3$$

$$a_4=b_4+2c_4$$

$$a'=b'+2c'$$

The decoded data bits can then be derived, in pairs, from these row coefficients by reference to the Gray code in Table 5 above.

For an octary code, triplets of data bits (selected as described below) are each mapped to row coefficients $a_1$, $a_2$, $a_3$, . . . $a_m$ and a' as follows:

TABLE 6

| Data bits | Coefficient |
|---|---|
| 000 | 0 |
| 001 | 1 |
| 011 | 2 |
| 010 | 3 |
| 110 | 4 |
| 111 | 5 |
| 101 | 6 |
| 100 | 7 |

As before the number of coset representatives chosen is the highest power of two ($2^r$) that is no greater than the number of coset representatives available. Then r of the data bits are used to select a coset representative, and successive triplets of the remaining data bits are converted to octary symbols $a_1$, $a_2$, $a_3$, . . . $a_m$ and a' according to the octary Gray code in Table 6 above.

Figure 14:
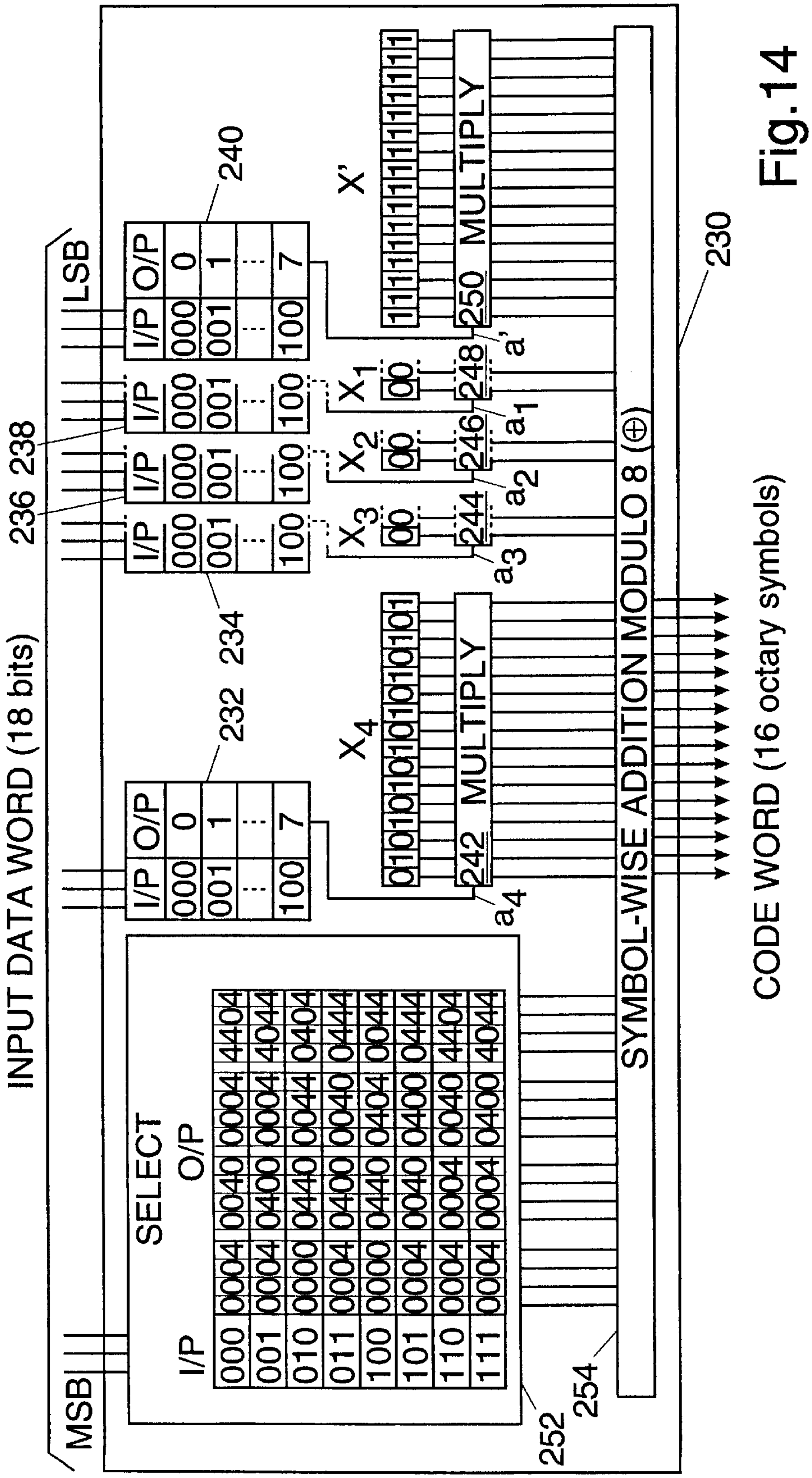
FIG. 14 shows an encoder incorporating the present invention, for encoding 18-bit data words as 16-symbol octary code words.

FIG. 14 shows an 18B/16O encoder 230 analogous to the encoders 100 of FIG. 9 and 160 of FIG. 12, but for encoding 18-bit data words as 16-octary symbol code words in accordance with this invention, using code words derived as described above from the generator array

| | |
|---|---|
| (0000 0000 1111 1111) | $(X_1)$ |
| (0000 1111 0000 1111) | $(X_2)$ |
| (0011 0011 0011 0011) | $(X_3)$ |
| (0101 0101 0101 0101) | $(X_4)$ |
| (1111 1111 1111 1111) | $(X')$ |
| (0000 0000 0000 4444) | $4(X_1*X_4)$ |
| (0000 0000 0044 0044) | $4(X_1*X_3)$ |
| (0000 0000 0404 0404) | $4(X_1*X_4)$ |
| (0000 0044 0000 0044) | $4(X_2*X_3)$ |
| (0000 0404 0000 0404) | $4(X_2*X_4)$ |
| (0004 0004 0004 0004) | $4(X_3*X_4)$ |

In particular the encoder uses the eight cosets having the coset representatives

| | |
|---|---|
| (0040 0040 0004 4404) | $4(X_1*X_2)\oplus 4(X_2*X_3)\oplus 4(X_3*X_4)$ |
| (0004 0400 0004 4044) | $4(X_1*X_2)\oplus 4(X_2*X_4)\oplus 4(X_3*X_4)$ |
| (0000 0440 0044 0404) | $4(X_1*X_3)\oplus 4(X_2*X_3)\oplus 4(X_2*X_4)$ |
| (0004 0400 0040 0444) | $4(X_1*X_3)\oplus 4(X_3*X_4)\oplus 4(X_2*X_4)$ |
| (0000 0440 0404 0044) | $4(X_1*X_4)\oplus 4(X_2*X_4)\oplus 4(X_2*X_3)$ |
| (0004 0040 0400 0444) | $4(X_1*X_4)\oplus 4(X_3*X_4)\oplus 4(X_2*X_3)$ |
| (0004 0004 0040 4404) | $4(X_1*X_2)\oplus 4(X_1*X_3)\oplus 4(X_3*X_4)$ |
| (0004 0004 0400 4044) | $4(X_1*X_2)\oplus 4(X_1*X_4)\oplus 4(X_3*X_4)$ |

Thus $2^r$ has the value eight, so r is equal to 3.

Referring to FIG. 14, the 18B/16O encoder 230 includes five Gray coders 232 to 240 for encoding successive triplets of the fifteen least significant bits of the input data word into corresponding octary symbols, in accordance with Table 6 above. Each coder 232 to 240 supplies its output octary symbol to a respective one of five multipliers 242 to 250, for multiplying that symbol by respective ones of the 16-symbol generator matrix rows $X_4$, $X_3$, $X_2$, $X_1$ and X'. The three most significant bits of the input data word are supplied to a selector 252 which selects one of the eight possible coset representative values in accordance with the combined value of those three bits. The outputs of the five multipliers 242 to 250 and of the selector 252 are combined by a symbol-wise modulo-8 adder 254 to produce the 16-symbol octary code word output by the encoder 230.

Figure 15:
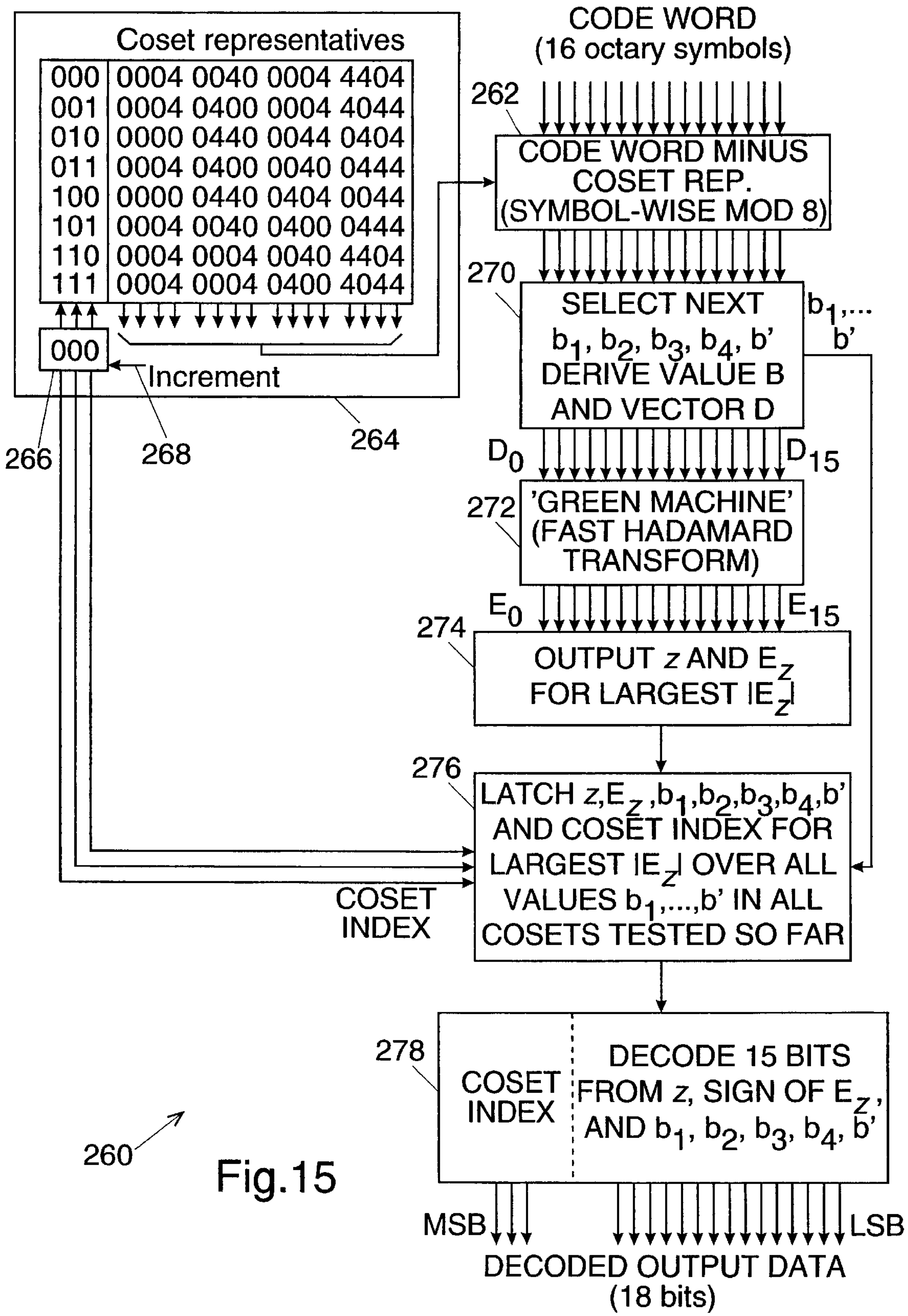
FIG. 15 shows a decoder incorporating the present invention for decoding octary code words from the encoder of FIG. 14.

FIG. 15 shows a 16O/18B minimum Lee distance decoder 260 for decoding 16-symbol octary code words from the encoder 230 to 18-bit data words, corresponding to that shown in FIG. 13 for decoding quaternary code words.

Referring to FIG. 15 the decoder 260 receives the 16-symbol octary code words at a modulo-8 subtractor 262, which subtracts from the code word, symbol-wise modulo eight, a value in a coset store 264. This coset store contains the values of the same eight coset representatives from which selection is made by the selector 252 in the encoder 230, and outputs each coset representative in turn under the control of a three-bit counter 266 responding to an increment signal at an input 268.

The 16-symbol octary word S output by the subtractor 262 for the current coset representative is provided to a vector generator 270, which for that word S supplies a sequence of 1024 16-symbol input vectors D to a Green machine 272. To this end, the generator 270 assigns values of 0, 1, 2 or 3 to each of five coefficients $b_1$, $b_2$, $b_3$, $b_4$ and b', so that the coefficients taken together range through all 1024 possible combinations of values. For each such combination, a value B is derived according to the relation $$B=b_1X_1\oplus b_2X_2\oplus b_3X_3\oplus b_4X_4\oplus b'X'$$

and then a vector D is derived from $$D=|4X'-((S-B)\bmod 8)|-2X'$$

As before the subtractions involving values such as X', S and B are performed symbol-wise, as is the modulus operation indicated by | . . . |.

The output of the Green machine 272 comprises, for each vector D, sixteen transform components labelled $E_0$ to $E_{15}$. These components are supplied to a comparator 274 which identifies a largest absolute value $|E_z|$ and the corresponding value of z (from 0 to 15) and outputs these values to a latch 276. This latch also receives the values of the coefficients $b_1$, $b_2$, $b_3$, $b_4$ and b' from the generator 270 and the corresponding three-bit index value supplied by the counter 266 in the store 264.

For the first coset representative and the first combination of values of the coefficients $b_1$, $b_2$, $b_3$, $b_4$ and b', the latch 276 simply stores the values for z, $E_z$, the five coefficients and the coset index. As 1023 additional vectors D are derived by the generator 270 for the first coset representative, and as the counter 266 is incremented and 1024 more vectors D are derived for each successive coset representative, respective values of z and $E_z$ are provided to the latch 276, together with the respective values of the coefficients and the coset index. If a transform component $E_z$ has a larger absolute value than the component currently latched, the latch 276 selects the newly received component, together with its associated values of z, the five coefficients $b_1$, $b_2$, $b_3$, $b_4$ and b', and the coset index.

When the counter 266 has cycled through all eight possible values, the contents of the latch 276 are used to assemble the decoded output data at 278. The value of z, the sign of $E_z$ and the coefficients $b_1$, $b_2$, $b_3$, $b_4$ and b' together determine the values of the fifteen least significant bits of the decoded data, as described below, while the coset index comprises the three most significant output bits.

To determine the values of the fifteen least significant output bits, a coefficient c' is set to 1 if $E_z$ is negative and to 0 if it is positive, and the value of z is expressed as a four-bit binary number $c_1c_2c_3c_4$. Five decoded row coefficients $a_4$, $a_3$, $a_2$, $a_1$ and a' are determined from the expressions $$a_1=b_1+4c_1$$

$$a_2=b_2+4c_2$$

$$a_3=b_3+4c_3$$

$$a_4=b_4+4c_4$$

$$a'=b'+4c'$$

The decoded data bits can then be derived, in triplets, from these row coefficients by reference to the Gray code in Table 6 above.

Encoders corresponding to those shown in FIGS. 12 and 14 can be constructed by analogy for other lengths of code word (m≠4) and/or higher-order codes (j>3). As noted above, r data bits are used to select a coset representative, and successive groups of size j of the remaining data bits are converted to respective symbols $a_1$, $a_2$, $a_3$, . . . $a_m$ and a' according to a Gray code table. The symbols $a_1$, $a_2$, $a_3$, . . . $a_m$ and a' are multiplied by respective rows $X_1$, $X_2$, $X_3$, . . . $X_m$ and X' of the base code's generator matrix, and the results are added symbol-wise modulo $2^j$ to the selected coset representative.

Decoders corresponding to those shown in FIGS. 13 and 15 can be constructed by analogy for other lengths of code word and/or higher-order codes. In the general case of code words of length $2^m$ symbols, each symbol having $2^j$ possible values, the subtractor subtracts each coset representative from the received code word modulo $2^j$. Coefficients $b_1$, $b_2$, . . . , $b_m$ and b' can each have integer values between 0 and $2^{j-1}-1$ inclusive, and taken together they range through $2^{(j-1)(m+1)}$ possible combinations of values. The value B and the vector D are derived from $$B=b_1X_1\oplus b_2X_2\oplus \ldots \oplus b_mX_m\oplus b'X'$$

$$D=|2^{j-1}X'-((S-B)\bmod 2^j)|-2^{j-2}X'$$

where ⊕ indicates symbol-wise addition modulo $2^j$. In determining the values of the respective least significant output bits, the value of z is expressed as a binary number $c_1c_2 \ldots c_m$, and decoded row coefficients $a_1$, $a_2$, . . . , $a_m$ and a' are determined from the expressions $$a_1=b_1+2^{j-1}c_1$$

$$a_2=b_2+2^{j-1}c_2$$

$$\ldots$$

$$a_m=b_m+2^{j-1}c_m$$

$$a'=b'+2^{j-1}c'$$

Each such row coefficient determines the values of j bits of the decoded output data by reference to the Gray code table used for encoding.

The decoder as described above is a 'hard decision' decoder, i.e. it takes integer values between 0 and $2^j-1$ inclusive as input. The same decoder can also be used for 'soft decision' decoding, wherein the symbols of the received code word are represented as real numbers between 0 and $2^j$, according to the magnitude of the received analogue signal. The value S in this case is obtained by subtraction of the (integer-valued) coset representative modulo $2^j$. The above procedure for decoding is followed to produce real-valued transform components, of which one with largest absolute value is selected. The rest of the decoding procedure is the same as described above.

The decoders 200 and 260 shown in FIGS. 13 and 15 provide the decoded output binary data directly. Although they subtract a coset representative from the received code word and then decode the result as an element of the relevant base code, they do not explicitly identify a code word in the base code as an intermediate step. It is possible to obtain the value of this base code word, using the value z of a transform component $E_z$ having the largest absolute value, over all values B and all stored coset representatives, to select one of a pair of elements of the first-order Reed-Muller code RM(1,m), together with the corresponding value B. The column z of the Sylvester-Hadamard matrix H of order $2^m$ (see below) is transposed to produce a vector C (the left-most column of the matrix being column 0); if $E_z$ is positive, + symbols in C are converted to 0 digits and − symbols to 1 digits, and if negative they are converted to 1 and 0 digits respectively; C now comprises the required element of RM(1,m). The base code word selected by the decoder can be derived from the expression $$2^{j-1}C\oplus B$$

The decoded row coefficients $a_1$, $a_2$, . . . , $a_m$ and a' can be obtained from this code word and the rows $X_1$, $X_2$, . . . , $X_m$ and X' of the generator matrix by applying Gaussian elimination in known manner. The decoded code word corresponding to that output by the encoder can be obtained by adding this base code word symbol-wise modulo $2^j$ to the coset representative identified by the latched coset index.

The Sylvester-Hadamard matrix of order 2 is $H_2$=++

+– i.e. all the elements are identical, except for that at the lower right, which is the negation of the other elements. To derive the matrix for the next higher power of 2, that is $H_4$, the existing matrix ($H_2$) is reproduced to its right and beneath itself, and its negation ($-H_2$) is placed at the lower right:

++++

$H_4$=+–+–

++––

+––+

This process is iterated to derive Sylvester-Hadamard matrixes for successively higher powers of two. For example, to derive $H_8$, the matrix $H_4$ is reproduced to its right and beneath itself, and its negation ($-H_4$) is placed at the lower right.

Consider, for example, the 13-bit data word 1 1011 0110 0001 applied to the input of the 13B/16Q encoder 160. The corresponding row coefficients $a_4$, $a_3$, $a_2$, $a_1$ and a' have values of 2, 1, 3, 0 and 1 respectively, giving a code word 1320 0213 1320 0213 in the base code; the coset representative selected will be 0002 0002 0020 2202. The output quaternary code word is therefore 1322 0211 1300 2011. Assume that during communication from the encoder 160 to the decoder 200 the code word is corrupted to a value of 1322 0212 1300 2031 (corrupted symbols are in bold italics), so that the received code word has a Lee distance of 3 from the transmitted code word.

The subtractor 202 in the decoder subtracts each coset representative in turn from this received code word. In the case of the coset numbered 110, the result of this subtraction is 1320 0210 1320 0233, which is supplied to the vector generator 210. This generator produces thirty-two vectors D each of which is combined in the Green machine 212 to produce sixteen transform components $E_0$ to $E_{15}$ of a row vector E. Each such vector E is the result of multiplying the corresponding row vector D by the Sylvester-Hadamard matrix of order 16:

$H_{16}$ =

| | | | |
|---|---|---|---|
| ++++ | ++++ | ++++ | ++++ |
| +–+– | +–+– | +–+– | +–+– |
| ++–– | ++–– | ++–– | ++–– |
| +––+ | +––+ | +––+ | +––+ |
| ++++ | –––– | ++++ | –––– |
| +–+– | –+–+ | +–+– | –+–+ |
| ++–– | ––++ | ++–– | ––++ |
| +––+ | –++– | +––+ | –++– |
| ++++ | ++++ | –––– | –––– |
| +–+– | +–+– | –+–+ | –+–+ |
| ++–– | ++–– | ––++ | ––++ |
| +––+ | +––+ | –++– | –++– |
| ++++ | –––– | –––– | ++++ |
| +–+– | –+–+ | –+–+ | +–+– |
| ++–– | ––++ | ––++ | ++–– |
| +––+ | –++– | –++– | +––+ |

Examples of these vectors and the corresponding transform components E are given below:

For ($b_1$,$b_2$,$b_3$,$b_4$,b')=(0,0,0,0,0):

B=(0000 0000 0000 0000), D=(0,0,–1,1,1,–1,0,1,0,0,–1, 1,1,–1,0,0),

E=(1,–1,–1,9,–1,–7,1,–1,1,–1,–1,1,–1,1,1,–1).

For ($b_1$,$b_2$,$b_3$,$b_4$,b')=(0,0,0,0,1):

B=(1111 1111 1111 1111), D=(1,–1,0,0,0,0,1,0,1,–1,0,0, 0,0,–1,–1),

E=(–1,5,1,3,1,3,–1,5,3,1,–3,–1,–3,–1,3, 1).

For ($b_1$,$b_2$,$b_3$,$b_4$,b')=(0,0,0,1,0):

B=(0101 0101 0101 0101), D=(0,–1,–1,0,1,0,0,0,0,–1,–1,0,1,0,0,–1),

For ($b_1$,$b_2$,$b_3$,$b_4$,b')=(0,1,1,0,0):

B=(0011 1122 0011 1122), D=(0,0,0,0,0,0,0,–1,0,0,0,0,0, 0,0,0),

E=(–1,1,1,–1,1,–1,–1,1,–1,1,1,–1,1,–1,–1,1).

For ($b_1$,$b_2$,$b_3$,$b_4$,b')=(0,1,1,0,1):

B=(1122 2233 1122 2233), D=(1,–1,1,–1,–1,1,–1,0,1,–1, 1,–1,–1,1,1,1),

E=(1,3,–1,–3,–1,13,1,3,–3,–1,3,1,3,1,–3,–1).

For ($b_1$,$b_2$,$b_3$,$b_4$,b')=(0,1,1,1,0):

B=(0112 1223 0112 1223), D=(0,–1,0,–1,0,1,0,0,0,–1,0,–1,0,1,0,1),

E=(–1,1,1,–1,–7,7,–1,1,–1,1,1,–1,1,–1,–1,1).

. . .

For ($b_1$,$b_2$,$b_3$,$b_4$,b')=(1,1,1,1,0):

B=(0112 1223 1223 2330), D=(0,–1,0,–1,0,1,0,0,1,0,1, 0,–1,0,1,0),

E=(1,3,–1,–3,–1,5,1,3,–3,–1,3,1,–5,1,–3,–1).

For ($b_1$,$b_2$,$b_3$,$b_4$,b')=(1,1,1,1,1):

B=(1223 2330 2330 3001), D=(1,0,1,0,–1,0,–1,1,0,1,0,1, 0,–1,0,–1),

The transform coefficient of largest absolute value over this coset is $E_5$=13, which occurs for B=(1122 2233 1122 2233), i.e. z=5; this coefficient is also larger in absolute value than the transform coefficients produced for any of the other seven coset representatives in the decoder's store 204. Column 5 of $H_{16}$, transposed, is (+–+––+–++–+––+–+). As $E_5$ is positive, + symbols are replaced by 0 digits and – symbols by 1 digits, so C=(0101 1010 0101 1010). Hence the base code word selected by the decoder is 2C⊕B=(1320

0213 1320 0213), which can be seen to be the base code word incorporated in the output of the encoder 160, With the communication errors corrected.

Minimum distance decoders based on Lee distance for quaternary, octary and higher-order codes, such as the decoders 200 and 260 shown in FIGS. 13 and 15, may be implemented in special-purpose hardware; in this case, and as described previously in relation to the decoder 140 of FIG. 11, some or all of the fast Hadamard transforms can be calculated in parallel, for example by providing a Green machine for each one. Alternatively a general-purpose processor may be used, executing an appropriate software procedure incorporating functionality illustrated by the program presented below and expressed in the C programming language. This program takes as input:

a received code word of length determined by the parameter M (=m in the above description), each symbol having a number of values determined by the parameter J (=j in the above description);

a list of coset representatives.

It produces as output:

the position in that list of a coset representative for which a transform coefficient of largest absolute value was found;

the base code word identified from, in part, the position z of that transform coefficient; and the values of the corresponding row coefficients $a_1$, $a_2$, . . . , $a_m$ and a'.

Although primarily intended for use with quaternary or higher-order codes, this program is also usable with binary codes.

```
/*   Decoding of an arbitrary set of cosets of W(M) using fast
     Hadamard transforms. W(M) is the 2^J-phase linear code having the
     same formal generator matrix as RM(1,M).
 */
#define M 4                          /*  Integer M >= 2 */
#define J 2                          /*  Integer J >= 1
                                         Program assumes (J-1) (M+1) < 31 */
#define NON_BINARY (J-1)             /*  Flag for all cases except binary (J=1) */
#define L (1 << M)                   /*  Sequence length L = 2^M */
#define P (1 << J)                   /*  Allowed sequence symbols are 0,1,2,...P-1 */
#define ABS(x) ((x) > 0 ? (x) : (-(x)))
int          gen[M+1][L];            /*  Generator matrix for W(M) */
#include <stdio.h>
main()
{
        int     coset_rep[L], recvd_seq[L], seq[L], fht_input[L];
        int     coeff[M+1];      /* coeff of row i of W(M) */
        int     a[M+1], b[M+1];      /* coeff[i] = (P/2)a[i] + b[i] */
        int     b_sum[L];     /* codeword of W(M) given by the b[i] */
        int     score, posn, rep_id, best_score, best_posn, best_rep_id;
        int     i, j, k, best_k;
        /*  Initialise gen[][] */
        initialise();
        /*  Input received codeword */
        printf("Input received codeword as a length %d sequence ", L);
        printf("of symbols,\neach of which takes values from 0 to %d ",
            P-1);
        printf("inclusive\n\n");
        if (input(recvd_seq, L) == EOF)
                exit();
        /*  Decode each coset rep of W(M) in turn */
        rep_id = -1;
        best_score = 0;
        printf("\nInput a list of coset reps in the same form, ");
        printf("terminated by EOF\n");
        while(input(coset_rep, L) != EOF)
        {
                rep_id ++;
                /*  Subtract coset rep from received sequence componentwise
                    to give sequence seq[] */
                for (j = 0; j < L; j++)
                        seq[j] = (recvd_seq[j] - coset_rep[j] + P) % P;
                /*  Set b_sum[]= sum_{i=0}^M b[i] gen[i][] for all b[i]
                    satisfying 0 <= b[i] < P/2 */
                for (k = 0; k < (1 << (J-1)*(M+1)); k++)
                {
                        extract_symbols(k, J-1, M+1, b);
                        sum(b_sum, b);
                        /*  Calculate input vector fht_input[] to fast
                            Hadamard transform. In the binary case multiply
                            by 2 to give integer values */
                        for (j = 0; j < L; j++)
                                fht_input[j] =
#if NON_BINARY
                                        ABS(P/2 -((seq[j] - b_sum[j] + P) % P)) - P/4;
#else
```

-continued

```
                              ABS(P -2*((seq[j] - b_sum[j] + P) % P)) - P/2;
#endif
                        /*   Apply fast Hadamard transform to fht_input[] */
                        fast_hadamard_transform(fht_input, &score, &posn);
                        if (ABS(score) > ABS(best_score))
                        {
                              best_score = score;
                              best_posn = posn;
                              best_k = k;
                              best_rep_id = rep_id;
                        }
                  }
            }
            /*   Calculate row coefficients for decoded codeword in W(M) */
            a[0] = (best_score < 0 ? 1 : 0);
                        /*   coeff of all-ones codeword in RM(1,M) */
            extract_symbols(best_posn, 1, M, &a[1]);
                        /*   the other M first-order coeffs in RM(1,M) */
            extract_symbols(best_k, J-1, M+1, b);
                        /*   recover best coeffs b[] */
            for (i = 0; i < M+1; i++)
                  coeff[i] = (P/2) * a[i] + b[i];
            /*   Calculate best codeword in W(M) */
            sum(seq, coeff);
            /*   Output number of best coset rep (the coset reps are indexed by
                 0, 1, . . . rep_number) */
            printf("\nNumbering coset reps as 0,1,... the decoded coset rep ");
            printf("number is %2d.\n", best_rep_id);
            /*   For this coset of W(M), output best codeword and its row
                 coefficients */
            printf("For this coset of the base code W(M), best codeword is\n");
            for (j = 0; j < L; j++)
                  printf("%2d", seq[j]);
            printf(",\nand corresponding row coeff's of generator matrix ");
            printf("for W(M) are\n");
            for (i = 1; i < M+1; i++)
                  printf(" for row X%d: %2d\n", i, coeff[i]);
            printf(" for row X': %2d\n\n", coeff[0]);
}
initialise()
{
            int         a[M], i, j;
            /*   Set gen[i][] to be i-th row of generator matrix for W(M)
                 (where row 0 corresponds to X' and row i corresponds to X_i) */
            for (j = 0; j < L; j ++)
            {
                  gen[0][j] = 1;
                  extract_symbols(j, 1, M, a);
                  for (i = 1; i <= M; i++)
                        gen[i][j] = a[i-1];
            }
}
int         input(seq, length)
int         *seq, length;
{
            int         j;
            if (scanf("%d", &seq[0]) == EOF)        /* Check for end of file */
                  return(EOF);
            for (j = 1; j < length; j++)
                  scanf(" %d", %seq[j]);
            return(0);
}
/*    Set seq[] to sum_{i=0}^{M} b[i] gen[i][] mod P */
sum(seq, b)
int         seq[L], b[M+1];
{
            int         i, j;
            /*   Initialise */
            for (j = 0; j < L; j++)
                  seq[j] = 0;
            for (i = 0; i <= M; i++)
            for (j = 0; j < L; j++)
                  seq[j] = (seq[j] + b[i] * gen[i][j]) % P;
}
/*    Store the s least sig (2^u)-ary symbols of the integer c, in order
      from most sig to least sig, in seq[0], seq[1], ..., seq[s-1] */
int         extract_symbols(c, u, s, seq)
int         c, u, s, *seq;
{
```

-continued

```
        unsigned int        mask;
        int         i;
        mask = (1 << u) -1;         /* mask for u least sig bit positions */
        for (i = s-1; i >= 0; i--, c >>= u)
                seq[i] = c & mask;
}
fast_hadamard_transform(seq, score_ptr, posn_ptr)
int     seq[L], *score_ptr, *posn_ptr;
{
        int     vec[M+1][L];
        int     best_score, best_posn;
        int     p, i, j, k, t;
        /*  Copy seq[] to vec[0][] */
        for (j = 0; j < L; j++)
                vec[0][j] = seq[j];
        for (i = 1; i <= M; i++)
        {
            /*  Set vec[i][] to the result of applying the first i matrices
                of fast Hadamard transform to seq[] */
                t = 1 << (i-1);
                for (j = 0; j < (1 << (M-i)); j++)
                for (k = 0; k < t; k++)
                {
                        p = k + j*(1<<i);
                        vec[i][p]   = vec[i-1][p] + vec[i-1][p+t];
                        vec[i][p+t] = vec[i-1][p] - vec[i-1][p+t];
                }
        }
        /*  Find entry of vec[M][] of maximal magnitude */
        best_score = 0;
        for (j = 0; j < L; j++)
        {
                if (ABS(vec[M][j]) > ABS(best_score))
                {
                        best_posn = j;
                        best_score = vec[M][j];
                }
        }
        *posn_ptr = best_posn;
        *score_ptr = best_score;
}
```

The 2nd-order binary RM decoders 82 and 122 shown in FIGS. 8 and 10 may be implemented in special-purpose hardware, or by using a general-purpose processor executing an appropriate software procedure such as that presented below and expressed in the C programming language.

```
/*  Decoder for 2nd order binary Reed-Muller code RM(2,M) of length 2^M,
    using majority logic Reed decoding algorithm.
 */
#define M 4
#define L (1 << M)      /*  Sequence length L = 2^M */
int gen[M+1][L];
#include <stdio.h>
main()
{
        int i, k;
        int b[M+1], seq[L];
        int prod[L], prod_comp[L];
        /*  Initialise gen[][] */
        initialise();
        /*  Input received codeword */
        printf("\nInput received codeword as a length %d sequence",L);
        printf(" of symbols,\neach of which takes values 0 or 1\n");
        if (input(seq, L) == EOF)
                exit();
        printf("\nDecoded codeword is given by the following terms\n");
        /*  Determine coefficients of order 2, 1 and 0 */
        for (k = 2; k >= 1; k--)
        {
                /*  Initialise set b[] which indexes combinations */
```

-continued

```
                for (i = 1; i < k; i++)
                        b[i] = i;
                b[k] = k-1;
                /*  Select all combinations of k objects from
                    {1,2,...,M} */
                while(next_comb(b, M, k) == 1)
                {
                        /*  Calculate product of rows indexed by
                            entries of b[], and those by their
                            complement */
                        product(prod, prod_comp, b, k);
                        /*  Use majority logic decoding to determine if
                        coefficient corresponding to b[] is set. If
                        so, print coefficient and update sequence */
                        maj_logic(prod, prod_comp, b, seq, k);
                }
        }
        /*  Treat k = 0 separately */
        product(prod, prod_comp, b, 0);
        maj_logic(prod, prod_comp, b, seq, 0);
}
initialise()
{
        int a[M], i, j;
        /*  Set gen[i][] to be i-th row of generator matrix for RM(1,M)
            (where row 0 corresponds to X' and row i corresponds to X_i) */
        for (j = 0; j < L; j ++)
        {
                gen[0][j] = 1;
                extract_symbols(j, 1, M, a);
                for (i = 1; i <= M; i++)
                        gen[i][j] = a[i-1];
        }
}
/*  Store the s least sig (2^u)-ary symbols of the integer c, in order
    from most sig to least sig, in seq[0], seq[1], ..., seq[s-1]
 */
int extract_symbols(c, u, s, seq)
int c, u, s, *seq;
{
        unsigned int mask;
        int i;
        mask = (1 << u) -1;        /* mask for u least sig bit positions */
        for (i = s-1; i >= 0; i--, c >>= u)
                seq[i] = c & mask;
}
product(prod, prod_comp, b, k)
int prod[L], prod_comp[L];
int b[M+1], k;
{
        int i, u;
        int a[M+1];
        /*  Convert combination represented by b[] into 1-0 form a[] */
        for (i = 1; i <= M; i++)
                a[i] = 0;
        for (i = 1; i <= k; i++)
                a[b[i]] = 1;
        /*  Initialise product of rows indexed by a[], and product of
            rows indexed by complement of a[] */
        for (u = 0; u < L; u++)
                prod[u] = prod_comp[u] = 1;
        for (i = 1; i <= M; i++)
                if (a[i] == 1)
                {
                        for (u = 0; u < L; u++)
                                prod[u] *= gen[i][u];
                }
                else
                {
                        for (u = 0; u < L; u++)
                                prod_comp[u] *= gen[i][u];
                }
}
maj_logic(prod, prod_comp, b, seq, k)
int prod[L], prod_comp[L], b[M+1];
int seq[L], k;
{
        int zeroes, ones, sum;
        int i, u, v;
```

-continued

```
        zeroes = ones = 0;
        for (u = 0; u < L; u++)
                if (prod[L-1-u] == 1)
                {
                        sum = 0;
                        for (v = 0; v < L; v++)
                                if (prod_comp[v] == 1)
                                        sum += seq[v-u];
                        if (sum % 2 == 0)
                                zeroes ++;
                        else
                                ones ++;
                }
        if (ones >= zeroes)
        {
                if (k > 0)
                {
                        printf("    X%d", b[1]);
                        for (i = 2; i <= k; i++)
                                printf(" * X%d", b[i]);
                        printf("\n");
                }
                else
                        printf("    X'\n");
                for (u = 0; u < L; u++)
                        seq[u] = (seq[u] + prod[u]) % 2;
        }
}
/*   Lexicographically next k-subset from M-element set */
next_comb(b, n, r)
int b[M+1], n, r;
{
        int i, h;
        for (i = r; i >= 1; i--)
        {
                if (b[i] < n-r+i)
                {
                        b[i] = b[i] + 1;
                        for (h = i+1; h <= r; h++)
                                b[h] = b[h-1] + 1;
                        return(1);
                }
        }
        return(0);
}
int input(seq, length)
int *seq, length;
{
        int j;
        if (scanf("%d", %seq[0]) == EOF)          /* Check for end of file */
                return(EOF);
        for (j = 1; j < length; j++)
                scanf(" %d", %seq[j]);
        return(0);
}
output(seq, length)
int *seq, length;
{
        int j;
        for (j = 0; j < length; j++)
                printf(" %d", seq[j]);
        printf("\n");
}
```

In the case of quaternary codes of length $2^m$ symbols, decoding can also be accomplished by using a binary decoder for a code of length $2^{m+1}$ bits; this may be desirable for ease of implementation (by avoiding the need for circuitry to operate on quaternary signals) and/or for speed of operation. Such decoding will be illustrated by reference to the 16-symbol quaternary code word 1322 0211 1300 2011 (already used as an example above), derived from a base code word 1320 0213 1320 0213 (row coefficients $a_4$, $a_3$, $a_2$, $a_1$ and a' with values of 2, 1, 3, 0 and 1 respectively) and a coset representative 0002 0002 0020 2202. This code word, representing the binary data word 1 1011 0110 0001, is assumed to be received with errors as 1322 0212 1300 2031. Each symbol of the received code word is first converted to a pair of binary symbols, according to the Gray code in Table 5, and these binary symbols are assigned to respective halves of a 32-bit word. Thus, for the first quaternary symbol (1), the corresponding pair of binary symbols is 01; the first symbol (0) of this pair comprises the first symbol of the 32-bit word, and the second symbol (1) of the pair comprises the seventeenth symbol of that word. The second quaternary symbol is 3, so the corresponding binary pair is 10; the first of these symbols provides the second symbol of the 32-bit word, and the second symbol (0) of the pair provides its eighteenth symbol. Continuing this procedure for the rest of the quaternary code word produces the 32-bit word 0111 0101 0100 1010 1011 0111 1000 1001

This binary word is supplied to a 32-bit 2nd-order binary RM decoder, similar to the decoder 122 in FIG. 10 but extended to handle additional bits; this produces two sets of binary output signals which together comprise the output value of the RM decoder: six first-order signals representing coefficients $u_1$, $u_2$, $u_3$, $u_4$, $u_5$ and u', and ten second-order signals representing coefficients $u_{12}$, $u_{13}$, $u_{14}$, $u_{15}$, $u_{23}$, $u_{24}$, $u_{25}$, $u_{34}$, $u_{35}$ and $u_{45}$. In the case of the 32-bit word noted above, the output signals of the RM decoder would have the values:

| | | |
|---|---|---|
| $u_1 = 1$ | $u_{12} = 0$ | $u_{23} = 1$ |
| $u_2 = 0$ | $u_{13} = 1$ | $u_{24} = 1$ |
| $u_3 = 0$ | $u_{14} = 1$ | $u_{25} = 0$ |
| $u_4 = 1$ | $u_{15} = 0$ | $u_{34} = 1$ |
| $u_5 = 1$ | | $u_{35} = 0$ |
| $u' = 0$ | | $u_{45} = 1$ |

These first- and second-order signals are supplied to a binary to quaternary coefficient converter which provides row coefficients $a_1$, $a_2$, $a_3$, $a_4$ and a' corresponding to the input quaternary data word according to the following relationships:

$$a_1 = (2u_2 + u_{12}(1+2u_1)) \bmod 4 \quad [=0]$$
$$a_2 = (2u_3 + u_{13}(1+2u_1)) \bmod 4 \quad [=3]$$
$$a_3 = (2u_4 + u_{14}(1+2u_1)) \bmod 4 \quad [=1]$$
$$a_4 = (2u_5 + u_{15}(1+2u_1)) \bmod 4 \quad [=2]$$
$$a' = 2u' + u_1 \quad [=1]$$

The values in brackets [ ] indicate the results of these relationships for the specific values of the first- and second-order signals given above. It can be seen that they produce the appropriate quaternary value 2, 1, 3, 0 and 1 for the five decoded row coefficients $a_4$, $a_3$, $a_2$, $a_1$, and a'.

The coefficient converter also produces six signals representing coefficients $a_{12}$, $a_{13}$, $a_{14}$, $a_{23}$, $a_{24}$ and $a_{34}$ according to the following relationships:

$$a_{12} = (u_{23} + u_{12}u_{13}) \bmod 2 \quad [=1]$$
$$a_{13} = (u_{24} + u_{12}u_{14}) \bmod 2 \quad [=1]$$
$$a_{14} = (u_{25} + u_{12}u_{15}) \bmod 2 \quad [=0]$$
$$a_{23} = (u_{34} + u_{13}u_{14}) \bmod 2 \quad [=0]$$
$$a_{24} = (u_{35} + u_{13}u_{15}) \bmod 2 \quad [=0]$$
$$a_{34} = (u_{45} + u_{14}u_{15}) \bmod 2 \quad [=1]$$

These additional signals together identify which of the six additional rows $2(X_1*X_2)$, $2(X_1*X_3)$, $2(X_1*X_4)$, $2(X_2*X_3)$, $2(X_2*X_4)$ and $2(X_3*X_4)$ respectively of the generator array were combined to form the coset representative from which the 16-symbol quaternary code word was produced. In the case of the data word 1 1011 0110 0001 the coset representative in question is $2(X_1*X_2)\oplus 2(X_1*X_3)\oplus 2(X_3*X_4)$, and it can be seen that the relevant coefficients $a_{12}$, $a_{13}$ and $a_{34}$ have values of 1 to indicate this.

The combination of the six coefficient signals $a_{12}$, $a_{13}$, $a_{14}$, $a_{23}$, $a_{24}$ and $a_{34}$ can be used to derive the three most significant bits of the data word by means of a selector similar to the selector 128 in the decoder 120 of FIG. 10. The ten least significant output bits are derived, in pairs, from the decoded row coefficients $a_1$, $a_2$, $a_3$, $a_4$ and a' by reference to the Gray code in Table 5 above.

It is noted that decoding quaternary code words containing $2^m$ symbols using a binary decoder for a code of length $2^{m+1}$ bits in this manner involves reference to the Gray code table for two distinct purposes: one purpose is to assist the transfer of data, with detection and correction of errors, over the complete communication path, as already described with reference to the encoders 160 and 230 of FIGS. 12 and 14; the second purpose is to permit the use of binary decoder circuitry, thereby avoiding the expense and effort of implementing circuitry for operating directly on quaternary signals and, in general, enhancing speed of operation.

To apply a binary decoder in the general case of a quaternary code word containing $2^m$ symbols, the code word is converted, symbol by symbol, to a corresponding $2^{m+1}$-bit binary code word as described above and using the Gray code in Table 5, respective symbols in each pair of Gray code binary symbols being assigned to respective halves of that binary code word. This binary code word is decoded as an element of the second-order Reed-Muller code of length $2^{m+1}$, RM(2, m+1), using a binary decoder to give coefficients $u_1$, $u_2$, . . . $u_{m+1}$, u', $u_{12}$, $u_{13}$, . . . $u_{m,m+1}$. These coefficients can then be transformed into the required quaternary output coefficients according to the relationships $$a'=2u'+u_1$$

$$a_i=(2u_{i+1}+u_{1,i+1}(1+2u_1))\bmod 4 \text{ for } 1\leqq i\leqq m$$

$$a_{ik}=(u_{i+1,k+1}+u_{1,i+1}u_{1,k+1})\bmod 2 \text{ for } 1\leqq i<k\leqq m$$

The values $a_1$, $a_2$, . . . $a_m$, and a' give 2(m+1) decoded data bits via the Gray code in Table 5; the remaining bits are recovered by reference to a look-up table of the coset representatives chosen for use, according to the values of the coefficients $a_{12}$, $a_{13}$, . . . $a_{m-1,m}$.

The assignment of respective symbols in each pair of Gray code binary symbols to respective halves of the $2^{m+1}$-bit binary code word, as described above, is not the only possibility. Alternative assignments of the binary symbols to respective locations in the binary code word may be used, with corresponding alteration of the relationships for transforming the coefficients $u_1$, $u_2$, . . . $u_{m+1}$, u', $u_{12}$, $u_{13}$, . . . $u_{m,m+}1$ into quaternary output coefficients. For example, the quaternary code word to be decoded could be expanded by concatenating the pairs of Gray code binary symbols in the same order as the corresponding quaternary symbols in the quaternary code word. Thus the quaternary word 1322 0212 1300 2031 would be converted to the binary word 0110 1111 0011 0111 0110 0000 1100 1001

In this case the relationships for coefficient transformation would be $$a'=2u'+u_{m+1}$$

$$a_i=((2u_i+u_{i,m+1})(1+2u_{m+1}))\bmod 4 \text{ for } 1\leqq i\leqq m$$

$$a_{ik}=(u_{i,k}+u_{i,m+1}u_{k,m+1})\bmod 2 \text{ for } 1\leqq i<k\leqq m$$

The substitution of binary processing for quaternary processing is also possible with decoders having the form of the 16Q/13B decoder 200 of FIG. 13. This may be accomplished, in the case of the decoder 200, by modifying it so that the received quaternary code word and the coset representative output by the coset store 204 are both converted to 32-bit code words, symbol by symbol and using the Gray code in Table 5 as already described. The subtractor 202 is correspondingly modified for operation modulo 2 rather than modulo 4.

The 32-bit word S output by the subtractor 202 for the current coset representative is provided to the vector generator 210, which is also modified to supply a sequence of sixteen 32-bit input vectors D to the Green machine 212 for performing the fast Hadamard transform on each of those vectors. To this end, the modified generator 210 assigns values of 0 or 1 to each of four coefficients $b_1$, $b_2$, $b_3$ *and* $b_4$, so that the coefficients taken together range through all sixteen possible combinations of values. For each such combination, a quaternary 16-symbol value is derived according to the relation $$(b_1X_1+b_2X_2+b_3X_3+b_4X_4)\bmod 4$$

and this value is also converted to a 32-bit word B, in the same manner as the input quaternary code word and the current coset representative. It should be noted that although the above relation is similar to that for the value B in the case of the unmodified decoder 200, it is not identical; in particular the modified relation does not involve a coefficient b'.

Each vector D is derived by bitwise addition modulo 2 of the 32-bit word S and the respective 32-bit word B, and the values +1 and −1 are substituted for the binary values 0 and 1 respectively in that vector D. Then the vector D is supplied to the Green machine 212, modified to implement the fast Hadamard transform of length thirty-two.

The output of the Green machine 212 comprises, for each vector D, thirty-two transform components, which are supplied to the comparator 214 (modified to receive thirty-two components) and the latch 216, for selection, over all the values of B for each of the coset representatives, of the transform component $E_z$ with the largest absolute value, and the corresponding values of z (from 0 to 31), the four coefficients $b_1$, $b_2$, $b_3$ and $b_4$, and the coset index. The selected value of z, the sign of $E_z$ and the coefficients $b_1$, $b_2$, $b_3$ and $b_4$ together determine the values of the ten least significant bits of the decoded data, as described below, while the coset index comprises the three most significant output bits.

To determine the values of the ten least significant output bits, a coefficient c' is set to 1 if $E_z$ is negative and to 0 if it is positive, and the value of z is expressed as a five-bit binary number $c_1c_2c_3c_4c_5$. Five decoded row coefficients $a_4$, $a_3$, $a_2$, $a_1$ and a' are determined from the expressions $$a_1=(2c_2+b_1(1+2c_1))\bmod 4$$

$$a_2=(2c_3+b_2(1+2c_1))\bmod 4$$

$$a_3=(2c_4+b_3(1+2c_1))\bmod 4$$

$$a_4=(2c_5+b_4(1+2c_1))\bmod 4$$

$$a'=2c'+c_1$$

The decoded data bits can then be derived, in pairs, from these row coefficients by reference to the Gray code in Table 5.

To use a modified decoder 200 in this way for the general case of a quaternary code word containing $2^m$ symbols, the code word and the coset representative are converted, symbol by symbol, to a corresponding binary code word. The binary coefficients $b_1, b_2, \ldots, b_m$ taken together range through $2^m$ possible combinations of values. The value B is derived by converting the value of the quaternary expression $$(b_1X_1+b_2X_2+\ldots+b_mX_m)\bmod 4$$

to a $2^{m+1}$-bit binary word. For determining the values of the 2(m+1) least significant output bits from row coefficients, the value of z is expressed as a binary number $c_1c_2\ldots c_{m+1}$, and the decoded row coefficients $a_1, a_2, \ldots, a_m$ and a' are determined from the expressions $$a_i=(2c_{i+1}+b_i(1+2c_1))\bmod 4 \text{ for } 1<=i<=m$$

$$a'=2c'+c_1$$

The discussions above of quaternary codes have been expressed in terms of quaternary symbols having possible values of 0, 1, 2 and 3. For actual transmission, for example by quadrature phase-shift keying (QPSK) modulation, these values would correspond to four different values of phase shift. One possibility is phase shifts of 0°, 90°, 180° and 270° (equivalent to complex vectors 1, i, −1 and −i respectively, where $i=\sqrt{-1}$). However, other variants are possible in which the phase shifts are, for example, 45°, 135°, 225° and 315° (equivalent to complex vectors $(1+i)/\sqrt{2}$, $(-1+i)/\sqrt{2}$, $(-1-i)/\sqrt{2}$ and $(1-i)/\sqrt{2}$ respectively). This principle applies for codes with more symbol values (j>2), and indeed the symbol values may be represented by any $2^j$ distinguishable signal modulations; their amplitudes need not be equal, and, in the case of phase-shift keying, the phase differences between adjacent pairs need not all be equal.

The methods and apparatus described above for encoding and decoding COFDM signals provide a highly advantageous combination of error detection and correction properties, low PMEPR, convenience of implementation and useful rate of data transfer. In particular where long code words (i.e. many carriers in a multi-carrier system) are required to provide a high data rate these properties can be obtained without undertaking an extensive (and probably impractical) exhaustive search through all possible code words. In certain circumstances it may be desired to modify the selection of code words to alter the trade-offs between these different properties.

For example, it may be desired to increase the available population of code words, in order to increase the data transfer rate, at the expense of accepting a higher maximum value of PMEPR. Considering binary codes of length sixteen (m=4), for example, it is possible to construct every possible coset of the base code whose coset representative is a linear combination of the additional rows in the generator array, and to derive the maximum peak envelope power (PEP) resulting from use of code words within that coset. This enables the cosets to be listed in ascending order of maximum PEP over each coset, as shown in Table 7. In this table the first column contains six coefficients which constitute multipliers for the respective additional rows of the code's generator array which are added symbol-wise modulo $2^j$ to create the coset representative; thus, for example, a 1 under the heading '12' indicates that the additional row $(X_1{*}X_2)$ is multiplied by 1 for inclusion in the coset representative, whereas a 0 indicates it is multiplied by 0 (i.e. effectively omitted). The middle column shows the coset representative itself, and the final column shows the maximum PEP resulting from use of any code word in that coset.

TABLE 7

| Binary length 16 | | | | | | | |
|---|---|---|---|---|---|---|---|
| 'Additional row' coefficients | | | | | | | PEP over |
| 12 | 13 | 14 | 23 | 24 | 34 | Coset representative | coset (W) |
| 1 | 0 | 0 | 1 | 0 | 1 | 0001 0010 0001 1101 | 31.59 |
| 1 | 1 | 0 | 0 | 0 | 1 | 0001 0001 0010 1101 | 31.94 |
| 0 | 1 | 0 | 1 | 1 | 0 | 0000 0110 0011 0101 | 31.95 |
| 1 | 0 | 0 | 0 | 1 | 1 | 0001 0100 0001 1011 | 31.98 |
| 0 | 1 | 0 | 0 | 1 | 1 | 0001 0100 0010 0111 | 31.98 |
| 0 | 0 | 1 | 1 | 0 | 1 | 0001 0010 0100 0111 | 31.98 |
| 0 | 1 | 1 | 0 | 1 | 0 | 0000 0101 0110 0011 | 31.98 |
| 1 | 0 | 1 | 0 | 0 | 1 | 0001 0001 0100 1011 | 31.98 |
| 1 | 1 | 0 | 0 | 1 | 0 | 0000 0101 0011 1001 | 31.99 |
| 1 | 0 | 1 | 1 | 0 | 0 | 0000 0011 0101 1001 | 31.99 |
| 0 | 0 | 1 | 1 | 1 | 0 | 0000 0110 0101 0011 | 32.00 |
| 0 | 1 | 1 | 1 | 0 | 0 | 0000 0011 0110 0101 | 32.00 |
| ------------ | | | | | | ------------ | (1) |
| 1 | 0 | 0 | 0 | 0 | 1 | 0001 0001 0001 1110 | 49.82 |
| 0 | 0 | 1 | 1 | 0 | 0 | 0000 0011 0101 0110 | 49.87 |
| 0 | 1 | 0 | 0 | 1 | 0 | 0000 0101 0011 0110 | 49.98 |
| 0 | 1 | 1 | 0 | 1 | 1 | 0001 0100 0111 0010 | 50.88 |
| 1 | 0 | 1 | 0 | 1 | 1 | 0001 0100 0100 1110 | 51.10 |
| 1 | 1 | 0 | 1 | 1 | 0 | 0000 0110 0011 1010 | 51.12 |
| 1 | 0 | 0 | 1 | 1 | 1 | 0001 0111 0001 1000 | 51.65 |
| 0 | 0 | 1 | 1 | 1 | 1 | 0001 0111 0100 0010 | 51.76 |
| 1 | 0 | 1 | 1 | 1 | 0 | 0000 0110 0101 1100 | 51.81 |
| 1 | 1 | 1 | 0 | 1 | 0 | 0000 0101 0110 1100 | 52.87 |
| 1 | 1 | 1 | 1 | 0 | 0 | 0000 0011 0110 1010 | 52.90 |
| 0 | 1 | 1 | 1 | 0 | 1 | 0001 0010 0111 0100 | 53.47 |
| 1 | 1 | 1 | 0 | 0 | 1 | 0001 0001 0111 1000 | 53.56 |
| 0 | 1 | 0 | 1 | 1 | 1 | 0001 0111 0010 0100 | 53.82 |
| 1 | 1 | 0 | 1 | 0 | 1 | 0001 0010 0010 1110 | 53.99 |
| ------------ | | | | | | ------------ | (2) |
| 0 | 0 | 0 | 0 | 1 | 1 | 0001 0100 0001 0100 | 64.00 |
| 0 | 0 | 0 | 1 | 0 | 1 | 0001 0010 0001 0010 | 64.00 |
| 0 | 0 | 0 | 1 | 1 | 0 | 0000 0110 0000 0110 | 64.00 |
| 0 | 0 | 1 | 0 | 0 | 1 | 0001 0001 0100 0100 | 64.00 |
| 0 | 0 | 1 | 0 | 1 | 0 | 0000 0101 0101 0000 | 64.00 |
| 0 | 0 | 1 | 0 | 1 | 1 | 0001 0100 0100 0001 | 64.00 |
| 0 | 1 | 0 | 0 | 0 | 1 | 0001 0001 0010 0010 | 64.00 |
| 0 | 1 | 0 | 1 | 0 | 0 | 0000 0011 0011 0000 | 64.00 |
| 0 | 1 | 0 | 1 | 0 | 1 | 0001 0010 0010 0001 | 64.00 |
| 0 | 1 | 1 | 0 | 0 | 0 | 0000 0000 0110 0110 | 64.00 |
| 0 | 1 | 1 | 1 | 1 | 0 | 0000 0110 0110 0000 | 64.00 |
| 0 | 1 | 1 | 1 | 1 | 1 | 0001 0111 0111 0001 | 64.00 |
| 1 | 0 | 0 | 0 | 1 | 0 | 0000 0101 0000 1010 | 64.00 |
| 1 | 0 | 0 | 1 | 0 | 0 | 0000 0011 0000 1100 | 64.00 |
| 1 | 0 | 0 | 1 | 1 | 0 | 0000 0110 0000 1001 | 64.00 |
| 1 | 0 | 1 | 0 | 0 | 0 | 0000 0000 0101 1010 | 64.00 |
| 1 | 0 | 1 | 1 | 0 | 1 | 0001 0010 0100 1000 | 64.00 |
| 1 | 0 | 1 | 1 | 1 | 1 | 0001 0111 0100 1101 | 64.00 |
| 1 | 1 | 0 | 0 | 0 | 0 | 0000 0000 0011 1100 | 64.00 |
| 1 | 1 | 0 | 0 | 1 | 1 | 0001 0100 0010 1000 | 64.00 |
| 1 | 1 | 0 | 1 | 1 | 1 | 0001 0111 0010 1011 | 64.00 |
| 1 | 1 | 1 | 0 | 0 | 0 | 0000 0000 0110 1001 | 64.00 |
| 1 | 1 | 1 | 0 | 1 | 1 | 0001 0100 0111 1101 | 64.00 |
| 1 | 1 | 1 | 1 | 0 | 1 | 0001 0010 0111 1011 | 64.00 |
| 1 | 1 | 1 | 1 | 1 | 0 | 0000 0110 0110 1111 | 64.00 |
| ------------ | | | | | | ------------ | (3) |
| 1 | 1 | 1 | 1 | 1 | 1 | 0001 0111 0111 1110 | 98.95 |
| 0 | 1 | 0 | 0 | 0 | 0 | 0000 0000 0011 0011 | 99.72 |
| 0 | 1 | 1 | 0 | 0 | 1 | 0001 0001 0111 0111 | 101.43 |
| 1 | 1 | 0 | 1 | 0 | 0 | 0000 0011 0011 1111 | 101.55 |
| 0 | 0 | 0 | 1 | 0 | 0 | 0000 0011 0000 0011 | 105.60 |
| 1 | 0 | 0 | 0 | 0 | 0 | 0000 0000 0000 1111 | 105.85 |
| 0 | 0 | 0 | 1 | 1 | 1 | 0001 0111 0001 0111 | 106.22 |
| 0 | 0 | 0 | 0 | 1 | 0 | 0000 0101 0000 0101 | 106.41 |
| 1 | 0 | 1 | 0 | 1 | 0 | 0000 0101 0101 1111 | 106.69 |
| 0 | 0 | 0 | 0 | 0 | 1 | 0001 0001 0001 0001 | 109.48 |
| 0 | 0 | 1 | 0 | 0 | 0 | 0000 0000 0101 0101 | 109.75 |
| 0 | 0 | 0 | 0 | 0 | 0 | 0000 0000 0000 0000 | 256.00 |

It should be noted that the derivation of the PEP over a coset involves calculating the amplitude of the envelope of the composite waveform produced by a code word at successive sample points along the envelope in the time domain. The interval between the time values for successive samples affects the accuracy of the result: a shorter time interval increases the accuracy, but at the expense of increasing the number of samples required for the entire waveform and thus increasing the amount of calculation. Typically the derivation of the PEP is repeated for successively shorter intervals until the values of PEP obtained are stable to some predetermined number of significant figures or decimal places. In the case of Table 7, the calculation has been repeated in this way until the second decimal place, after rounding, is stable.

As explained above, the 384 code words associated with the first twelve coset representatives listed in Table 7, above dashed line (1), provide a PMEPR of no more than 3 dB, i.e. a factor of two (the mean envelope power for code words of length $2^m$ is $2^m$; hence for code words of length sixteen the mean envelope power is 16, so a PEP of up to 32 gives a PMEPR of up to two).

If the code words used are those associated with the first 27 coset representatives in the first half of Table 7, i.e. above dashed line (2), plus any five of the next 25 coset representatives, i.e. above dashed line (3), it becomes possible to encode ten data bits while maintaining the minimum Hamming distance unchanged at $2^{m-2}$ (=4). This increases the number of data bits which can be represented with 16-bit code words from eight to ten, while the maximum PMEPR increases from two to only four (rather than sixteen which would be the case if any code word were permitted). These extra data bits can be accommodated by the selector 112 in FIG. 9, which in this case can be modified to select from any of the chosen 32 (=$2^5$) coset representatives, in accordance with the values of five most significant bits of a data word (instead of only three such bits).

Tables similar to Table 7 can be prepared for other lengths of binary code word. For a code word length of $2^m$, any code comprising a set of cosets from such a table has a minimum Hamming distance of $2^{m-2}$ (as for the binary codes previously described with PMEPR of at most 3 dB), and any appropriate decoder described above can be used.

Similar trade-offs between data transfer rate and PMEPR can be made with quaternary, octary and higher-order codes. Table 8 shows coset representatives for quaternary codes of length 16 symbols, ordered by maximum PEP over each coset, in the same format as Table 7:

TABLE 8

| Quaternary length 16 | | | | | | | |
|---|---|---|---|---|---|---|---|
| 'Additional row' coefficients | | | | | | | PEP over |
| 12 | 13 | 14 | 23 | 24 | 34 | Coset representative | coset (W) |
| 0 | 0 | 1 | 1 | 0 | 1 | 0002 0020 0200 0222 | 32.00 |
| 0 | 1 | 0 | 0 | 1 | 1 | 0002 0200 0020 0222 | 32.00 |
| 0 | 1 | 0 | 1 | 1 | 0 | 0000 0220 0022 0202 | 32.00 |
| 0 | 1 | 1 | 1 | 0 | 0 | 0000 0022 0220 0202 | 32.00 |
| 1 | 0 | 0 | 0 | 1 | 1 | 0002 0200 0002 2022 | 32.00 |
| 1 | 0 | 0 | 1 | 0 | 1 | 0002 0020 0002 2202 | 32.00 |
| 1 | 0 | 1 | 0 | 0 | 1 | 0002 0002 0200 2022 | 32.00 |
| 1 | 0 | 1 | 1 | 0 | 0 | 0000 0022 0202 2002 | 32.00 |
| 1 | 1 | 0 | 0 | 0 | 1 | 0002 0002 0020 2202 | 32.00 |
| 1 | 1 | 0 | 0 | 1 | 0 | 0000 0202 0022 2002 | 32.00 |
| 0 | 0 | 1 | 1 | 1 | 0 | 0000 0220 0202 0022 | 32.00 |
| 0 | 1 | 1 | 0 | 1 | 0 | 0000 0202 0220 0022 | 32.00 |
| ------------ | | | | | | ------------ | (1) |
| 0 | 0 | 0 | 1 | 0 | 1 | 0002 0020 0002 0020 | 64.00 |
| 0 | 0 | 0 | 1 | 1 | 0 | 0000 0220 0000 0220 | 64.00 |
| 0 | 0 | 1 | 0 | 1 | 1 | 0002 0200 0200 0002 | 64.00 |
| 0 | 0 | 1 | 1 | 0 | 0 | 0000 0022 0202 0220 | 64.00 |
| 0 | 0 | 1 | 1 | 1 | 1 | 0002 0222 0200 0020 | 64.00 |

TABLE 8-continued

| Quaternary length 16 | | | | | | | |
|---|---|---|---|---|---|---|---|
| 'Additional row' coefficients | | | | | | | PEP over |
| 12 | 13 | 14 | 23 | 24 | 34 | Coset representative | coset (W) |
| 0 | 1 | 0 | 0 | 0 | 1 | 0002 0002 0020 0020 | 64.00 |
| 0 | 1 | 0 | 0 | 1 | 0 | 0000 0202 0022 0220 | 64.00 |
| 0 | 1 | 0 | 1 | 0 | 1 | 0002 0020 0020 0002 | 64.00 |
| 0 | 1 | 0 | 1 | 1 | 1 | 0002 0222 0020 0200 | 64.00 |
| 0 | 1 | 1 | 0 | 0 | 0 | 0000 0000 0220 0220 | 64.00 |
| 0 | 1 | 1 | 0 | 1 | 1 | 0002 0200 0222 0020 | 64.00 |
| 0 | 1 | 1 | 1 | 0 | 1 | 0002 0020 0222 0200 | 64.00 |
| 0 | 1 | 1 | 1 | 1 | 1 | 0002 0222 0222 0002 | 64.00 |
| 1 | 0 | 0 | 0 | 0 | 1 | 0002 0002 0002 2220 | 64.00 |
| 1 | 0 | 0 | 0 | 1 | 0 | 0000 0202 0000 2020 | 64.00 |
| 1 | 0 | 0 | 1 | 0 | 0 | 0000 0022 0000 2200 | 64.00 |
| 1 | 0 | 0 | 1 | 1 | 0 | 0000 0220 0000 2002 | 64.00 |
| 1 | 0 | 0 | 1 | 1 | 1 | 0002 0222 0002 2000 | 64.00 |
| 1 | 0 | 1 | 0 | 0 | 0 | 0000 0000 0202 2020 | 64.00 |
| 1 | 0 | 1 | 0 | 1 | 1 | 0002 0200 0200 2220 | 64.00 |
| 1 | 0 | 1 | 1 | 1 | 0 | 0000 0220 0202 2200 | 64.00 |
| 1 | 0 | 1 | 1 | 1 | 1 | 0002 0222 0200 2202 | 64.00 |
| 1 | 1 | 0 | 0 | 0 | 0 | 0000 0000 0022 2200 | 64.00 |
| 1 | 1 | 0 | 1 | 0 | 1 | 0002 0020 0020 2220 | 64.00 |
| 1 | 1 | 0 | 1 | 1 | 0 | 0000 0220 0022 2020 | 64.00 |
| 1 | 1 | 1 | 0 | 0 | 0 | 0000 0000 0220 2002 | 64.00 |
| 1 | 1 | 1 | 0 | 0 | 1 | 0002 0002 0222 2000 | 64.00 |
| 1 | 1 | 1 | 0 | 1 | 0 | 0000 0202 0220 2200 | 64.00 |
| 1 | 1 | 1 | 0 | 1 | 1 | 0002 0200 0222 2202 | 64.00 |
| 1 | 1 | 1 | 1 | 0 | 0 | 0000 0022 0220 2020 | 64.00 |
| 0 | 0 | 0 | 0 | 1 | 1 | 0002 0200 0002 0200 | 64.00 |
| 0 | 0 | 1 | 0 | 0 | 1 | 0002 0002 0200 0200 | 64.00 |
| 0 | 0 | 1 | 0 | 1 | 0 | 0000 0202 0202 0000 | 64.00 |
| 0 | 1 | 0 | 1 | 0 | 0 | 0000 0022 0022 0000 | 64.00 |
| 0 | 1 | 1 | 1 | 1 | 0 | 0000 0220 0220 0000 | 64.00 |
| 1 | 0 | 1 | 1 | 0 | 1 | 0002 0020 0200 2000 | 64.00 |
| 1 | 1 | 0 | 0 | 1 | 1 | 0002 0200 0020 2000 | 64.00 |
| 1 | 1 | 0 | 1 | 1 | 1 | 0002 0222 0020 2022 | 64.00 |
| 1 | 1 | 1 | 1 | 0 | 1 | 0002 0020 0222 2022 | 64.00 |
| 1 | 1 | 1 | 1 | 1 | 0 | 0000 0220 0220 2222 | 64.00 |
| ------------------------------------------ | | | | | | | (2) |
| 1 | 1 | 0 | 1 | 0 | 0 | 0000 0022 0022 2222 | 128.00 |
| 0 | 0 | 0 | 0 | 0 | 1 | 0002 0002 0002 0002 | 128.00 |
| 0 | 0 | 0 | 0 | 1 | 0 | 0000 0202 0000 0202 | 128.00 |
| 0 | 0 | 0 | 1 | 0 | 0 | 0000 0022 0000 0022 | 128.00 |
| 0 | 0 | 0 | 1 | 1 | 1 | 0002 0222 0002 0222 | 128.00 |
| 0 | 1 | 1 | 0 | 0 | 1 | 0002 0002 0222 0222 | 128.00 |
| 1 | 0 | 1 | 0 | 1 | 0 | 0000 0202 0202 2222 | 128.00 |
| 0 | 0 | 1 | 0 | 0 | 0 | 0000 0000 0202 0202 | 128.00 |
| 0 | 1 | 0 | 0 | 0 | 0 | 0000 0000 0022 0022 | 128.00 |
| 1 | 0 | 0 | 0 | 0 | 0 | 0000 0000 0000 2222 | 128.00 |
| 1 | 1 | 1 | 1 | 1 | 1 | 0002 0222 0222 2220 | 128.00 |
| 0 | 0 | 0 | 0 | 0 | 0 | 0000 0000 0000 0000 | 256.00 |

This table can be used in a similar manner to Table 7. Thus, for example, the code words associated with the first twelve cosets in Table 8, above dashed line (1), together with those associated with any twenty of the next forty cosets, between dashed lines (1) and (2), can be used to encode up to fifteen data bits as quaternary code words sixteen symbols long; the maximum PMEPR of a multi-carrier signal modulated in accordance with those code words is four (6 dB).

Tables similar to Table 8 can be prepared for other lengths of quaternary code word. For a code word length of $2^m$, any code comprising a set of cosets from such a table has a minimum Hamming distance of $2^{m-2}$ and a minimum Lee distance of $2^{m-1}$ (as for the quaternary codes previously described producing a PMEPR of at most 3 dB); any appropriate decoder described above can be used with such a code, and retains the associated properties already discussed.

Each of the coset representatives listed in Tables 7 and 8 is a linear combination of the additional rows in the respective generator array. Other coset representatives for the base codes could be included to generate larger tables in similar manner, but it is generally less desirable to select code words for use from such tables solely on the basis of tabulated PEP, because such selections of code words would be likely to have inferior error detection and correction properties. It is also noted that the generator arrays used in driving Tables 7 and 8 are the same generator arrays used in deriving the respective minimum PMEPR binary and quaternary codes described earlier.

Table 9 shows coset representatives for octary codes of length 16 symbols, ordered by maximum PEP over each coset. In this case the first column contains six coefficients constituting multipliers for $2^m$-symbol words which are of the form $2(X_i*X_k)$ (whereas the additional rows of the octary generator array are of the form $4(X_i*X_k)$, and which are added symbol-wise modulo $2^j$ to create the coset representative; thus, for example, a 3 under the heading '12' indicates that the symbols of the word $2(X_1*X_2)$ are each multiplied by 3 for inclusion in the coset representative. Thus in this case the coset representatives listed are not limited to linear combinations of additional rows in the octary generator array. In view of the length of this table, only selected rows are given here:

TABLE 9

| Octary length 16 | | | | | | | |
|---|---|---|---|---|---|---|---|
| 'Additional row' coefficients | | | | | | | PEP over |
| 12 | 13 | 14 | 23 | 24 | 34 | Coset representative | coset (W) |
| 0 | 0 | 2 | 2 | 0 | 2 | 0004 0040 0400 0444 | 32.00 |
| 2 | 0 | 0 | 0 | 2 | 2 | 0004 0400 0004 4044 | 32.00 |
| 2 | 0 | 0 | 2 | 0 | 2 | 0004 0040 0004 4404 | 32.00 |
| 2 | 0 | 2 | 0 | 0 | 2 | 0004 0004 0400 4044 | 32.00 |
| 2 | 0 | 2 | 2 | 0 | 0 | 0000 0044 0404 4004 | 32.00 |
| 2 | 2 | 0 | 0 | 0 | 2 | 0004 0004 0040 4404 | 32.00 |
| 2 | 2 | 0 | 0 | 2 | 0 | 0000 0404 0044 4004 | 32.00 |
| 0 | 0 | 2 | 2 | 2 | 0 | 0000 0440 0404 0044 | 32.00 |
| 0 | 2 | 0 | 2 | 2 | 0 | 0000 0440 0044 0404 | 32.00 |
| 0 | 2 | 0 | 0 | 2 | 2 | 0004 0400 0040 0444 | 32.00 |
| 0 | 2 | 2 | 0 | 2 | 0 | 0000 0404 0440 0044 | 32.00 |
| 0 | 2 | 2 | 2 | 0 | 0 | 0000 0044 0440 0404 | 32.00 |
| 1 | 0 | 2 | 2 | 1 | 0 | 0000 0246 0404 2064 | 48.00 |
| 1 | 2 | 1 | 0 | 2 | 0 | 0000 0404 0246 2064 | 48.00 |
| 0 | 0 | 2 | 2 | 1 | 1 | 0002 0240 0406 0644 | 48.00 |
| 0 | 1 | 2 | 2 | 0 | 1 | 0002 0046 0420 0464 | 48.00 |
| 1 | 2 | 0 | 1 | 2 | 0 | 0000 0426 0044 2604 | 48.00 |
| 0 | 2 | 0 | 1 | 2 | 1 | 0002 0420 0046 0464 | 48.00 |
| 0 | 2 | 1 | 0 | 2 | 1 | 0002 0406 0240 0644 | 48.00 |
| 2 | 0 | 0 | 1 | 1 | 2 | 0004 0220 0004 4664 | 48.00 |
| 2 | 0 | 1 | 0 | 1 | 2 | 0004 0206 0206 4044 | 48.00 |
| 2 | 1 | 0 | 1 | 0 | 2 | 0004 0026 0026 4404 | 48.00 |
| 1 | 1 | 2 | 2 | 0 | 0 | 0000 0044 0426 2604 | 48.00 |
| 2 | 1 | 1 | 0 | 0 | 2 | 0004 0004 0220 4664 | 48.00 |
| 0 | 2 | 3 | 0 | 2 | 3 | 0006 0402 0640 0244 | 48.00 |
| 2 | 0 | 0 | 3 | 3 | 2 | 0004 0660 0004 4224 | 48.00 |
| 2 | 0 | 3 | 0 | 3 | 2 | 0004 0602 0602 4044 | 48.00 |
| 2 | 3 | 0 | 3 | 0 | 2 | 0004 0062 0062 4404 | 48.00 |
| 2 | 3 | 3 | 0 | 0 | 2 | 0004 0004 0660 4224 | 48.00 |
| 3 | 2 | 0 | 3 | 2 | 0 | 0000 0462 0044 6204 | 48.00 |
| 3 | 2 | 3 | 0 | 2 | 0 | 0000 0404 0642 6024 | 48.00 |
| 3 | 3 | 2 | 2 | 0 | 0 | 0000 0044 0462 6204 | 48.00 |
| 0 | 0 | 2 | 2 | 1 | 3 | 0006 0244 0402 0640 | 48.00 |
| 0 | 0 | 2 | 2 | 3 | 1 | 0002 0644 0406 0240 | 48.00 |
| 0 | 0 | 2 | 2 | 3 | 3 | 0006 0640 0402 0244 | 48.00 |
| 0 | 2 | 0 | 3 | 2 | 3 | 0006 0460 0042 0424 | 48.00 |
| 0 | 2 | 1 | 0 | 2 | 3 | 0006 0402 0244 0640 | 48.00 |
| 0 | 3 | 2 | 2 | 0 | 3 | 0006 0042 0460 0424 | 48.00 |
| 1 | 3 | 2 | 2 | 0 | 0 | 0000 0044 0462 2640 | 48.00 |
| 3 | 0 | 2 | 2 | 3 | 0 | 0000 0642 0404 6024 | 48.00 |

TABLE 9-continued

| Octary length 16 | | | | | | | |
|---|---|---|---|---|---|---|---|
| 'Additional row' coefficients | | | | | | | PEP over |
| 12 | 13 | 14 | 23 | 24 | 34 | Coset representative | coset (W) |
| 0 | 2 | 0 | 3 | 2 | 1 | 0002 0464 0046 0420 | 48.00 |
| 0 | 1 | 2 | 2 | 0 | 3 | 0006 0042 0424 0460 | 48.00 |
| 2 | 0 | 0 | 1 | 3 | 2 | 0004 0624 0004 4260 | 48.00 |
| 2 | 0 | 1 | 0 | 3 | 2 | 0004 0602 0206 4440 | 48.00 |
| 2 | 1 | 0 | 3 | 0 | 2 | 0004 0062 0026 4440 | 48.00 |
| 1 | 0 | 2 | 2 | 3 | 0 | 0000 0642 0404 2460 | 48.00 |
| 1 | 2 | 3 | 0 | 2 | 0 | 0000 0404 0642 2460 | 48.00 |
| 0 | 2 | 0 | 1 | 2 | 3 | 0006 0424 0042 0460 | 48.00 |
| 0 | 2 | 3 | 0 | 2 | 1 | 0002 0406 0644 0240 | 48.00 |
| 0 | 3 | 2 | 2 | 0 | 1 | 0002 0046 0464 0420 | 48.00 |
| 2 | 0 | 0 | 3 | 1 | 2 | 0004 0264 0004 4620 | 48.00 |
| 2 | 0 | 3 | 0 | 1 | 2 | 0004 0206 0602 4440 | 48.00 |
| 2 | 1 | 3 | 0 | 0 | 2 | 0004 0004 0624 4260 | 48.00 |
| 2 | 3 | 1 | 0 | 0 | 2 | 0004 0004 0264 4620 | 48.00 |
| 1 | 2 | 0 | 3 | 2 | 0 | 0000 0462 0044 2640 | 48.00 |
| 3 | 0 | 2 | 2 | 1 | 0 | 0000 0246 0404 6420 | 48.00 |
| 3 | 1 | 2 | 2 | 0 | 0 | 0000 0044 0426 6240 | 48.00 |
| 2 | 3 | 0 | 1 | 0 | 2 | 0004 0026 0062 4440 | 48.00 |
| 3 | 2 | 0 | 1 | 2 | 0 | 0000 0426 0044 6240 | 48.00 |
| 3 | 2 | 1 | 0 | 2 | 0 | 0000 0404 0246 6420 | 48.00 |
| 0 | 0 | 2 | 2 | 0 | 1 | 0002 0046 0406 0442 | 54.63 |
| 0 | 2 | 0 | 0 | 2 | 1 | 0002 0406 0046 0442 | 54.63 |
| 0 | 0 | 2 | 2 | 2 | 3 | 0006 0446 0402 0042 | 54.63 |
| 0 | 2 | 0 | 2 | 2 | 3 | 0006 0446 0042 0402 | 54.63 |
| 0 | 2 | 2 | 0 | 2 | 3 | 0006 0402 0446 0042 | 54.63 |
| 0 | 2 | 2 | 2 | 0 | 3 | 0006 0042 0446 0402 | 54.63 |
| 0 | 0 | 2 | 2 | 3 | 2 | 0004 0646 0400 0242 | 54.63 |
| 0 | 0 | 2 | 2 | 1 | 0 | 0000 0246 0404 0642 | 54.63 |
| 2 | 0 | 0 | 2 | 3 | 2 | 0004 0646 0004 4202 | 54.63 |
| 2 | 0 | 0 | 0 | 1 | 2 | 0004 0206 0004 4642 | 54.63 |
| 2 | 0 | 2 | 0 | 3 | 2 | 0004 0602 0400 4642 | 54.63 |
| 2 | 0 | 2 | 2 | 3 | 0 | 0000 0642 0404 4602 | 54.63 |
| (132 rows omitted) | | | | | | | |
| 3 | 2 | 2 | 2 | 0 | 3 | 0006 0042 0446 6260 | 58.90 |
| 1 | 2 | 2 | 2 | 0 | 1 | 0002 0046 0442 2620 | 58.90 |
| 2 | 2 | 3 | 3 | 0 | 2 | 0004 0062 0646 4260 | 58.91 |
| 2 | 2 | 1 | 1 | 0 | 2 | 0004 0026 0242 4620 | 58.91 |
| 3 | 2 | 2 | 0 | 2 | 3 | 0006 0402 0446 6620 | 58.97 |
| 1 | 2 | 2 | 0 | 2 | 1 | 0002 0406 0442 2260 | 58.97 |
| 2 | 3 | 2 | 0 | 3 | 2 | 0004 0602 0466 4620 | 58.97 |
| 2 | 1 | 2 | 0 | 1 | 2 | 0004 0206 0422 4260 | 58.97 |
| 2 | 1 | 2 | 2 | 3 | 0 | 0000 0642 0426 4624 | 58.98 |
| 2 | 3 | 2 | 2 | 1 | 0 | 0000 0246 0462 4264 | 58.98 |
| 2 | 2 | 3 | 1 | 2 | 0 | 0000 0426 0642 4624 | 58.98 |
| 2 | 2 | 1 | 3 | 2 | 0 | 0000 0462 0246 4264 | 58.98 |
| 2 | 1 | 2 | 3 | 0 | 0 | 0000 0066 0426 4040 | 58.99 |
| 2 | 3 | 2 | 1 | 0 | 0 | 0000 0022 0462 4040 | 58.99 |
| 2 | 3 | 0 | 3 | 2 | 0 | 0000 0462 0066 4004 | 59.00 |
| 2 | 1 | 0 | 1 | 2 | 0 | 0000 0426 0022 4004 | 59.00 |
| 2 | 2 | 1 | 0 | 3 | 0 | 0000 0606 0246 4400 | 59.00 |
| 2 | 2 | 3 | 0 | 1 | 0 | 0000 0202 0642 4400 | 59.00 |
| 2 | 2 | 1 | 1 | 2 | 0 | 0000 0426 0246 4220 | 59.03 |
| 2 | 2 | 3 | 3 | 2 | 0 | 0000 0462 0642 4660 | 59.03 |
| 2 | 1 | 2 | 2 | 1 | 0 | 0000 0246 0426 4220 | 59.03 |
| 2 | 3 | 2 | 2 | 3 | 0 | 0000 0642 0462 4660 | 59.03 |
| 3 | 0 | 2 | 0 | 3 | 2 | 0004 0602 0400 6064 | 59.05 |
| 1 | 0 | 2 | 0 | 1 | 2 | 0004 0206 0400 2024 | 59.05 |
| 2 | 0 | 3 | 2 | 3 | 0 | 0000 0642 0606 4004 | 59.05 |
| 2 | 0 | 1 | 2 | 1 | 0 | 0000 0246 0202 4004 | 59.05 |
| 0 | 1 | 2 | 0 | 2 | 1 | 0002 0406 0420 0024 | 59.06 |
| 0 | 3 | 2 | 0 | 2 | 3 | 0006 0402 0460 0064 | 59.06 |
| 2 | 1 | 2 | 1 | 0 | 0 | 0000 0022 0426 4004 | 59.09 |
| 2 | 3 | 2 | 3 | 0 | 0 | 0000 0066 0462 4004 | 59.09 |
| 1 | 2 | 0 | 1 | 0 | 2 | 0004 0026 0040 2204 | 59.12 |
| 3 | 2 | 0 | 3 | 0 | 2 | 0004 0062 0040 6604 | 59.12 |
| (3,850 rows omitted) | | | | | | | |
| 0 | 0 | 0 | 0 | 0 | 1 | 0002 0002 0002 0002 | 218.51 |
| 0 | 0 | 0 | 1 | 0 | 0 | 0000 0022 0000 0022 | 218.51 |
| 0 | 0 | 3 | 0 | 0 | 0 | 0000 0000 0606 0606 | 218.51 |
| 0 | 3 | 0 | 0 | 0 | 0 | 0000 0000 0066 0066 | 218.51 |
| 3 | 0 | 0 | 0 | 0 | 0 | 0000 0000 0000 6666 | 218.51 |
| 0 | 0 | 0 | 0 | 1 | 0 | 0000 0202 0000 0202 | 218.51 |
| 0 | 0 | 0 | 0 | 3 | 0 | 0000 0606 0000 0606 | 218.51 |
| 0 | 0 | 0 | 3 | 0 | 0 | 0000 0066 0000 0066 | 218.51 |
| 0 | 0 | 0 | 0 | 0 | 3 | 0006 0006 0006 0006 | 218.51 |
| 0 | 0 | 0 | 0 | 0 | 0 | 0000 0000 0000 0000 | 256.00 |

In producing Table 9 the calculation of PEP has been repeated for successively shorter intervals between envelope sample time values until at least the first decimal place, after rounding, is stable.

It can be seen from Table 9 that, in the case of octary codes, there are a great many cosets available for which the PMEPR is not even as high as four.

Tables similar to Table 9 can be prepared for other lengths of octary code word. For a code word length of $2^m$, any code comprising a set of cosets from such a table has a minimum Hamming distance of $2^{m-2}$ and a minimum Lee distance of $2^{m-1}$ (as for the octary codes previously described for which the PMEPR is at most 3 dB). This is so even though, in the octary case, the coset representatives listed are not limited to linear combinations of additional rows in the octary generator array. This unexpected feature contributes significantly to the very large number of octary cosets associated with low PMEPR.

Each of the coset representatives listed in Table 9 is a linear combination of $2^m$-symbol words of the form $2(X_i{*}X_k)$. Even more octary cosets can be made available by allowing linear combinations of $2^m$-symbol words of the form $(X_i{*}X_k)$; in this case the minimum Hamming distance of the codes remains unchanged although the minimum Lee distance may decrease. In practice this option would be exploited by adding rows to the selector 252 in the encoder 230 (FIG. 14), thereby enabling the selector to accept additional input data bits for determining selection of a coset representative. The octary decoder described above can be used with any such code, and retains the associated properties discussed above.

Still more coset representatives for the base code could be included to generate larger tables in similar manner, but it is generally less desirable to select code words for use from such tables solely on the basis of tabulated PEP, because such selections of code words would be likely to have inferior error detection and correction properties.

Tables similar to Table 9 can be produced for higher-order codes, such that each of the coset representatives is a linear combination of $2^m$-symbol words of the form $2(X_i{*}X_k)$. For a code word length of $2^m$, any code comprising a set of cosets from such a table has a minimum Hamming distance of $2^{m-2}$ and a minimum Lee distance of $2^{m-1}$. Even more cosets can be made available by allowing linear combinations of $2^m$-symbol words of the form $(X_i{*}X_k)$; in this case the minimum Hamming distance of the codes remains unchanged although the minimum Lee distance may decrease. The appropriate decoder described above can be used with any such code.

Ordered lists of cosets, such as in Tables 7, 8 and 9, can be produced using the following program in the C programming language:

```
/*   Orders the cosets of W(M) in Y(M) according to the maximum peak power
     over the coset. W(M) is the 2^J-phase linear code having the same
     formal generator matrix as RM(1,M). For J=1 (binary), Y(M) is RM(2,M).
     For J>1 (quaternary, octary, etc), Y(M) is the 2^J-phase linear code
     having the same formal generator matrix as RM(2,M), except that the
     entries of the rows corresponding to quadratic terms are multiplied by
     2.
*/
#define M 4             /* Integer M >= 2 */
#define J 1             /* Integer J >= 1. Program assumes MJ < 32.
                        Program also assumes M(M-1)/2 < 32 for J = 1,
                        and (J-1)M(M-1)/2 < 32 for J > 1 */
#define OVER 356        /* Oversampling multiple */
#define NON_BINARY (J-1)/* Flag for all cases except binary (J=1) */
#define L (1 << M)              /* Sequence length L = 2^M */
#define P (1 << J)              /* Allowed sequence symbols are 0,1,2,...P-1 */
#if NON_BINARY
#define REPS ((unsigned long)1 << ((J-1)*M*(M-1)/2))/* # of coset reps */
#define QUAD_MULT 2             /* multiple for quadratic terms */
#else
#define REPS ((unsigned long)1 << M*(M-1)/2)
#define QUAD_MULT 1
#endif
#define     PI 3.14159
#include <studio.h>
#include <math.h>
double      power( );
double      max_power( );
double      max_power_coset( );
int     gen[M+1][L];        /* Generator matrix for W(M) */
typedef struct
{
     int  a[M+1][M+1];          /* Coefficients of quadratic terms*/
     int  seq[L];               /* Sequence comprising quadratic terms */
     double   max_power;        /* Maximum power over coset */
} coset_rep;
coset_rep list[REPS];       /* List of coset reps, ordered by max power */
main( )
{
     coset_rep s;
     unsigned long     mask;
     unsigned long     c;
     int  i, j, k;
     /* Initialise gen[ ][ ] */
     initialise( );
     for (c = 0; c < REPS; c++)
     {
          /* Set up coefficients of quadratic terms */
          mask = 1;
          for (i = M; i >= 1; i--)
          for (j = M; j >= i+1; j--)
          {
               s.a[i][j] = (c & mask ? 1 : 0);
               mask <<= 1;
               for (k = 1; k < J-1; k++)
               {
                    s.a[i][j] = 2 * s.a[i][j] + (c & mask ? 1 : 0);
                    mask <<= 1;
               }
               /*   Each s.a[i][j] takes values 0 or 1 for binary,
                    and in range 0,1,2,...,P/2 -1 otherwise */
          }
          /*   Set up sequence as
               sum_{j>i} QUAD_MULT s.a[i][j] gen[i][ ] gen[j][ ] */
          for (k = 0; k < L; k++)
               s.seq[k] = 0;
          for (i = M; i >= 1; i--)
          for (j = M; j >= i+1; j--)
          {
               for (k = 0; k < L; k++)
                    s.seq[k] = (s.seq[k] + QUAD_MULT * s.a[i][j] *
                                        gen[i][k] * gen[j][k]) % P;
          }
```

-continued

```
        /*  Calculate maximum power over the coset of W(M) whose
            representative is s.seq[ ]. Coset members have form
            s.sesq[] + sum_{i=0}^{M} a[i] gen[i][ ] for 0 <= a[i < P.
        */
        s.max_power = max_power_coset(s.seq);
        /* Update records */
        update(&s, c);
    }
    /* Print ordered list of coset reps */
    print_list( );
}
initialise( )
{
    int  a[M], i, j;
    /*  Set gen[i][ ] to be i-th row of generator matrix for W(M)
        (where row 0 corresponds to X' and row i corresponds to X_i) */
    for (j = 0; j < L; j ++)
    {
        gen[0][j] = 1;
        extract_symbols(j, l, M, a);
        for (i = 1; i <= M; i++)
            gen[i][j] = a[i-1];
    }
}
/*  Store the s least sig (2^u)-ary symbols of the integer c, in order
    from most sig to least sig, in seq[0], seq[1], ..., seq[s-1]
*/
int  extract_symbols(c, u, s, seq)
int  c, u, s, *seq;
{
    unsigned int  mask;
    int  i;
    mask = ( << u) -1;      /* mask for u least sig bit positions */
    for (i = s-1; i >= 0; i--, c >>= u)
        seq[i] = c & mask;
}
double  max_power_coset(seq)
int  seq[L];
{
    unsigned long     c, mask;
    double            y, coset_max;
    int  a[M+1], d[L], i, k;
    coset_max = 0.0;
    for (c = 0; c < ((unsigned long)1 << M*J); c++)
    {
        /* Set up coefficients a[ ] of linear terms */
        mask = P-1; /* mask for J least sig bits */
        for (i = M; i >= 1; i--)
        {
            a[i] = (c & mask) >> J*(M-i);
                /* Each a[i] takes values in 0,1,2,...,P-1 */
            mask <<= J;
        }
        /*  Set up sequence as d[ ] = seq[ ] + sum_{i=1}^{M} a[i] gen[i][ ]
             No need to include row gen[0][ ] in power calculations */
            for (k = 0; k < L; k++)
            d[k] = seq[k];
        for (i = M; i >= 1; i--)
        {
            for (k = 0; k < L; k++)
                d[k] = (d[k] + a[i] * gen[i][k]) % P;
        }
        /*  Do max power calculations */
        y = max_power(d);
        if (y > coset_max)
            coset_max = y;
    }
    return(coset_max);
}
double max_power(d)
int  d[L];
{
    double  x, y, seq_max;
    seq_max = 0.0;
    for (x=0.0; x<1.0; x+=1.0/(OVER*L))      /* Sample (OVER)L points */
```

-continued

```
        {
            y = power(d, x);
            if (y > seq_max)
                seq_max = y;
        }
        return(seq_max);
}
double    power(d, x)
int   d[L];
double    x;
{
        double    c0, c1, arg;
        int   n;
        c0 = c1 = 0.0;
        for (n=1; n<=L; n++)
        {
            arg = 2*PI* (n*x + (double)d[n−1]/P);
            c0 += cos(arg);
            c1 += sin(arg);
        }
        return(c0*c0 + c1*c1);
}
update(s_ptr, c)
coset_rep       *s_ptr;
unsigned long        c;
{
        int   u, m;
        for (u = 0; u < c; u++)
        {
            if (s_ptr −> max_power < list[u].max_power)
            {
                /* Shove up all subsequent entries of list[ ] */
                for (m = c; m >= u+1; m−−)
                    list[m] = list[m−1];
                /* Replace list[u] */
                list[u] = *s_ptr;
                return;
            }
        }
        /* Place *s_ptr at end of list[ ] */
        list[u] = *s_ptr;
}
print_list( )
{
        int   i, j, k, u;
        for (i = 1; i <= M; i++)
        for (j = i+1; j <= M; j++)
            printf("%2d%d", i, j);
        printf("      %d times oversampling\n\", OVER);
        for (u = 0; u < REPS; u++)
        {
            for (i = 1; i <= M; i++)
            for (j = i+1; j <= M; j++)
            {
                printf("%3d", list[u].a[i][j]);
            }
            printf("      ");
            for (k = 0; k < L; k++)
                printf("%2d", list[u].seq[k]);
            printf("%10.2f\n", list [u].max_power);
        }
}
```

As well as choosing trade-offs between data transfer rate and PMEPR, it is possible to trade off, for example, minimum Hamming or Lee distance against data transfer rate. For example, by choosing a subset of four of the cosets defined by the twelve top rows in Table 7, the minimum distance can be increased from 4 to 6 in return for a reduction in number of data bits from 8 to 7, while preserving a maximum PMEPR of 3 dB. An example of such a subset comprises the cosets defined by the second, third, fourth and sixth rows of Table 7. Similar trade-offs are possible for other lengths of code word and higher-order codes. In the extreme case a single coset of the base code may be used, providing a minimum Hamming and Lee distance of $2^{m-1}$ for any order code, but encoding only j(m+1) data bits.

Identifying possible trade-offs between data transfer rate and PMEPR by constructing a list of coset representatives ordered by maximum PEP over each coset, as described above, has the disadvantage, especially for longer code words and/or higher-order codes, of requiring extensive calculation. The following technique identifies a set of coset representatives which can be combined with the base code to produce code words associated with a PMEPR no greater than a known value, without calculating the maximum PEP over each coset (although this technique does not provide any ordering by PMEPR for the cosets in the set). The technique will be illustrated first in the case of a binary code of length 16 (m=4), that is with a generator array $$\begin{array}{ll}
(0000\ 0000\ 1111\ 1111) & (X_1) \\
(0000\ 1111\ 0000\ 1111) & (X_2) \\
(0011\ 0011\ 0011\ 0011) & (X_3) \\
(0101\ 0101\ 0101\ 0101) & (X_4) \\
(1111\ 1111\ 1111\ 1111) & (X') \\
(0000\ 0000\ 0000\ 1111) & (X_1 * X_2) \\
(0000\ 0000\ 0011\ 0011) & (X_1 * X_3) \\
(0000\ 0000\ 0101\ 0101) & (X_1 * X_4) \\
(0000\ 0011\ 0000\ 0011) & (X_2 * X_3) \\
(0000\ 0101\ 0000\ 0101) & (X_2 * X_4) \\
(0001\ 0001\ 0001\ 0001) & (X_3 * X_4)
\end{array}$$

As a first step towards producing the set of coset representatives, an initial set of eight ($2^{m-1}$) expressions is constructed, each having the form $$(X_1{*}X_2)\oplus(X_2{*}X_3)\oplus v_1(X_1{*}X_4)\oplus v_2(X_2{*}X_4)\oplus v_3(X_3{*}X_4)$$

where $v_1$, $v_2$ and $V_3$ are coefficients having values of 0 or 1 and $\oplus$ indicates bitwise addition modulo 2. Thus the initial set is $$\begin{array}{ll}
(X_1 * X_2)\oplus(X_2 * X_3) & (v_1 = 0, v_2 = 0, v_3 = 0) \\
(X_1 * X_2)\oplus(X_2 * X_3)\oplus(X_1 * X_4) & (v_1 = 1, v_2 = 0, v_3 = 0) \\
(X_1 * X_2)\oplus(X_2 * X_3)\oplus(X_2 * X_4) & (v_1 = 0, v_2 = 1, v_3 = 0) \\
(X_1 * X_2)\oplus(X_2 * X_3)\oplus(X_1 * X_4)\oplus(X_2 * X_4) & (v_1 = 1, v_2 = 1, v_3 = 0) \\
(X_1 * X_2)\oplus(X_2 * X_3)\oplus(X_3 * X_4) & (v_1 = 0, v_2 = 0, v_3 = 1) \\
(X_1 * X_2)\oplus(X_2 * X_3)\oplus(X_1 * X_4)\oplus(X_3 * X_4) & (v_1 = 1, v_2 = 0, v_3 = 1) \\
(X_1 * X_2)\oplus(X_2 * X_3)\oplus(X_2 * X_4)\oplus(X_3 * X_4) & (v_1 = 0, v_2 = 1, v_3 = 1) \\
(X_1 * X_2)\oplus(X_2 * X_3)\oplus(X_1 * X_4)\oplus(X_2 * X_4)\oplus(X_3 * X_4) & (v_1 = 1, v_2 = 1, v_3 = 1)
\end{array}$$

This initial set is then extended by applying all possible permutations of the subscripts of the row identifiers $X_1$, $X_2$, $X_3$ and $X_4$ in each expression. A final set is produced by identifying the distinct expressions within the extended set; for this purpose, terms with the same pair of subscripts but in reverse order (such as $X_1{*}X_2$ and $X_2{*}X_1$) are regarded as being the same, and the ordering of such terms within an expression is disregarded.

This final set of expressions, forty-nine in all, defining the required set of coset representatives, is given in Table 10, in terms of six coefficients which constitute multipliers for the respective additional rows of the code's generator array which are added modulo 2 to create the corresponding coset representative; thus, for example, a 1 under the heading '12' indicates that the additional row ($X_1{*}X_2$) is multiplied by 1 for inclusion in the coset representative, whereas a 0 indicates it is multiplied by 0 (i.e. effectively omitted).

TABLE 10

| 12 | 13 | 14 | 23 | 24 | 34 | 12 | 13 | 14 | 23 | 24 | 34 |
|---|---|---|---|---|---|---|---|---|---|---|---|
| 1 | 0 | 0 | 1 | 0 | 0 | 0 | 1 | 0 | 1 | 0 | 1 |
| 1 | 0 | 0 | 0 | 1 | 0 | 0 | 0 | 1 | 0 | 1 | 1 |
| 0 | 1 | 0 | 1 | 0 | 0 | 1 | 1 | 1 | 0 | 0 | 0 |
| 0 | 0 | 1 | 0 | 1 | 0 | 1 | 0 | 1 | 1 | 1 | 0 |

TABLE 10-continued

| 12 | 13 | 14 | 23 | 24 | 34 | 12 | 13 | 14 | 23 | 24 | 34 |
|---|---|---|---|---|---|---|---|---|---|---|---|
| 0 | 1 | 0 | 0 | 0 | 1 | 1 | 1 | 0 | 1 | 1 | 0 |
| 0 | 0 | 1 | 0 | 0 | 1 | 0 | 1 | 1 | 1 | 0 | 1 |
| 1 | 1 | 0 | 0 | 0 | 0 | 0 | 1 | 1 | 0 | 1 | 1 |
| 1 | 0 | 1 | 0 | 0 | 0 | 1 | 1 | 0 | 1 | 0 | 1 |
| 0 | 1 | 1 | 0 | 0 | 0 | 1 | 0 | 1 | 0 | 1 | 1 |
| 0 | 0 | 0 | 1 | 0 | 1 | 1 | 1 | 1 | 0 | 1 | 0 |
| 0 | 0 | 0 | 0 | 1 | 1 | 1 | 1 | 1 | 1 | 0 | 0 |
| 0 | 0 | 0 | 1 | 1 | 0 | 1 | 1 | 1 | 0 | 0 | 1 |
| 1 | 0 | 1 | 1 | 0 | 0 | 0 | 1 | 0 | 1 | 1 | 1 |
| 1 | 1 | 0 | 0 | 1 | 0 | 0 | 0 | 1 | 1 | 1 | 1 |
| 0 | 1 | 1 | 1 | 0 | 0 | 1 | 0 | 0 | 1 | 1 | 1 |
| 0 | 1 | 1 | 0 | 1 | 0 | 1 | 0 | 1 | 1 | 0 | 1 |
| 1 | 1 | 0 | 0 | 0 | 1 | 1 | 1 | 0 | 0 | 1 | 1 |
| 1 | 0 | 1 | 0 | 0 | 1 | 0 | 1 | 1 | 1 | 1 | 0 |
| 0 | 1 | 0 | 1 | 1 | 0 | 1 | 0 | 1 | 1 | 1 | 1 |
| 0 | 0 | 1 | 1 | 1 | 0 | 1 | 1 | 0 | 1 | 1 | 1 |
| 1 | 0 | 0 | 1 | 0 | 1 | 0 | 1 | 1 | 1 | 1 | 1 |
| 1 | 0 | 0 | 0 | 1 | 1 | 1 | 1 | 1 | 0 | 1 | 1 |
| 0 | 0 | 1 | 1 | 0 | 1 | 1 | 1 | 1 | 1 | 0 | 1 |
| 0 | 1 | 0 | 0 | 1 | 1 | 1 | 1 | 1 | 1 | 1 | 0 |
| 1 | 0 | 0 | 1 | 1 | 0 | 1 | 1 | 1 | 1 | 1 | 0 |

A code whose code words are obtained by combining any of these coset representatives with the base code has the following properties:

- the code's minimum Hamming distance is 4 ($2^{m-2}$);
- a multi-carrier signal modulated in accordance with these code words has a PMEPR of no more than 6 dB;
- a decoder based on Hamming distance for use with such a code can operate using analytical techniques and can be implemented, for example, using combinatorial logic at least in part;
- there are sufficient code words available to enable an acceptable data transfer rate to be attained.

In the general case of a binary code of length $2^m$ bits where $m\geqq3$, the initial set of $2^{m-1}$ expressions is constructed with the form $$(X_1{*}X_2)\oplus(X_2{*}X_3)\oplus \ldots \oplus(X_{m-2}{*}X_{m-1})\oplus v_1(X_1{*}X_m)\oplus v_2(X_2{*}X_m)\oplus \ldots \oplus v_{m-1}(X_{m-1}{*}X_m)$$

where $v_1, v_2, \ldots v_{m-1}$ are coefficients having values of 0 or 1, and the permutation of subscripts and identification of distinct expressions performed as described above. The number of cosets and the total number of code words identified by this procedure for various code word lengths (in terms of the parameter m) are given below:

| m | Cosets | No. of code words |
|---|---|---|
| 3 | 7 | 112 |
| 4 | 49 | 1568 |
| 5 | 552 | 35328 |
| 6 | 7800 | 998400 |
| 7 | 126360 | 32348160 |

A modification of this technique, applicable for word lengths of 64 or more bits (m≧6), enables a large subset of these cosets to be identified, without the need for examining the extended set of expressions to find and discard expressions which are not distinct. In other words, this modified technique can be guaranteed to produce an extended set of expressions which are inherently distinct. To this end, the combinations of values of the coefficients $v_1, v_2, \ldots v_{m-1}$ are limited to combinations such that the binary words of the form $v_1v_2v_3 \ldots v_{m-2}v_{m-1}$ have the following two properties:

each word $v_1v_2v_3 \ldots v_{m-2}v_{m-1}$ has Hamming weight of at least 4; and $$\sum_{i=0}^{\lfloor (m-3)/2 \rfloor} v_{i+1}2^i < \sum_{i=0}^{\lfloor (m-3)/2 \rfloor} v_{m-1-i}2^i$$

Constructing an initial set of expressions with the form given above but with this limited set of combinations of coefficients, and applying all possible permutations of the subscripts of the row identifiers in each expression, directly yields a final set of distinct expressions defining the required subset of coset representatives. The code words produced by combining the base code with any coset representative in this subset result in a PMEPR of at most 6 dB. At least m!.b $2^{m-4}$ coset representatives are identified by this procedure when m≧7.

Similar techniques can be used for identifying cosets of quaternary and higher-order code words which result in a known maximum PMEPR. For a quaternary code of length $2^m$ where m≧3, an initial set of $2^{m-1}$ expressions is constructed of the form $$2(X_1{*}X_2)\oplus 2(X_2{*}X_3)\oplus \ldots \oplus 2(X_{m-2}{*}X_{m-1})\oplus 2v_1(X_1{*}X_m)\oplus 2v_2(X_2{*}X_m)\oplus \ldots \oplus 2v_{m-1}(X_{m-1}{*}X_m)$$

where $v_1, v_2, \ldots v_{m-1}$ are coefficients having values of 0 or 1 and ⊕ indicates symbol-wise addition modulo 4. This initial set is then extended by applying all possible permutations of the subscripts of the row identifiers $X_1, X_2, X_3, \ldots X_m$ in each expression. A final set of expressions, defining the required set of coset representatives, is produced by identifying the distinct expressions within the extended set, as previously described for the binary case.

A quaternary code whose code words are obtained by combining any of these coset representatives with the quaternary base code has the following properties:

- the code's minimum Hamming distance is $2^{m-2}$ and its minimum Lee distance is $2^{m-1}$;
- a multi-carrier signal modulated in accordance with these code words has a PMEPR of no more than 6 dB;
- a decoder for use with such a code can operate using analytical techniques and can be implemented, for example, using combinatorial logic at least in part;
- there are sufficient code words available to enable an acceptable data transfer rate to be attained; in general, this procedure identifies at least $m!.2^{m-4}$ distinct coset representatives when m≧7.

The number of cosets and the total number of quaternary code words identified by this procedure for various code word lengths (in terms of the parameter m) are given below:

| m | Cosets | No. of code words |
|---|---|---|
| 3 | 7 | 1792 |
| 4 | 49 | 50176 |
| 5 | 552 | 2260992 |
| 6 | 7800 | 127795200 |
| 7 | 126360 | 8281128960 |

As in the binary case, for word lengths of 64 or more symbols (m≧6) a large subset of these cosets can be identified, without the need for examining the extended set of expressions to find and discard expressions which are not distinct. This is accomplished by limiting the combinations of values of the coefficients $v_1, v_2, \ldots v_{m-1}$ to combinations such that the binary words of the form $v_1v_2v_3 \ldots v_{m-2}v_{m-1}$ have the two properties specified in the discussion above for the binary case. For m≧7 at least $m!.2^{m-4}$ distinct coset representatives are identified by this procedure, and the code words produced by combining the quaternary base code with any coset representative in this subset yield a PMEPR of at most 6 dB.

For quaternary code words of length $2^m$ where m≧3, a modification is possible, by allowing the coefficients $v_1, v_2, \ldots v_{m-1}$ to have any of the four values 0, 1, 2 or 3 and modifying the form of the expressions in the initial set to be $$2(X_1{*}X_2)\oplus 2(X_2{*}X_3)\oplus \ldots \oplus 2(X_{m-2}{*}X_{m-1})\oplus v_1(X_1{*}X_m)\oplus v_2(X_2{*}X_m)\oplus \ldots \oplus v_{m-1}(X_{m-1}{*}X_m)$$

(i.e. without a multiplier of 2 before each coefficient). This initial set is then extended by applying all possible permutations of the subscripts of the row identifiers $X_1, X_2, X_3, \ldots X_m$ in each expression. A final set of expressions, defining the required set of coset representatives, is produced by identifying the distinct expressions within the extended set, as previously described for the binary case. The number of cosets and the total number of quaternary code words obtained with this modification for various code word lengths (in terms of the parameter m) are given below:

| m | Cosets | No. of code words |
|---|---|---|
| 3 | 37 | 9472 |
| 4 | 661 | 676864 |
| 5 | 14472 | 59277312 |
| 6 | 360600 | 5908070400 |
| 7 | ≧1290240 | ≧84557168640 |

It can be seen that many more cosets are available in this case, so there is a potential for a higher data transfer rate. The code words produced by combining the quaternary base code with any coset representative identified by this modified procedure yield a PMEPR of at most 6 dB; however, the minimum Lee distance with this modification is reduced to $2^{m-2}$.

An additional modification produces an extended set of expressions which are guaranteed to be distinct after permuting the subscripts of the row identifiers, by fixing the values of the coefficients $v_1$ and $v_{m-1}$ to be 1 and 3 respectively while allowing the other coefficients to have any value from 0 to 3. For m≧4, at least $m!.4^{m-3}$ distinct coset representatives are obtained with this approach.

For an octary code of length $2^m$ where m≧3, an initial set of $4^{m-1}$ expressions is constructed of the form $$4(X_1*X_2)\oplus 4(X_2*X_3)\oplus \ldots \oplus 4(X_{m-2}*X_{m-1})\oplus 2v_1(X_1*X_m)\oplus 2v_2(X_2*X_m)\oplus \ldots \oplus 2v_{m-1}(X_{m-1}*X_m)$$

where $v_1, v_2, \ldots v_{m-1}$ are coefficients having values of 0, 1, 2 or 3 and ⊕ indicates symbol-wise addition modulo 8. This initial set is then extended by applying all possible permutations of the subscripts of the row identifiers $X_1, X_2, X_3, \ldots X_m$ in each expression. A final set of expressions, defining the required set of coset representatives, is produced by identifying the distinct expressions within the extended set, as previously described for the binary case.

Octary code words obtained by combining any of these coset representatives with the base code have the following properties:

- the code's minimum Hamming distance is $2^{m-2}$ and its minimum Lee distance is $2^{m-1}$;
- a multi-carrier signal modulated in accordance with these code words has a PMEPR of no more than 6 dB;
- a decoder for use with such a code can operate using analytical techniques and can be implemented, for example, using combinatorial logic at least in part;
- there are sufficient code words available to enable an acceptable data transfer rate to be attained; in general, this procedure identifies at least $m!.4^{m-3}$ distinct coset representatives when m>4.

The number of cosets and the total number of octary code words for various code word lengths (in terms of the parameter m) are given below:

| m | Cosets | No. of code words |
|---|---|---|
| 3 | 37 | 151552 |
| 4 | 661 | 21659648 |
| 5 | 14472 | 3793747968 |
| 6 | 360600 | 756233011200 |
| 7 | ≧1290240 | $>2.16\times10^{13}$ |

As in the quaternary case, for word lengths of 16 or more symbols (m≧4) a large subset of these cosets can be identified, without the need for examining the extended set of expressions to find and discard expressions which are not distinct. This is accomplished by fixing the values of the coefficients $v_1$ and $v_{m-1}$ to be 1 and 3 respectively while allowing the other coefficients to have any value from 0 to 3. Exactly $m!.4^{m-3}$ distinct coset representatives are obtained with this approach.

For octary code words of length $2^m$ where m≧3, another modification is possible, by allowing the coefficients $v_1, v_2, \ldots v_{m-1}$ to have any of the eight values 0 to 7 and modifying the form of the expressions in the initial set to be $$4(X_1*X_2)\oplus 4(X_2*X_3)\oplus \ldots \oplus 4(X_{m-2}*X_{m-1})\oplus v_1(X_1*X_m)\oplus v_2(X_2*X_m)\oplus \ldots \oplus v_{m-1}(X_{m-1}*X_m)$$

(i.e. without a multiplier of 2 before each coefficient). This initial set is then extended by applying all possible permutations of the subscripts of the row identifiers $X_1, X_2, X_3, \ldots X_m$ in each expression. A final set of expressions, defining the required set of coset representatives, is produced by identifying the distinct expressions within the extended set, as previously described for the binary case. The number of cosets and the total number of octary code words obtained with this modification for various code word lengths (in terms of the parameter m) are given below:

| m | Cosets | No. of code words |
|---|---|---|
| 3 | 169 | 692224 |
| 4 | 5917 | 193888256 |
| 5 | 243912 | 63940067328 |
| 6 | $>5.52\times10^6$ | $>1.15\times10^{13}$ |
| 7 | $>3.09\times10^8$ | $>5.19\times10^{15}$ |

It can be seen that many more cosets are available in this case, so there is a potential for a higher data transfer rate. The code words produced by combining the octary base code with any coset representative identified by this modified procedure yield a PMEPR of at most 6 dB; however, the minimum Lee distance with this modification is reduced to $2^{m-2}$.

An additional modification produces an extended set of expressions which are guaranteed to be distinct after permuting the subscripts of the row identifiers, by fixing the values of the coefficients $v_1$ and $v_{m-1}$ to be any one of the following ordered pairs of values, where the value of $v_1$ is given first: 1,2; 1,3; 1,5; 1,6; 1,7; 2,3; 2,5; 2,6; 2,7; 3,5; 3,6; 3,7; 5,6; 5,7; 6,7. The other coefficients may have any value from 0 to 7. For m≧4, at least $15.m!.8^{m-3}$ distinct coset representatives are obtained with this approach.

These techniques for identifying cosets defining code words producing a PMEPR of no more than 6 dB can be extended to higher-order codes. More generally, large sets of coset representatives can be identified for codes containing $2^m$ symbols (where m≧3) each with $2^j$ possible values, for which the PMEPR is guaranteed to be at most $2^{p+1}$, for any fixed integer p where 1≦p≦m−2. To this end, p sets of coefficients are defined as follows $$(v_{1,1}, v_{1,2}, \ldots v_{1,m-p})$$

$$(v_{2,1}, v_{2,2}, \ldots v_{2,m-p})$$

$$\ldots$$

$$(v_{p,1}, v_{p,2}, \ldots v_{p,m-p})$$

where each coefficient can have an integer value from 0 to $2^j-1$. A further p(p−1)/2 coefficients $w_{ij}$, where 1≦i<j≦p; are defined where each $w_{i,j}$ can have an integer value from 0 to $2^j-1$. For an initial choice of the coefficients $v_{ij}$ and $w_{ij}$ an expression is constructed of the form $$2^{j-1}(X_1*X_2)\oplus 2^{j-1}(X_2*X_3)\oplus \ldots \oplus 2^{j-i}(X_{m-p-1}*X_{m-p})$$

$$\oplus v_{1,1}(X_1*X_{m-p+1})\oplus v_{1,2}(X_2*X_{m-p+1})\oplus \ldots \oplus v_{1,m-p}(X_{m-p}*X_{m-p+1})$$

$$\oplus v_{2,1}(X_1*X_{m-p+2})\oplus v_{2,2}(X_2*X_{m-p+2})\oplus \ldots \oplus v_{2,m-p}(X_{m-p}*X_{m-p+2})$$

$$\ldots$$

$$\oplus v_{p,1}(X_1*X_m)\oplus v_{p,2}(X_2*X_m)\oplus \ldots \oplus v_{p,m-p}(X_{m-p}*X_m)$$

$$\oplus w_{1,2}(X_{m-p+1}*X_{m-p+2})$$

$$\oplus w_{1,3}(X_{m-p+1}*X_{m-p+3})\oplus w_{2,3}(X_{m-p+2}*X_{m-p+3})$$

$$\oplus w_{1,4}(X_{m-p+1}*X_{m-p+4})\oplus w_{2,4}(X_{m-p+2}*X_{m-p+4})\oplus w_{3,4}(X_{m-p+3}*X_{m-p+4})$$

$$\ldots$$

$$\oplus w_{1,p}(X_{m-p+1}*X_m)\oplus w_{2,p}(X_{m-p+2}*X_m)\oplus \ldots \oplus w_{p-1,p}(X_{m-1}*X_m)$$

where ⊕ indicates symbol-wise addition modulo $2^j$; further expressions of this form are constructed for the remaining possible combinations of choices of the coefficients $v_{i,j}$ and $w_{ij}$, to obtain an initial set of $2^{jp(m-p)+jp(p-1)/2}$ expressions. This initial set is then extended by applying all possible permutations of the subscripts of the row identifiers $X_1$, $X_2$, $X_3$, . . . $X_m$ in each expression. A final set of expressions, defining the required set of coset representatives, is produced by identifying the distinct expressions within the extended set, as previously described for the binary case. The set of code words produced by combining the base code of order $2^j$ with any coset representative identified by this procedure have a minimum Lee distance and a minimum Hamming distance both of $2^{m-2}$. In the case where $j \geqq 2$, a further modification is possible in which the coefficients $v_{ij}$ and $w_{ij}$ are restricted to have even values in the ranges specified above. In this case fewer cosets will be identified, but the resulting code will have a minimum Lee distance of $2^{m-1}$.

Additional trade-offs between data transfer rate, PMEPR and error detection and correction capabilities can be obtained in other ways than those described above. For example, instead of using a 32-bit code word to encode 11 data bits directly as described above, successive blocks of 8 data bits could be encoded as 16-bit code words using a 8B/16B code derived from Table 3, and then pairs of these code words concatenated to produce a composite 32-bit word for transmission. In comparison with direct use of the 11B/32B code, such concatenation would have the following properties:

- a better data transfer rate (16 data bits represented by 32 transmitted bits); and
- a PMEPR of, at worst, 4(=6 dB), i.e. double the maximum PMEPR for the codes used for the component code words.

Thus concatenation in this manner could be useful in circumstances where a good data transfer rate is desired, together with controlled, though not necessarily optimum, PMEPR.

In decoding a concatenated code, the code word would be split into two successive component 16-bit code words, which would then be individually processed by a 16B/8B decoder 120 or 140 to retrieve respective 8-bit data words.

Shorter-length code words can be combined to form longer composite code words for transmission in other ways than by concatenation of pairs of code words. Thus, for example, four component code words can be concatenated, and the received composite code word split into four portions for decoding. Alternatively, it is envisaged that the component bits or symbols of individual shorter code words can be interleaved, one by one or in pairs, quadruples, etc. The component code words of a composite code word need not be members of the same coset. Furthermore the choice of coset representative for a particular component code word can range over multiple values. In this case the identity of the coset to which each selected component code word belongs can itself be used to transfer information, e.g. by defining one or more additional bits of the data word, in a manner analogous to the function of, for example, the selector 70 in the encoder 60 of FIG. 8.

The composite transmitted code word created by concatenation or interleaving in this manner is not directly derived as described above from a generator matrix having rows of the same length, but from a generator matrix having shorter (e.g. half-length) rows. Nonetheless, it can be shown that the code constituted by such composite code words in fact comprises, and therefore can be selected from, a set of complete cosets of a code having a generator matrix with rows of the same length as the composite code words.

In another modification a 16-bit code word and a 32-bit code word, each selected from respective codes derived as described above, could be concatenated to produce a composite 48-bit word for transmission. This 48-bit word could be combined with 16 additional zero bits to produce a 64-bit word for processing with the IFFT for transmission; the additional 16 zero bits enable oversampling to be used upon reception, while providing the optimum choice of a power of two for the number of samples. Another possibility is to concatenate three 16-bit code words, each selected from a 16-bit code, to produce the composite 48-bit code word.

It is noted that the binary, quaternary and octary codes of a given length presented above are all derived from a single, common generator matrix, which can indeed also be used to derive similar higher-order codes. It is envisaged that this property would be valuable in the implementation of adaptive systems for changing the order of code used according to prevailing characteristics of a communications path. Thus, when a high-quality path is in use, a higher-order code, such as octary, could be used to obtain a high rate of data transfer. If the quality of the path deteriorates, leading to increased error rates, it could be advantageous to switch to use of a lower-order code, such as quaternary or even binary. With the present invention this can be readily accomplished without the need for complete replication of circuitry for each different-order code available. The same basic circuitry could be used, incorporating or based on the common generator matrix, together with switchable parameters corresponding for example to the values in the additional rows of each code's generator array. Selection of the appropriate values of these parameters would cause the same basic circuitry to generate the particular order of code required.

Coset representatives derived as described above provide particularly advantageous properties. In the most general case a coset representative can be any value combined with code words in a base code by symbol-wise addition modulo $2^j$, to shift their values in a systematic manner.

The code words in the codes defined above also have useful properties for establishing synchronization of timing of circuit operation with a received signal. Accordingly, the circuitry for decoding these codes as described above can also be used to identify synchronization sequences in the received data, thereby providing economies in circuit implementation. It is also envisaged that these codes have advantageous properties for communication by techniques other than COFDM; thus, for example, they may be used as codes for code division multiple access (CDMA) techniques or for modem transmission of digital data over analogue communication paths.

What is claimed is:

1. A method of encoding data words for transmission using multi-carrier frequency division multiplexing comprising:

selecting a set of one or more cosets of a linear sub-code of a code having a generator matrix as follows:

$$\begin{array}{lll}
((2.0+1)\times 2^{m})/2^{m} & ((2.1+1)\times 2^{m})/2^{m} & \cdots \\
((2.0+1)\times 2^{m-1})/2^{m-1} & ((2.1+1)\times 2^{m-1})/2^{m-1} & \cdots \\
 & & \cdots \\
((2.0+1)\times 2^{y})/2^{y} & ((2.1+1)\times 2^{y})/2^{y} & \cdots \\
 & & \cdots \\
((2.0+1)\times 2^{1})/2^{1} & ((2.1+1)\times 2^{1})/2^{1} & \cdots \\
((2.0+1)\times 2^{0})/2^{0} & ((2.1+1)\times 2^{0})/2^{0} & \cdots
\end{array}$$

$$\begin{array}{lll}
((2.z+1)\times 2^{m})/2^{m} & \cdots & ((2.(2^{m}-1)+1)\times 2^{m})/2^{m} \\
((2.z+1)\times 2^{m-1})/2^{m-1} & \cdots & ((2.(2^{m}-1)+1)\times 2^{m-1})/2^{m-1} \\
((2.z+1)\times 2^{y})/2^{y} & \cdots & ((2.(2^{m}-1)+1)\times 2^{y})/2^{y} \\
((2.z+1)\times 2^{1})/2^{1} & \cdots & ((2.(2^{m}-1)+1)\times 2^{1})/2^{1} \\
((2.z+1)\times 2^{0})/2^{0} & \cdots & ((2.(2^{m}-1)+1)\times 2^{0})/2^{0}
\end{array}$$

where z has integer values from 0 to $2^m$–1, y has integer values from m to 0, x indicates bitwise multiplication of factors expressed as (m+1)-bit binary numbers, and the result of division is expressed as a single digit; and encoding the data words as $2^m$-symbol code words in accordance with their value and code words selected in complete cosets from the set of one or more cosets to achieve a desired peak-to-mean envelope power ratio characteristic of the transmission.

2. The method of claim 1, wherein m is at least 3.

3. The method of claim 2, wherein m is at least 4.

4. The method of claim 1, wherein m is four and said generator matrix is:

(0000 0000 1111 1111)

(0000 1111 0000 1111)

(0011 0011 0011 0011)

(0101 0101 0101 0101)

(1111 1111 1111 1111).

5. The method of claim 1, wherein m is five and said generator matrix is:

(0000 0000 0000 0000 1111 1111 1111 1111)

(0000 0000 1111 1111 0000 0000 1111 1111)

(0000 1111 0000 1111 0000 1111 0000 1111)

(0011 0011 0011 0011 0011 0011 0011 0011)

(0101 0101 0101 0101 0101 0101 0101 0101)

(1111 1111 1111 1111 1111 1111 1111 1111).

6. The method of claim 1, wherein the number of code words is an integer power of two.

7. The method of claim 1, wherein each symbol has $2^j$ different possible values, where j is a positive integer.

8. The method of claim 7, wherein j has the value 1.

9. The method of claim 7, wherein j has the value 2.

10. The method of claim 7, wherein j has the value 3.

11. The method of claim 7, wherein all said code words also belong to a second code having a generator array comprising the generator matrix plus additional rows which are derived by symbol-wise multiplication of all possible pairs of the first m rows of the generator matrix and are further multiplied by a positive integer s, where s is a power of two less than $2^j$.

12. The method of claim 11, wherein s has the value 1.

13. The method of claim 11, wherein j is at least 2 and s has the value 2.

14. The method of claim 11, wherein j is at least 3 and s has the value $2^{j-1}$.

15. The method of claim 11, wherein m is four and said generator array is:

(0000 0000 1111 1111)

(0000 1111 0000 1111)

(0011 0011 0011 0011)

(0101 0101 0101 0101)

(1111 1111 1111 1111)

(0000 0000 0000 ssss)

(0000 0000 00ss 00ss)

(0000 0000 0s0s 0s0s)

(0000 00ss 0000 00ss)

(0000 0s0s 0000 0s0s)

(000s 000s 000s 000s).

16. The method of claim 11, wherein m is five and said generator array is:

(0000 0000 0000 0000 1111 1111 1111 1111)

(0000 0000 1111 1111 0000 0000 1111 1111)

(0000 1111 0000 1111 0000 1111 0000 1111)

(0011 0011 0011 0011 0011 0011 0011 0011)

(0101 0101 0101 0101 0101 0101 0101 0101)

(1111 1111 1111 1111 1111 1111 1111 1111)

(0000 0000 0000 0000 0000 0000 ssss ssss)

(0000 0000 0000 0000 0000 ssss 0000 ssss)

(0000 0000 0000 0000 00ss 00ss 00ss 00ss)

(0000 0000 0000 0000 0s0s 0s0s 0s0s 0s0s)

(0000 0000 0000 ssss 0000 0000 0000 ssss)

(0000 0000 00ss 00ss 0000 0000 00ss 00ss)

(0000 0000 0s0s 0s0s 0000 0000 0s0s 0s0s)

(0000 00ss 0000 00ss 0000 00ss 0000 00ss)

(0000 0s0s 0000 0s0s 0000 0s0s 0000 0s0s)

(000s 000s 000s 000s 000s 000s 000s 000s).

17. The method of claim 11, wherein all coset representatives of cosets in said set of cosets have the form $2^{j-1}(X_1*X_2)\oplus 2^{j-1}(X_2*X_3)\oplus \ldots \oplus 2^{j-1}(X_{m-1}*X_m)$, or a permutation of those subscripts, where $X_1$ to $X_m$ are row labels of the first m rows in the generator matrix, * indicates symbol-wise multiplication and $\oplus$ indicates symbol-wise addition modulo $2^j$.

18. The method of claim 1, wherein said code words are selected from a list of cosets of a linear sub-code of said code, said list being ordered to indicate maximum peak envelope power over any code word in a coset relative to that for other cosets.

19. The method of claim 18, wherein at least a predetermined number of cosets is selected such that the maximum peak-to-mean envelope power ratio over all the code words in the selected cosets is minimized.

20. The method of claim 18, wherein the code words are selected from cosets for which the peak-to-mean envelope power ratio is no greater than a predetermined value.

21. The method of claim 20, wherein said code words are binary or quaternary code words and said predetermined value is 4, or said code words are octary code words and said predetermined value is 3.

22. The method of claim 18, wherein the code words are selected from cosets whose representatives are defined by linear combinations of rows derived by symbol-wise multiplication of all possible pairs of the first m rows of the generator matrix and are further multiplied by a positive integer s, where s is a power of two less than the number of different possible values for each symbol.

23. The method of claim 1, including the steps of modulating multiple carrier signals in accordance with the code words encoding said data words, and combining the modulated carrier signals, to produce a composite signal having a peak-to-mean envelope power ratio reduced to that for a composite signal modulated directly in accordance with said data words.

24. A method for transmitting data words comprising:

selecting a set of one or more cosets of a linear sub-code of a code having a generator matrix as follows:

$$\begin{array}{lll}
((2.0+1)\times 2^m)/2^m & ((2.1+1)\times 2^m)/2^m & \cdots \\
((2.0+1)\times 2^{m-1})/2^{m-1} & ((2.1+1)\times 2^{m-1})/2^{m-1} & \cdots \\
 & & \cdots \\
((2.0+1)\times 2^y)/2^y & ((2.1+1)\times 2^y)/2^y & \cdots \\
 & & \cdots \\
((2.0+1)\times 2^1)/2^1 & ((2.1+1)\times 2^1)/2^1 & \cdots \\
((2.0+1)\times 2^0)/2^0 & ((2.1+1)\times 2^0)/2^0 & \cdots
\end{array}$$

$$\begin{array}{lll}
((2.z+1)\times 2^m)/2^m & \cdots & ((2.(2^m-1)+1)\times 2^m)/2^m \\
((2.z+1)\times 2^{m-1})/2^{m-1} & \cdots & ((2.(2^m-1)+1)\times 2^{m-1})/2^{m-1} \\
 & & \\
((2.z+1)\times 2^y)/2^y & \cdots & ((2.(2^m-1)+1)\times 2^y)/2^y \\
 & & \\
((2.z+1)\times 2^1)/2^1 & \cdots & ((2.(2^m-1)+1)\times 2^1)/2^1 \\
((2.z+1)\times 2^0)/2^0 & \cdots & ((2.(2^m-1)+1)\times 2^0)/2^0
\end{array}$$

where z has integer values from 0 to $2^m-1$, y has integer values from m to 0, x indicates bitwise multiplication of factors expressed as (m+1)-bit binary numbers, and the result of division is expressed as a single digit;

encoding each data word in accordance with its value and code words selected in complete cosets from the set of one or more cosets for desired peak-to-mean envelope power ratio characteristics of transmission;

transmitting the encoded data words as $2^m$-symbol code words using multi-carrier frequency division multiplexing; and decoding each code word using an analytical decoder.

25. A method of encoding and transmitting data words comprising:

selecting a set of one or more complete cosets of a linear sub-code of a code having a generator matrix as follows:

$$\begin{array}{lll}
((2.0+1)\times 2^m)/2^m & ((2.1+1)\times 2^m)/2^m & \cdots \\
((2.0+1)\times 2^{m-1})/2^{m-1} & ((2.1+1)\times 2^{m-1})/2^{m-1} & \cdots \\
 & & \cdots \\
((2.0+1)\times 2^y)/2^y & ((2.1+1)\times 2^y)/2^y & \cdots \\
 & & \cdots \\
((2.0+1)\times 2^1)/2^1 & ((2.1+1)\times 2^1)/2^1 & \cdots \\
((2.0+1)\times 2^0)/2^0 & ((2.1+1)\times 2^0)/2^0 & \cdots
\end{array}$$

$$\begin{array}{lll}
((2.z+1)\times 2^m)/2^m & \cdots & ((2.(2^m-1)+1)\times 2^m)/2^m \\
((2.z+1)\times 2^{m-1})/2^{m-1} & \cdots & ((2.(2^m-1)+1)\times 2^{m-1})/2^{m-1} \\
 & & \\
((2.z+1)\times 2^y)/2^y & \cdots & ((2.(2^m-1)+1)\times 2^y)/2^y \\
 & & \\
((2.z+1)\times 2^1)/2^1 & \cdots & ((2.(2^m-1)+1)\times 2^1)/2^1 \\
((2.z+1)\times 2^0)/2^0 & \cdots & ((2.(2^m-1)+1)\times 2^0)/2^0
\end{array}$$

where z has integer values from 0 to $2^m-1$, y has integer values from m to 0, x indicates bitwise multiplication of factors expressed as (m+1)-bit binary numbers, and the result of division is expressed as a single digit;

encoding the data words as $2^m$-symbol code words, wherein m is at least 4 and the data words are encoded in accordance with their value and code words selected from the set of one or more complete cosets; and transmitting the code words using multi-carrier frequency division multiplexing.

26. A method of encoding data words comprising:

selecting a set of one or more complete cosets of a code having a generator matrix as follows:

$$\begin{array}{lll}
((2.0+1)\times 2^m)/2^m & ((2.1+1)\times 2^m)/2^m & \cdots \\
((2.0+1)\times 2^{m-1})/2^{m-1} & ((2.1+1)\times 2^{m-1})/2^{m-1} & \cdots \\
 & & \cdots \\
((2.0+1)\times 2^y)/2^y & ((2.1+1)\times 2^y)/2^y & \cdots \\
 & & \cdots \\
((2.0+1)\times 2^1)/2^1 & ((2.1+1)\times 2^1)/2^1 & \cdots \\
((2.0+1)\times 2^0)/2^0 & ((2.1+1)\times 2^0)/2^0 & \cdots
\end{array}$$

$$\begin{array}{lll}
((2.z+1)\times 2^m)/2^m & \cdots & ((2.(2^m-1)+1)\times 2^m)/2^m \\
((2.z+1)\times 2^{m-1})/2^{m-1} & \cdots & ((2.(2^m-1)+1)\times 2^{m-1})/2^{m-1} \\
 & & \\
((2.z+1)\times 2^y)/2^y & \cdots & ((2.(2^m-1)+1)\times 2^y)/2^y \\
 & & \\
((2.z+1)\times 2^1)/2^1 & \cdots & ((2.(2^m-1)+1)\times 2^1)/2^1 \\
((2.z+1)\times 2^0)/2^0 & \cdots & ((2.(2^m-1)+1)\times 2^0)/2^0
\end{array}$$

where z has integer values from 0 to $2^m-1$, y has integer values from m to 0, x indicates bitwise multiplication of factors expressed as (m+1)-bit binary numbers, and the result of division is expressed as a single digit; and encoding the data words as $2^m$-symbol code words for transfer over a communication path, each code word symbol having $2^j$ different possible values, wherein m is at least 4 and j is at least 3, and the data words are encoded in accordance with their value and code words selected from the set of one or more complete cosets.

27. A method of encoding data comprising:

selecting code words from a set of one or more cosets of a linear sub-code of a code having a generator matrix as follows:

$$\begin{matrix} ((2.0+1)\times 2^m)/2^m & ((2.1+1)\times 2^m)/2^m & \cdots & ((2.z+1)\times 2^m)/2^m & \cdots & ((2.(2^m-1)+1)\times 2^m)/2^m \\ ((2.0+1)\times 2^{m-1})/2^{m-1} & ((2.1+1)\times 2^{m-1})/2^{m-1} & \cdots & ((2.z+1)\times 2^{m-1})/2^{m-1} & \cdots & ((2.(2^m-1)+1)\times 2^{m-1})/2^{m-1} \\ & & \cdots & & & \\ ((2.0+1)\times 2^y)/2^y & ((2.1+1)\times 2^y)/2^y & \cdots & ((2.z+1)\times 2^y)/2^y & \cdots & ((2.(2^m-1)+1)\times 2^y)/2^y \\ & & \cdots & & & \\ ((2.0+1)\times 2^1)/2^1 & ((2.1+1)\times 2^1)/2^1 & \cdots & ((2.z+1)\times 2^1)/2^1 & \cdots & ((2.(2^m-1)+1)\times 2^1)/2^1 \\ ((2.0+1)\times 2^0)/2^0 & ((2.1+1)\times 2^0)/2^0 & \cdots & ((2.z+1)\times 2^0)/2^0 & \cdots & ((2.(2^m-1)+1)\times 2^0)/2^0 \end{matrix}$$

where z has integer values from 0 to $2^m-1$, y has integer values from m to 0, x indicates bitwise multiplication of factors expressed as (m+1)-bit binary numbers, and the result of division is expressed as a single digit; and encoding the data words as $2^m$-symbol code words for transfer over a communication path, each code word symbol having $2^j$ different possible values, wherein j is a variable positive integer, and the data words are encoded in accordance with their value and a code having, for any value of j, the selected code words.

28. The method of claim 1, wherein said set of cosets contains a plurality of cosets and said linear sub-code is the same for each coset.

29. The method of claim 28, wherein said linear sub-code comprises all of said code.

30. A method of identifying a $2^m$-symbol code word within a set of code words having a generator matrix $$\begin{matrix} ((2.0+1)\times 2^m)/2^m & ((2.1+1)\times 2^m)/2^m & \cdots & ((2.z+1)\times 2^m)/2^m & \cdots & ((2.(2^m-1)+1)\times 2^m)/2^m \\ ((2.0+1)\times 2^{m-1})/2^{m-1} & ((2.1+1)\times 2^{m-1})/2^{m-1} & \cdots & ((2.z+1)\times 2^{m-1})/2^{m-1} & \cdots & ((2.(2^m-1)+1)\times 2^{m-1})/2^{m-1} \\ & & \cdots & & & \\ ((2.0+1)\times 2^y)/2^y & ((2.1+1)\times 2^y)/2^y & \cdots & ((2.z+1)\times 2^y)/2^y & \cdots & ((2.(2^m-1)+1)\times 2^y)/2^y \\ & & \cdots & & & \\ ((2.0+1)\times 2^1)/2^1 & ((2.1+1)\times 2^1)/2^1 & \cdots & ((2.z+1)\times 2^1)/2^1 & \cdots & ((2.(2^m-1)+1)\times 2^1)/2^1 \\ ((2.0+1)\times 2^0)/2^0 & ((2.1+1)\times 2^0)/2^0 & \cdots & ((2.z+1)\times 2^0)/2^0 & \cdots & ((2.(2^m-1)+1)\times 2^0)/2^0 \end{matrix}$$

where z has integer values from 0 to $2^m-1$, y has integer values from m to 0, x indicates bitwise multiplication of factors expressed as (m+1)-bit binary numbers, and the result of division is expressed as a single digit, and each code word symbol has $2^j$ different possible values where j>1, the method comprising:

receiving a set of code words;

deriving coefficients for rows of the matrix by applying a plurality of fast Hadamard transforms or equivalents thereof to a $2^m$-symbol input word; and combining results of the transforms or their equivalents to identify the $2^m$-symbol code word.

31. The method of claim 30, wherein a total of $2^{(j-1)(m+1)}$ fast Hadamard transforms or equivalents thereof are applied in respect of said input word.

32. The method of claim 31, wherein coefficients for rows of said matrix are derived by:

generating $2^{(j-1)(m+1)}$ values B according to the relation $$B=b_1X_1\oplus b_2X_2\oplus \ldots \oplus b_mX_m\oplus b'X'$$

for all possible combinations of values of coefficients $b_1$, $b_2$, . . . , $b_m$ and b', each of which can have integer values between 0 and $2^{j-1}-1$ inclusive, where $X_l$ to $X_m$ are row labels of the first m rows in the matrix, X' is a row label of the final row of said matrix and $\oplus$ indicates symbol-wise addition modulo $2^j$;

generating for each value B a vector D according to the relation $$D=|2^{j-1}X'-((S-B) \bmod 2^j)|-2^{j-2}X'$$

where S is said input word and subtractions involving values X', S and B, and the modulus operation | . . . | are performed symbol-wise;

applying a fast Hadamard transform or an equivalent thereof to each vector D to derive $2^m$ transform components;

identifying a transform component of largest absolute value; and deriving row coefficients corresponding to the value of B and the result of the fast Hadamard transform or equivalent thereof associated with said identified transform component.

33. The method of claim 30, wherein said symbols of said input word have integer values.

34. A coder for encoding data words comprising:

first circuitry for selecting code words in complete cosets from a set of one or more cosets of a linear sub-code of a code having a generator matrix as follows:

$$\begin{matrix} ((2.0+1)\times 2^m)/2^m & ((2.1+1)\times 2^m)/2^m & \cdots \\ ((2.0+1)\times 2^{m-1})/2^{m-1} & ((2.1+1)\times 2^{m-1})/2^{m-1} & \cdots \\ & & \cdots \\ ((2.0+1)\times 2^y)/2^y & ((2.1+1)\times 2^y)/2^y & \cdots \\ & & \cdots \\ ((2.0+1)\times 2^1)/2^1 & ((2.1+1)\times 2^1)/2^1 & \cdots \\ ((2.0+1)\times 2^0)/2^0 & ((2.1+1)\times 2^0)/2^0 & \cdots \end{matrix}$$

-continued $$((2.z+1)\times 2^m)/2^m \quad \cdots \quad ((2.(2^m-1)+1)\times 2^m)/2^m$$
$$((2.z+1)\times 2^{m-1})/2^{m-1} \quad \cdots \quad ((2.(2^m-1)+1)\times 2^{m-1})/2^{m-1}$$
$$((2.z+1)\times 2^y)/2^y \quad \cdots \quad ((2.(2^m-1)+1)\times 2^y)/2^y$$
$$((2.z+1)\times 2^1)/2^1 \quad \cdots \quad ((2.(2^m-1)+1)\times 2^1)/2^1$$
$$((2.z+1)\times 2^0)/2^0 \quad \cdots \quad ((2.(2^m-1)+1)\times 2^0)/2^0$$

where z has integer values from 0 to $2^m-1$, y has integer values from m to 0, x indicates bitwise multiplication of factors expressed as (m+1)-bit binary numbers, and the result of division is expressed as a single digit; and second circuitry for receiving data words and for encoding them as $2^m$-symbol code words in accordance with their value and the code words selected in complete cosets, to obtain desired peak-to-mean envelope power ratio characteristics of transmission using multi-carrier frequency division multiplexing.

* * * * *